(12) United States Patent
Abei et al.

(10) Patent No.: US 10,696,128 B2
(45) Date of Patent: Jun. 30, 2020

(54) COLD STORAGE HEAT EXCHANGER

(71) Applicant: DENSO CORPORATION, Kariya, Aichi-pref. (JP)

(72) Inventors: Jun Abei, Kariya (JP); Toshiya Nagasawa, Kariya (JP); Eiichi Torigoe, Kariya (JP); Naohisa Ishizaka, Kariya (JP); Norihide Kawachi, Kariya (JP); Yuusuke Kitou, Kariya (JP); Ken Nishimura, Kariya (JP); Masakazu Nagaya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/765,101

(22) PCT Filed: Sep. 23, 2016

(86) PCT No.: PCT/JP2016/077976
§ 371 (c)(1),
(2) Date: Mar. 30, 2018

(87) PCT Pub. No.: WO2017/057174
PCT Pub. Date: Apr. 6, 2017

(65) Prior Publication Data
US 2018/0281553 A1    Oct. 4, 2018

(30) Foreign Application Priority Data

Oct. 1, 2015 (JP) ................................ 2015-195818
Sep. 6, 2016 (JP) ................................ 2016-173410

(51) Int. Cl.
*B60H 1/00* (2006.01)
*B60H 1/32* (2006.01)

(52) U.S. Cl.
CPC .......... *B60H 1/005* (2013.01); *B60H 1/3227* (2013.01); *Y02E 60/145* (2013.01)

(58) Field of Classification Search
CPC ............ B60H 1/00492; B60H 1/00499; B60H 1/005; B60H 1/32; B60H 1/3227;
(Continued)

(56) References Cited

U.S. PATENT DOCUMENTS 6,854,286 B2    2/2005 Bureau et al.
7,448,436 B2 *  11/2008 Katoh ..................... F25B 39/02
                                                                 165/110
(Continued)

FOREIGN PATENT DOCUMENTS

JP    2004184071 A    7/2004
JP    2005195316 A    7/2005
(Continued)

*Primary Examiner* — Edward F Landrum
*Assistant Examiner* — Chang H Park
(74) *Attorney, Agent, or Firm* — Harness, Dickey & Pierce, P.L.C.

(57) ABSTRACT

A cold storage heat exchanger includes: a plurality of refrigerant tubes disposed at intervals, each of the refrigerant tubes including a refrigerant passage that allows a refrigerant to flow therethrough; a cold storage material adjacent to the refrigerant tubes; and a heat transfer suppressor that suppresses heat transfer from the refrigerant tubes to the cold storage material in an overheated area of the refrigerant formed in the refrigerant passage.

37 Claims, 56 Drawing Sheets

(58) Field of Classification Search
CPC .. F25B 2400/24; F25B 39/02; F28D 1/05366; F28D 1/05391; F28D 20/00; F28D 20/021; Y02E 60/145
USPC .................................. 165/10, 135, 153, 174
See application file for complete search history.

(56) References Cited

U.S. PATENT DOCUMENTS

| | | |
|---|---|---|
| 9,803,933 B2 * | 10/2017 | Chiba .................. F28D 20/021 |
| 2004/0104020 A1 | 6/2004 | Haller et al. |
| 2007/0068650 A1 | 3/2007 | Haller et al. |
| 2007/0074861 A1 | 4/2007 | Higashiyama |
| 2010/0065244 A1 | 3/2010 | Yokoyama et al. |
| 2011/0239696 A1 | 10/2011 | Takagi |
| 2014/0318176 A1 | 10/2014 | Takagi |
| 2015/0168047 A1 | 6/2015 | Danjyo et al. |

FOREIGN PATENT DOCUMENTS

| | | | |
|---|---|---|---|
| JP | 2006029697 A | | 2/2006 |
| JP | 2010091250 A | | 4/2010 |
| JP | 2010149814 A | | 7/2010 |
| JP | 2013217573 A | | 10/2013 |
| JP | 2013256262 A | | 12/2013 |
| JP | 2015007518 A | * | 1/2015 |
| JP | 2015010740 A | | 1/2015 |

\* cited by examiner

COLD STORAGE HEAT EXCHANGER

CROSS REFERENCE TO RELATED APPLICATION

This application is a U.S. National Phase Application under 35 U.S.C. 371 of International Application No. PCT/JP2016/077976 filed on Sep. 23, 2016 and published in Japanese as WO 2017/057174 A1 on Apr. 6, 2017. This application is based on and claims the benefit of priority from Japanese Patent Application No. 2015-195818 filed on Oct. 1, 2015 and Japanese Patent Application No. 2016-173410 filed on Sep. 6, 2016. The entire disclosures of all of the above applications are incorporated herein by reference.

TECHNICAL FIELD

The present disclosure relates to a cold storage heat exchanger to evaporate refrigerant, which configures a refrigerating cycle together with a compressor compressing and discharging refrigerant, a radiator cooling high-temperature refrigerant, and a decompressor decompressing the cooled refrigerant.

BACKGROUND ART

A refrigerating cycle apparatus has been conventionally used in an air conditioner. Many attempts have been made to provide a limited cooling operation even when the refrigerating cycle apparatus is in a stopped state. For example, in a vehicle air conditioner, a refrigerating cycle apparatus is driven by an engine for traveling. Thus, when the engine comes to a stop during a temporal stop of the vehicle, the refrigerating cycle apparatus also comes to a stop. There has been proposed a cold storage heat exchanger that includes a cold storage material added to an evaporator of a refrigerating cycle apparatus in order to provide a limited cooling operation during such a temporal stop of the vehicle. For example, a cold storage heat exchanger described in Patent Literature 1 is known.

PRIOR ART LITERATURES

Patent Literature

Patent Literature 1: JP 2010-91250 A

SUMMARY OF INVENTION

Typically, in a refrigerating cycle apparatus, a compressor for compressing and ejecting a refrigerant is present on the downstream side in the flow of the refrigerant relative to a cold storage heat exchanger. A return of the refrigerant in a liquid state to the compressor causes a failure. Thus, it is typically necessary to completely evaporate the refrigerant at an outlet of the cold storage heat exchanger. In the cold storage heat exchanger, the refrigerant forms a single gas layer near an outlet of a refrigerant passage, and the pressure thereof exceeds the saturated vapor pressure. As a result, there is a part where a refrigerant temperature rapidly transitions to a high temperature, that is, an overheated area. Further, when a flow rate of the refrigerant is low, there may be an imbalance in the flow of the refrigerant depending on the arrangement of the refrigerant passage inside the cold storage heat exchanger, which may form an overheated area in a part where the refrigerant is difficult to flow. In this manner, an overheated area may be present at any location on the refrigerant passage in the cold storage heat exchanger.

In the conventional cold storage heat exchanger described in Patent Literature 1, a cold storage material is typically disposed adjacent to a refrigerant tube that constitutes a refrigerant passage and cooled by a refrigerant flowing through the refrigerant tube. The inventor has made a close study and found out the following issue. When an overheated area is formed on a refrigerant tube, the temperature of a refrigerant in the overheated area becomes high. Thus, a cold storage material is less cooled due to the influence of the overheated area. As a result, a cold storage performance of the cold storage heat exchanger may be deteriorated.

It is an object of the present disclosure to provide a cold storage heat exchanger which can secure a cold storage performance, while there is an overheated area, by reducing influence of the overheated area.

According to an aspect of the present disclosure, a cold storage heat exchanger includes: a plurality of refrigerant tubes disposed at intervals, each of the refrigerant tubes including a refrigerant passage that allows a refrigerant to flow therethrough; a cold storage material adjacent to the refrigerant tubes; and a heat transfer suppressor that suppresses heat transfer from the refrigerant tubes to the cold storage material in an overheated area of the refrigerant formed in the refrigerant passage.

The above structure makes it possible to suppress heat transfer from the refrigerant tubes to the cold storage material in the overheated area of the refrigerant formed in the refrigerant passage. Thus, it is possible to avoid a situation in which the cold storage material is less cooled due to the influence of the overheated area where the refrigerant temperature becomes high. As a result, even when there is an overheated area, it is possible to ensure the cold storage performance by reducing the influence of the overheated area.

According to the present disclosure, a cold storage heat exchanger can be provided, which can secure a cold storage performance, while there is an overheated area, by reducing influence of the overheated area.

DESCRIPTION OF EMBODIMENTS

Hereinbelow, embodiments will be described with reference to the accompanying drawings. In order to facilitate the understanding of description, identical elements are designated by identical reference signs as far as possible throughout the drawings, and redundant description will be omitted.

First Embodiment

Figure 1:
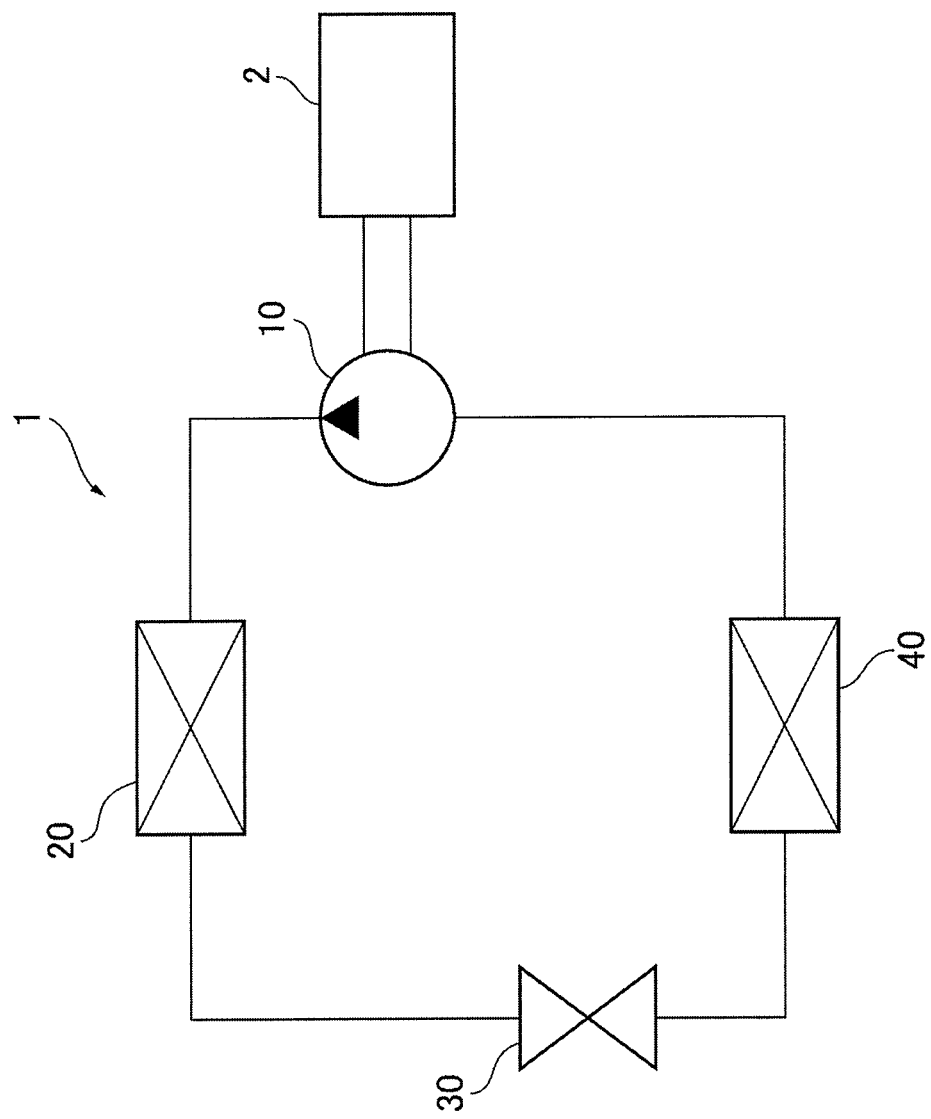
FIG. 1 is a block diagram illustrating a configuration of a refrigerating cycle apparatus which uses an evaporator as a cold storage heat exchanger according to a first embodiment.

A first embodiment will be described with reference to FIGS. 1 to 10. A refrigerating cycle apparatus 1 is used in a vehicle air conditioner. As illustrated in FIG. 1, the refrigerating cycle apparatus 1 includes a compressor 10, a radiator 20, a pressure reducer 30, and an evaporator 40. These components are annularly connected to each other through piping to constitute a refrigerant circulation passage. In the refrigerating cycle apparatus 1, a cold storage heat exchanger according to the first embodiment is used as the evaporator 40. In the following description, the cold storage heat exchanger 40 according to the present embodiment is also referred to as the "evaporator 40".

The compressor 10 is driven by an internal combustion engine which is a power source 2 for traveling of a vehicle. Thus, when the power source 2 comes to a stop, the compressor 10 also comes to a stop. The compressor 10 draws a refrigerant from the evaporator 40, compresses the drawn refrigerant, and ejects the compressed refrigerant to the radiator 20.

The radiator 20 cools the high-temperature refrigerant. The radiator 20 is also called a condenser. The pressure reducer 30 reduces the pressure of the refrigerant cooled by the radiator 20. The pressure reducer 30 may be provided as a fixed orifice, a temperature expansion valve, or an ejector.

The evaporator 40 evaporates the refrigerant with the pressure reduced by the pressure reducer 30 and cools a medium. The evaporator 40 cools air supplied to a vehicle cabin. The refrigerating cycle apparatus 1 may further include an internal heat exchanger which performs heat exchange between a high-pressure side liquid refrigerant and a low-pressure side gas refrigerant and a tank element such as a receiver or an accumulator which stores an excessive refrigerant. The power source 2 may be provided as an internal combustion engine or an electric motor.

Figure 2:
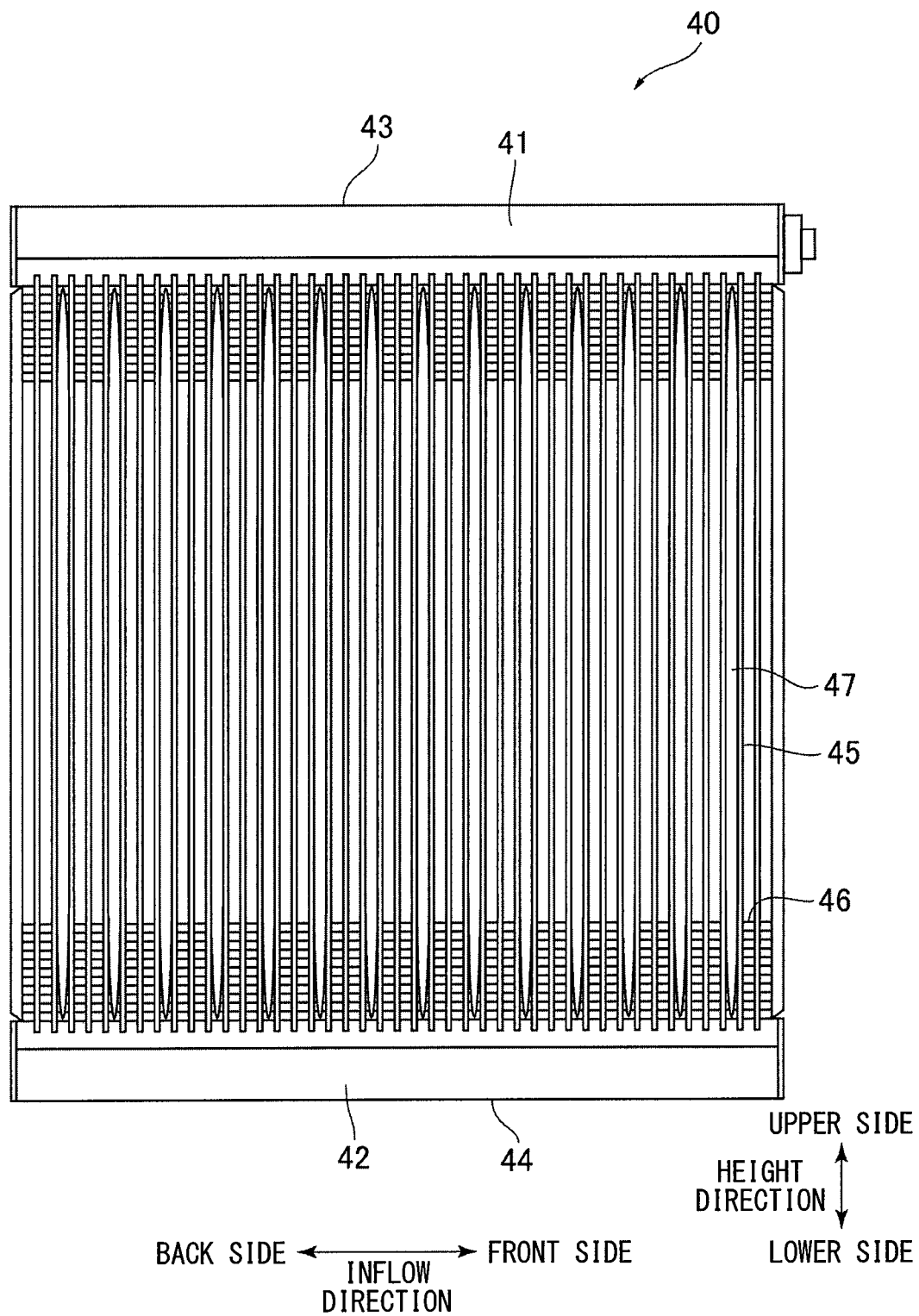
FIG. 2 is a plan view of the evaporator as the cold storage heat exchanger in FIG. 1.
Figure 3:
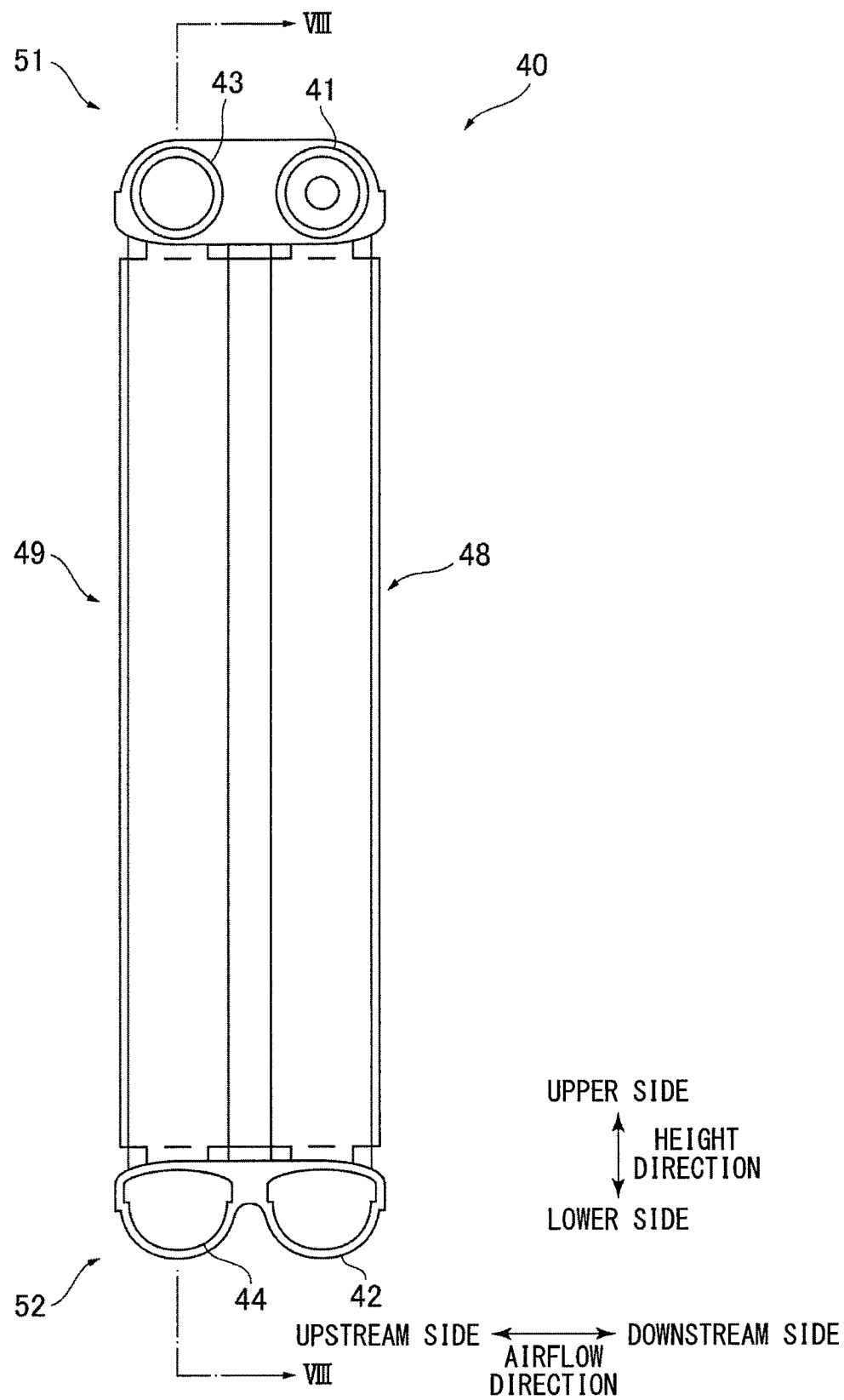
FIG. 3 is a side view of the evaporator as the cold storage heat exchanger in FIG. 1.

The structure of the evaporator 40 as the cold storage heat exchanger according to the first embodiment will be described with reference to FIGS. 2 to 10. In the following description, an up-down direction on the sheets of FIGS. 2 and 3 is referred to as a "height direction", an upper side in the height direction is referred to as an "upper side", and a lower side in the height direction is referred to as a "lower side". Although the height direction is typically the gravity direction, the height direction may be another direction. A right-left direction on the sheet of FIG. 2 is referred to as an "inflow direction" in which a refrigerant flows, a right side in the inflow direction is referred to as a "front side", and a left side in the inflow direction is referred to as a "back side". A right-left direction on the sheet of FIG. 3 is referred to as an "airflow direction" in which air flows through an air passage 53, a left side in the airflow direction is referred to as an "upstream side", and a right side in the airflow direction is referred to as a "downstream side".

In FIGS. 2 and 3, the evaporator 40 includes a refrigerant passage member which has a plurality of branches. The refrigerant passage member is provided as a passage member made of metal such as aluminum. The refrigerant passage member includes a first header 41, a second header 42, a third header 43, and a fourth header 44 which are positioned in pairs, and a plurality of refrigerant tubes 45 which couple the headers. The first header 41, the second header 42, the third header 43, and the fourth header 44 extend in the inflow direction. The refrigerant tubes 45 extend in the height direction which is perpendicular to the inflow direction.

In FIGS. 2 and 3, the first header 41 is paired with the second header 42. The first header 41 and the second header 42 are disposed apart from each other by a predetermined distance in the height direction and parallel to each other in the inflow direction. Also, the third header 43 is paired with the fourth header 44. The third header 43 and the fourth header 44 are disposed apart from each other by a predetermined distance in the height direction and parallel to each other in the inflow direction. The first header 41 and the third header 43 are disposed on the upper side in the height direction. The second header 42 and the fourth header 44 are disposed on the lower side in the height direction.

A plurality of refrigerant tubes 45 are arrayed at regular intervals between the first header 41 and the second header 42. Each of the refrigerant tubes 45 communicates with the inside of the first header 41 and the inside of the second header 42 at one end thereof. The first header 41, the second header 42, and the refrigerant tubes 45 disposed between the first header 41 and the second header 42 form a first heat exchange unit 48.

A plurality of refrigerant tubes 45 are arrayed at regular intervals between the third header 43 and the fourth header 44. Each of the refrigerant tubes 45 communicates with the inside of the third header 43 and the inside of the fourth header 44 at the other end thereof. The third header 43, the fourth header 44, and the refrigerant tubes 45 disposed between the third header 43 and the fourth header 44 form a second heat exchange unit 49.

As a result, the evaporator 40 includes the first heat exchange unit 48 and the second heat exchange unit 49 which are disposed in two layers. In the airflow direction, the second heat exchange unit 49 is disposed at the upstream side, and the first heat exchange unit 48 is disposed at the downstream side. The refrigerant tubes 45 are disposed in two rows in the inflow direction so as to be paired in the airflow direction.

Figure 4:
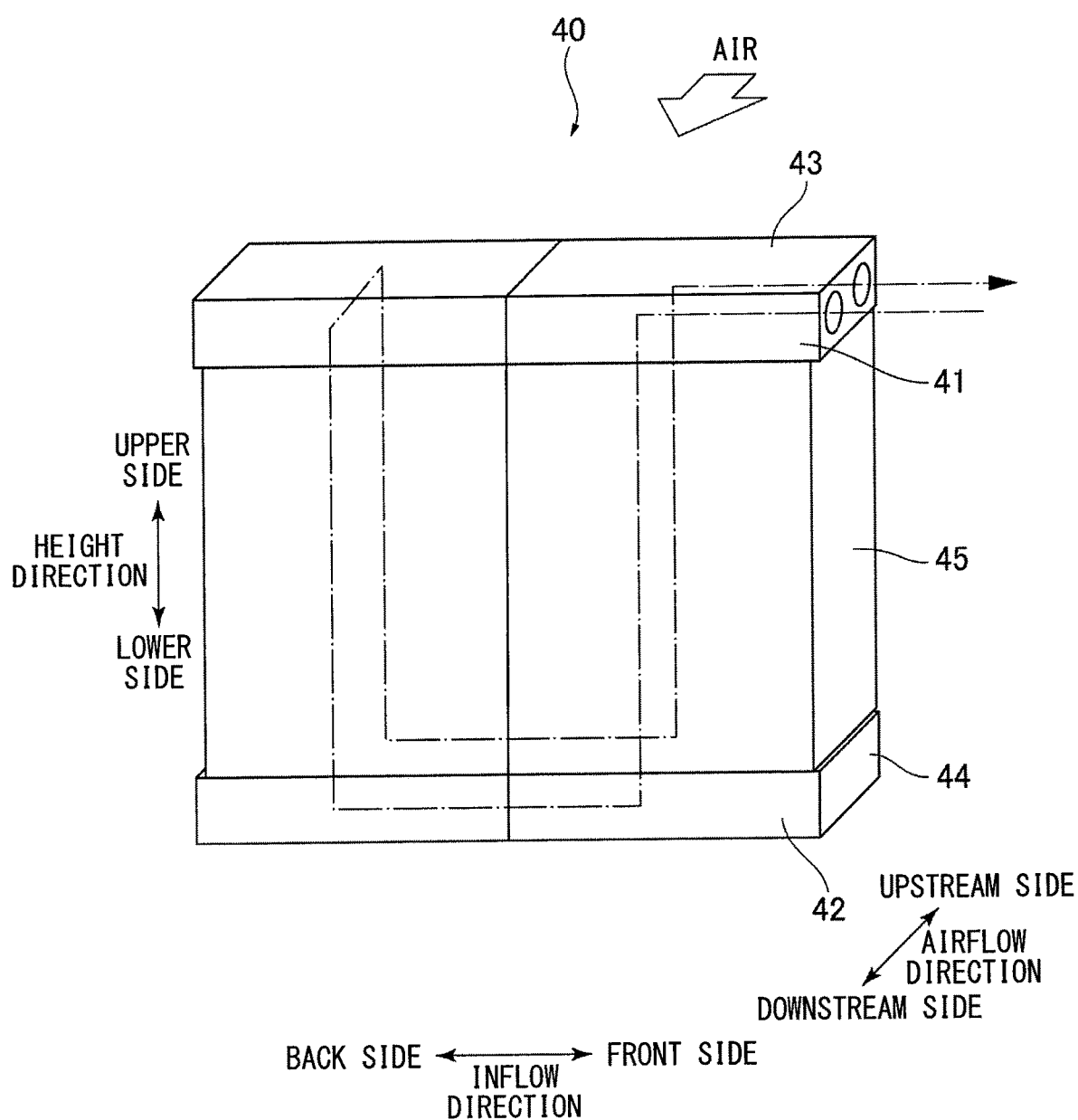
FIG. 4 is a diagram schematically illustrating a flow of refrigerant in the evaporator.
Figure 5:
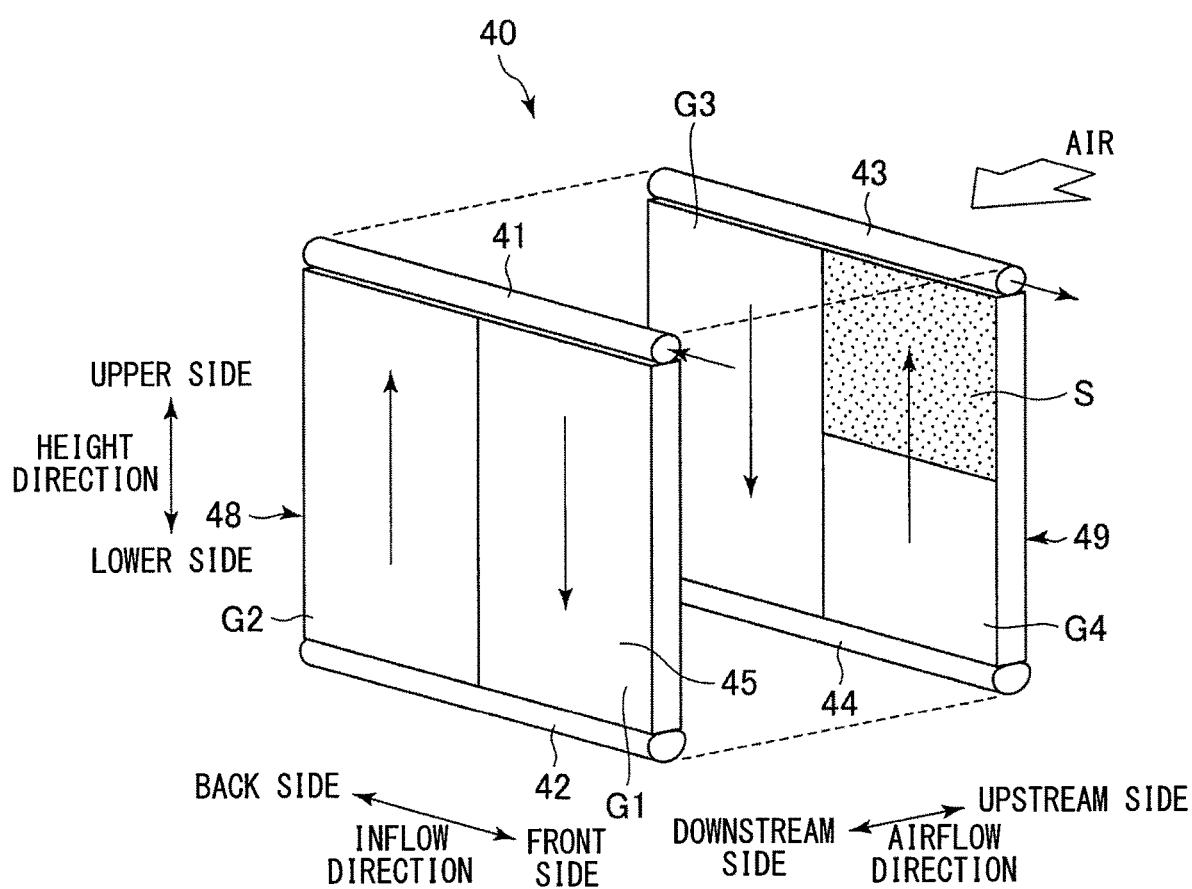
FIG. 5 is a schematic view of the evaporator exploded into an upstream side and a downstream side in an airflow direction.
Figure 6:
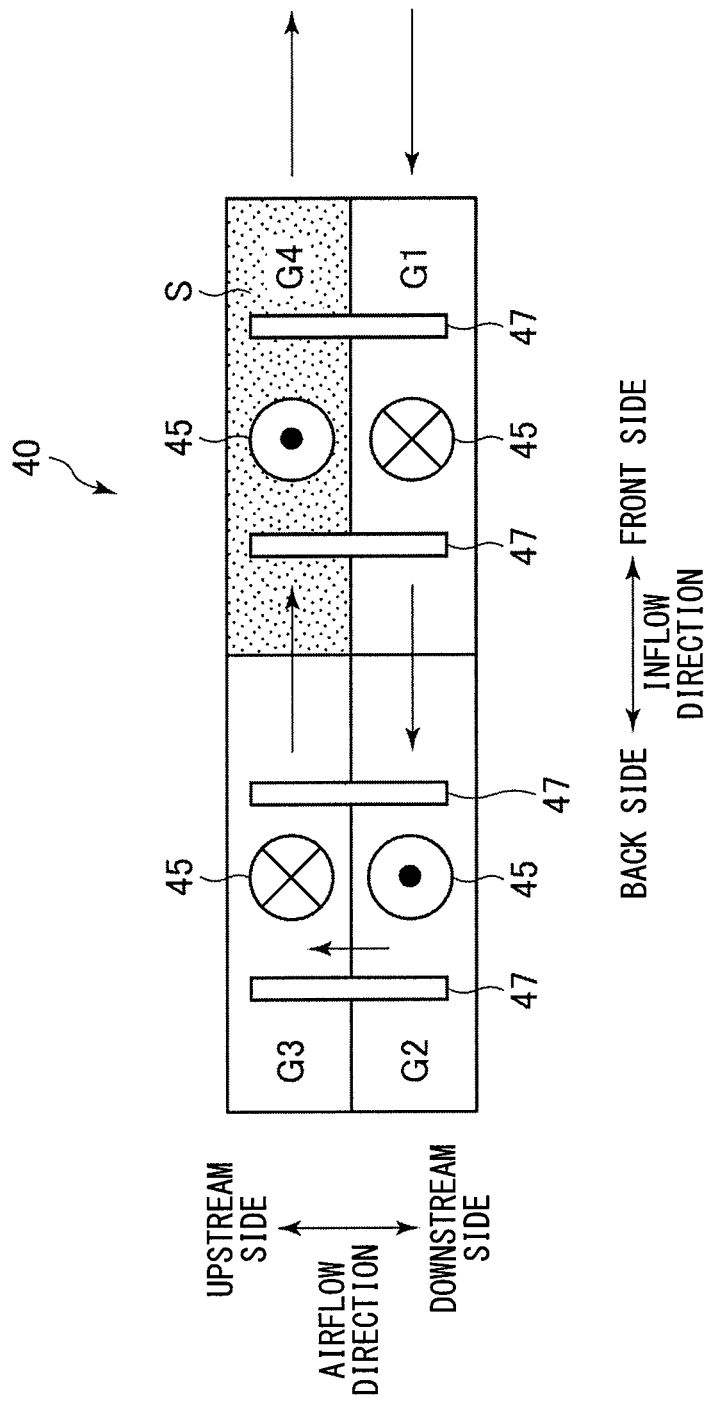
FIG. 6 is a plan view schematically illustrating the flow of refrigerant in the evaporator.

A joint as a refrigerant inlet is disposed at an end (the end at the front side in the inflow direction) of the first header 41. As illustrated in FIGS. 4 to 6, the inside of the first header 41 is partitioned into a first section and a second section by a partition plate which is disposed at substantially the center in the length direction (inflow direction) of the first header 41. Correspondingly, the refrigerant tubes 45 are divided into a first group G1 corresponding to the first section and a second group G2 corresponding to the second section.

The refrigerant is supplied to the first section of the first header 41. The refrigerant is distributed to the refrigerant tubes 45 belonging to the first group G1 from the first section. The refrigerant flows into the second header 42 through the refrigerant tubes 45 of the first group G1 so as to be collected in the second header 42. The refrigerant is redistributed to the refrigerant tubes 45 belonging to the second group G2 from the second header 42. The refrigerant flows into the second section of the first header 41 through the refrigerant tubes 45 of the second group G2. In this manner, a U-shaped flow passage for the refrigerant is formed in the first heat exchange unit 48.

A joint as a refrigerant outlet is disposed at an end (the end at the front side in the inflow direction in the present embodiment, but may be an end at the back side) of the third header 43. As illustrated in FIGS. 4 to 6, the inside of the third header 43 is partitioned into a first section and a second section by a partition plate which is disposed at substantially the center in the length direction of the third header 43. The first section of the third header 43 is adjacent to the second section of the first header 41. The first section of the third header 43 communicates with the second section of the first header 41. Correspondingly, the refrigerant tubes 45 are divided into a third group G3 corresponding to the first section and a fourth group G4 corresponding to the second section.

The refrigerant flows into the first section of the third header 43 from the second section of the first header 41. The refrigerant is distributed to the refrigerant tubes 45 belonging to the third group G3 from the first section. The refrigerant flows into the fourth header 44 through the refrigerant tubes 45 of the third group G3 so as to be collected in the fourth header 44. The refrigerant is redistributed to the refrigerant tubes 45 belonging to the fourth group G4 from the fourth header 44. The refrigerant flows into the second section of the third header 43 through the refrigerant tubes 45 of the fourth group G4. In this manner, a U-shaped flow passage for the refrigerant is formed in the second heat exchange unit 49. The refrigerant inside the second section of the third header 43 flows out of the refrigerant outlet and flows toward the compressor 10.

Figure 8:
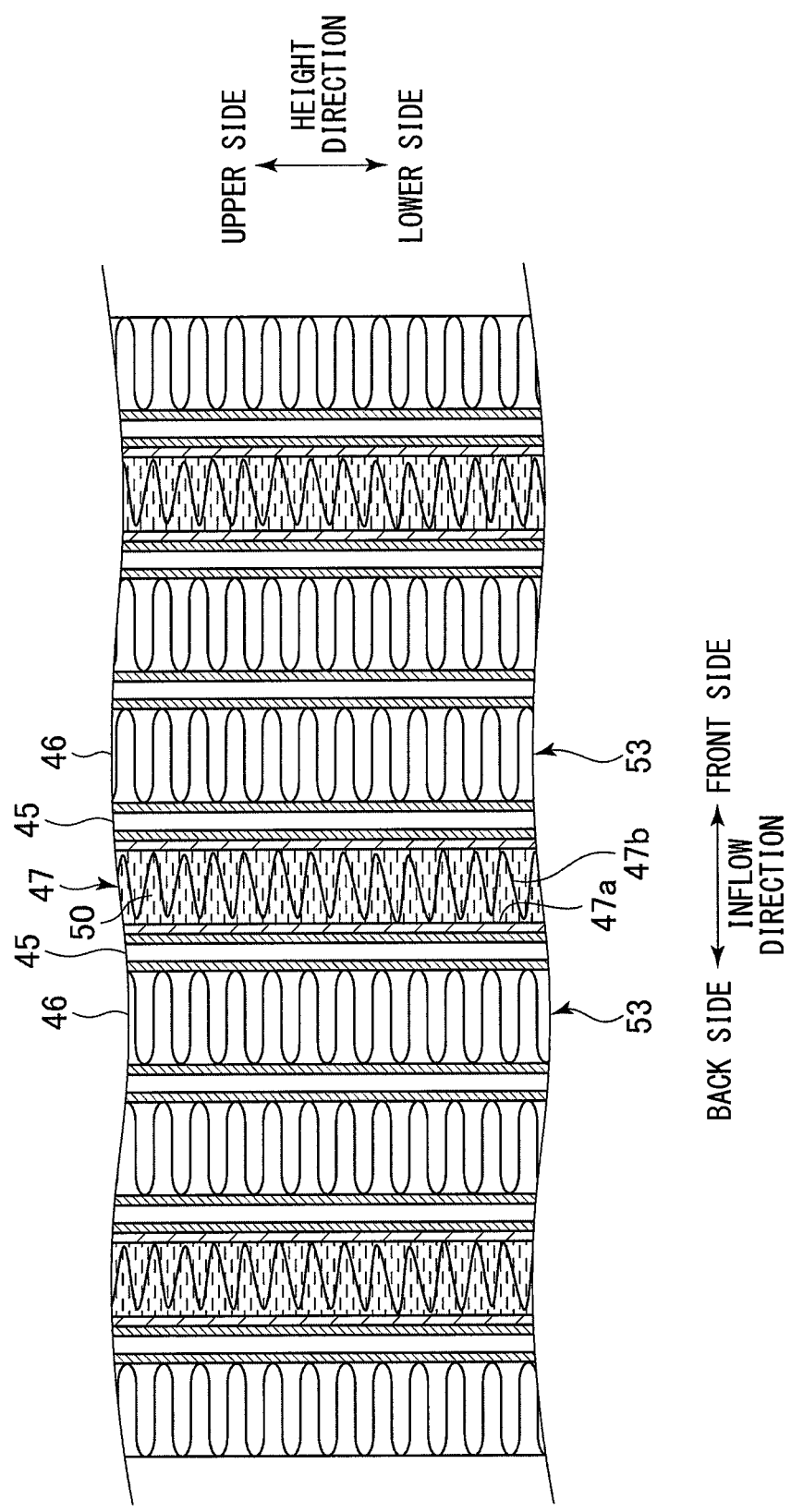
FIG. 8 is a sectional view taken along a line VIII-VIII in FIG. 3 illustrating cold storage material containers, refrigerant tubes, and air passages.

In the present embodiment, the refrigerant tube 45 is a multi-hole tube which includes a plurality of refrigerant passages inside thereof. The refrigerant tube 45 is also called a flat tube. The multi-hole tube can be obtained by an extrusion method or a method of bending and forming a plate. The refrigerant passages extend in the longitudinal direction of the refrigerant tube 45, and are open on both ends of the refrigerant tube 45. The refrigerant tubes 45 are arranged in rows. In each of the rows, the refrigerant tubes 45 are disposed with the principal faces thereof facing each other. As illustrated in FIG. 8, the air passage 53 for heat exchange with air or a storage area for storing a cold storage material container 47 (described below) is formed between each adjacent two of the refrigerant tubes 45.

The evaporator 40 includes a fin member for increasing the contact area with air supplied to the vehicle cabin. The fin member is provided as a plurality of fins 46 each having a corrugated shape. Each of the fins 46 is disposed in the air passage 53 which is formed between two adjacent refrigerant tubes 45. The fin 46 is thermally coupled to the two adjacent refrigerant tubes 45. The fin 46 is joined to the two adjacent refrigerant tubes 45 with a joining material that is excellent in heat transfer. A brazing material can be used as the joining material. The fin 46 is made of a thin metal plate, such as a thin aluminum plate, which is formed into a wave shape. The fin 46 includes an air passage called a louver.

The evaporator 40 further includes a plurality of cold storage material containers 47. The cold storage material container 47 is made of metal such as aluminum. The cold storage material container 47 has a flat tubular shape. The cold storage material container 47 forms a chamber for storing a cold storage material 50 inside thereof by joining two plates having a hollow shape. The cold storage material container 47 includes wide principal faces at both sides thereof. Further, two principal walls which form the respective two principal faces are parallel to the refrigerant tubes 45. The cold storage material container 47 is disposed between two adjacent refrigerant tubes 45.

The cold storage material container 47 is disposed between the two refrigerant tubes 45 which are adjacent to each other in the inflow direction. The cold storage material container 47 is thermally coupled to the two refrigerant tubes 45 disposed on both sides thereof. The cold storage material container 47 is joined to the two adjacent refrigerant tubes 45 with a joining material that is excellent in heat transfer. A brazing material or a resin material such as an adhesive can be used as the joining material. The cold storage material container 47 is brazed to the refrigerant tubes 45. The brazing material is disposed between the cold storage material container 47 and each of the refrigerant tubes 45 so as to couple the cold storage material container 47 and the refrigerant tubes 45 through a large sectional area.

As the brazing material, a material clad with a brazing material may be used, or a brazing material foil may be disposed between the cold storage material container 47 and each of the refrigerant tubes 45. As a result, excellent heat transfer is exhibited between the cold storage material container 47 and the refrigerant tubes 45. The surface of the cold storage material container 47 may have recesses and projections, and the projections may be joined to the refrigerant tubes 45.

In FIGS. 2 and 8, the refrigerant tubes 45 are arranged at substantially regular intervals. A plurality of spaces are formed between the refrigerant tubes 45. The fins 46 and the cold storage material containers 47 are arranged in the spaces with a predetermined regularity. FIGS. 2 and 8 illustrate a structure in which two fins 46 (air passages 53) and one cold storage material container 47 are repeatedly arranged in this order. However, an arrangement other than the illustrated arrangement may be employed. Some of the spaces serve as the air passages 53. The remaining spaces serve as the storage areas. The fins 46 are disposed in the respective air passages 53. The cold storage material containers 47 are disposed in the respective storage areas. Each of two refrigerant tubes 45 that are located on both sides of the cold storage material container 47 defines the air passage for heat exchange with air at the side opposite to the cold storage material container 47. In another point of view, two refrigerant tubes 45 are disposed between two fins 46, and one cold storage material container 47 is further disposed between the two refrigerant tubes 45. It is possible to transfer heat of the refrigerant to the cold storage material 50 without receiving a heat load of air flowing through the fin 46 by the cold storage material container 47 disposed between the two refrigerant tubes 45. Thus, the cold storage efficiency is improved.

One cold storage material container 47 and two refrigerant tubes 45 located on both sides of the cold storage material container 47 constitute one cold storage unit. A plurality of cold storage units having the same structure are arranged on the evaporator 40. The cold storage units are arranged at regular intervals. Further, the cold storage units are equally arranged right and left. Furthermore, the cold storage units are symmetrically arranged right and left.

Figure 9:
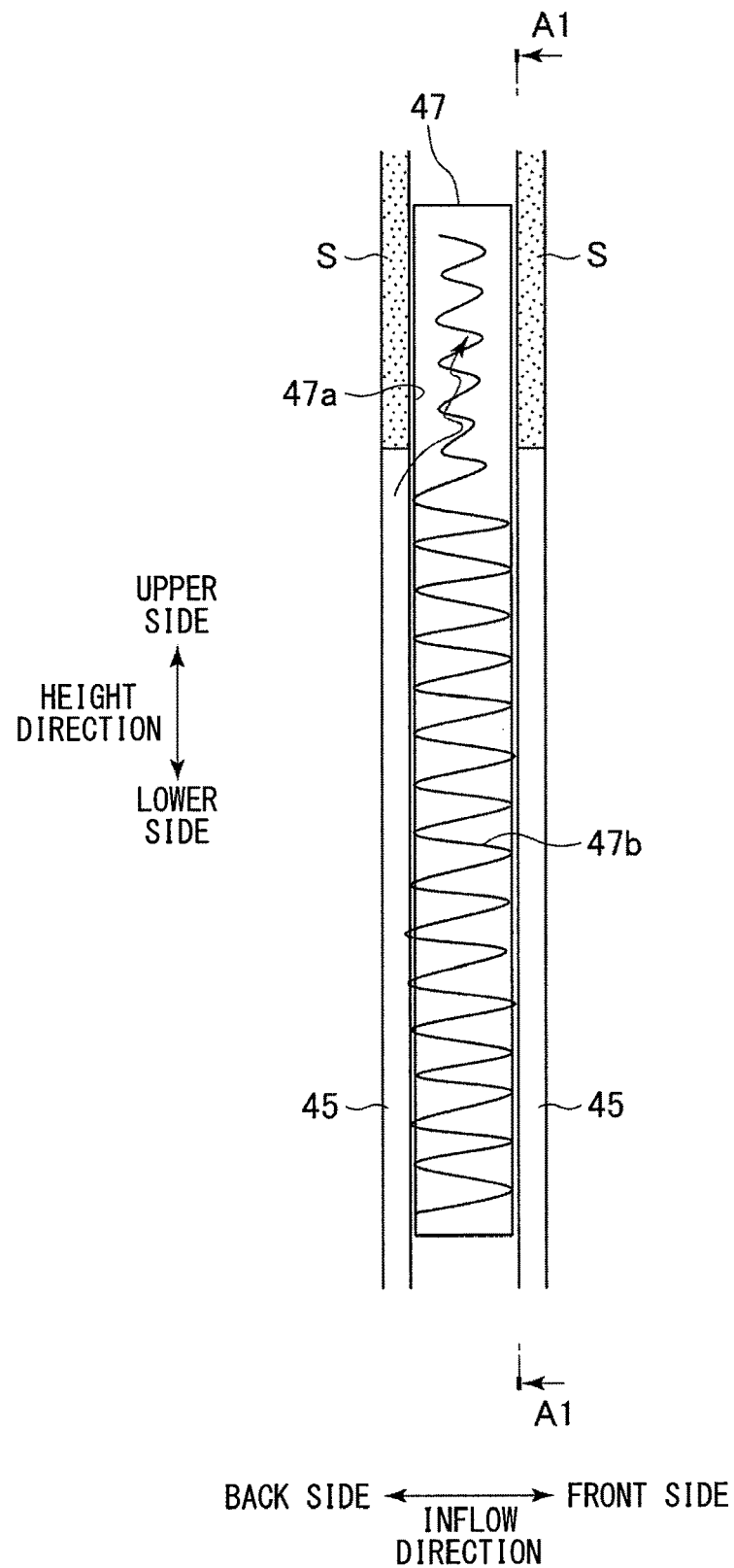
FIG. 9 is a sectional view schematically illustrating the shape of an inner fin which functions as a heat transfer suppressor.
Figure 10:
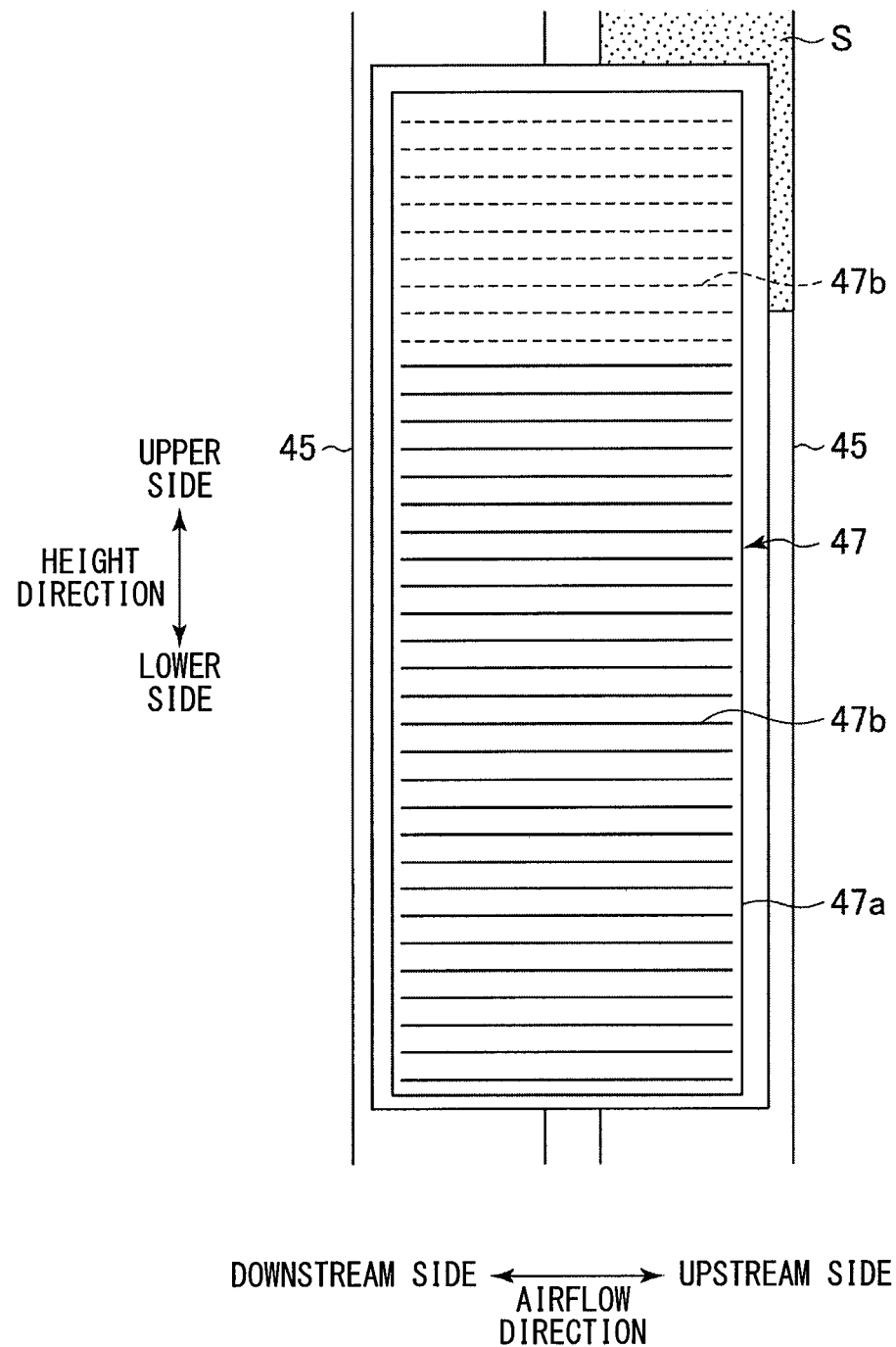
FIG. 10 is a sectional view taken along a line A1-A1 in FIG. 9.

As illustrated in FIG. 10, the cold storage material container 47 is joined to both of the refrigerant tubes 45 of the first heat exchange unit 48 and the second heat exchange unit 49 in the airflow direction. As illustrated in FIG. 8, the cold storage material container 47 includes an outer shell 47a. The outer shell 47a is made of a plate material which is formed into a flat tubular shape. An inner fin 47b having a corrugated shape is stored in the outer shell 47a. The inner fin 47b is made of a metal plate, such as a thin aluminum plate, which is formed into a wave shape like the fin 46. A plurality of tops of the inner fin 47b are brazed to the inner faces of principal walls (the walls whose outer surfaces are principal faces joined to the refrigerant tubes 45) on both sides in the inflow direction of the outer shell 47a. As illustrated in FIGS. 9 and 10, the inner fin 47b extends in the longitudinal direction (height direction) of the cold storage material container 47. Peaks and valleys of the inner fin 47b extend in the airflow direction. With such a structure, the inner fin 47b increases the contact area between the cold storage material 50 and the cold storage material container 47. Details of the shape of the inner fin 47b will be described below.

Hereinbelow, the first header 41 is also referred to as an inlet side passage which includes an inlet of the refrigerant passage. Similarly, the third header 43 is also referred to as an outlet side passage which includes an outlet of the refrigerant passage. The first header 41 and the third header 43 are disposed in parallel in the airflow direction at the same position in the height direction and collectively referred to as a first header tank 51. Similarly, the second header 42 and the fourth header 44 are disposed in parallel in the airflow direction at the same position in the height direction and collectively referred to as a second header tank 52.

As schematically illustrated in FIGS. 4 to 6, a refrigerant flowing into the first section of the first header 41 flows into the first section of the second header 42 through the refrigerant tubes 45 of the first group G1 (first turn). The refrigerant flowing into the first section of the second header 42 flows into the second section of the second header 42. The refrigerant flowing into the second section of the second header 42 flows into the second section of the first header 41 through the refrigerant tubes 45 of the second group G2 (second turn). The second section of the first header 41 and the second section of the third header 43 communicate with each other. Thus, the refrigerant flowing into the second section of the first header 41 flows into the second section of the third header 43. The refrigerant flowing into the second section of the third header 43 flows into the second section of the fourth header 44 through the refrigerant tubes 45 of the third group G3 (third turn). The refrigerant flowing into the second section of the fourth header 44 flows into the first section of the fourth header 44. The refrigerant flowing into the first section of the fourth header 44 flows into the first section of the third header 43 through the refrigerant tubes 45 of the fourth group G4 (fourth turn). The refrigerant flowing into the first section of the third header 43 flows out to the outside. That is, the evaporator 40 of the present embodiment is configured to include a so-called four-turn type refrigerant passage.

Figure 7:
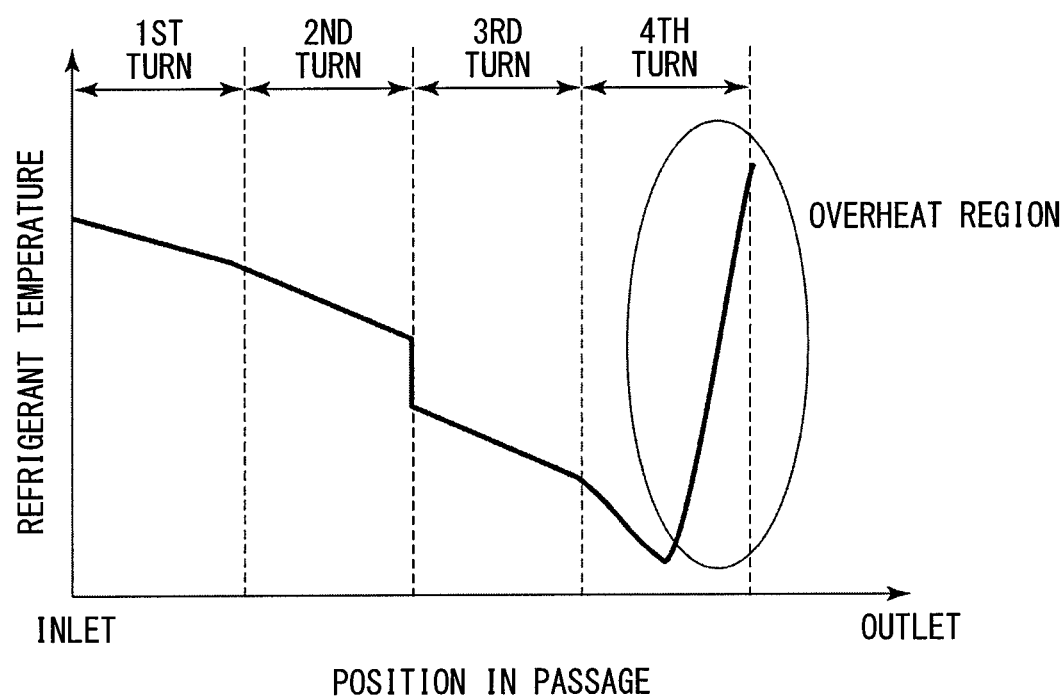
FIG. 7 is a graph showing a transition of a refrigerant temperature in a refrigerant passage inside the evaporator.

As illustrated in FIG. 1, in the refrigerating cycle apparatus 1, the compressor 10 for compressing and ejecting the refrigerant is typically present on the downstream side in the flow of the refrigerant relative to the evaporator 40. A return of the refrigerant in a liquid state to the compressor 10 causes a failure. Thus, it is typically necessary to completely evaporate the refrigerant at an outlet of the evaporator 40. Accordingly, the refrigerant forms a single gas layer near the outlet of the refrigerant passage, and the pressure thereof exceeds the saturated vapor pressure. As a result, there is a part where a refrigerant temperature rapidly transitions to a high temperature, that is, an overheated area S. FIG. 7 illustrates an example of the characteristics of the refrigerant temperature in the four-turn type refrigerant passage. The horizontal axis of FIG. 7 represents the position in the refrigerant passage. The left side (an origin point side) of the horizontal axis corresponds to the inlet, and the right side thereof corresponds to the outlet. The vertical axis of FIG. 7 represents the refrigerant temperature in each passage position. As illustrated in FIG. 7, the refrigerant temperature decreases after the refrigerant is introduced into the refrigerant passage. However, the refrigerant temperature rapidly transitions to a high temperature at a substantially intermediate position in the fourth turn (that is, the fourth group G4), and the overheated area S is formed in a part thereafter. For example, as illustrated in FIG. 5, the overheated area S is formed in a substantially half area on the upper side in the height direction in the refrigerant tubes 45 of the fourth group G4.

As illustrated in FIG. 10, the cold storage material container 47 is joined to both of the refrigerant tubes 45 of the first heat exchange unit 48 and the second heat exchange unit 49 in the airflow direction. Thus, in a conventional cold storage material container 47, cold storage is interrupted at the refrigerant tubes 45 of the fourth group G4, due to the influence of the overheated area S, that is, cold storage is interrupted only in the cold storage material 50 in a part that is in contact with the refrigerant tubes 45 on the upstream side in the airflow direction. Thus, there is a difference in cooling of the cold storage material 50 inside the cold storage material container 47 between the upstream side and the downstream side in the airflow direction. Accordingly, there may be a difference in a blowout temperature between the back side and the front side in the inflow direction (that is, between an area that does not include the overheated area S and an area that includes the overheated area S) during cold release.

In view of the above issue, in the present embodiment, as illustrated in FIGS. 9 and 10, the inner fin 47b has a shape that is not joined to the cold storage material container 47 in the overheated area S of the refrigerant. In other words, in the cold storage material container 47 which is joined to the refrigerant tube 45 having the overheated area S, the inner fin 47b is not joined to the inner wall surface of the outer shell 47a of the cold storage material container 47 in a part that is in contact with the overheated area S of the refrigerant tube 45 and is joined to the inner wall surface in a part that is in contact with an area other than the overheated area S of the refrigerant tube 45. In FIG. 10, a part where the tops of the inner fin 47b are joined to the cold storage material container 47 is indicated by solid lines, and a part where the tops of the inner fin 47b are not joined to the cold storage material container 47 is indicated by dotted lines.

Further, the above structure can be reworded as follows. In the evaporator 40, the plurality of refrigerant tubes 45 include at least two refrigerant tubes 45 disposed in the airflow direction of air in the air passages 53. The cold storage material container 47 is joined to the at least two refrigerant tubes 45 disposed in the airflow direction. In this case, the joined part may have recesses and projections, and the projections may be joined to the refrigerant tubes 45. The inner fin 47b overlaps the at least two refrigerant tubes 45 when viewed in an array direction of the refrigerant tubes 45 and the cold storage material container 47 (inflow direction). The cold storage material container 47 which is joined to the at least two refrigerant tubes 45 including the refrigerant tube 45 having the overheated area S includes a part that is in contact with the overheated area S of the refrigerant tube 45. When viewed in the airflow direction, the inner fin 47b is not joined to the inner wall of the cold storage material container 47 in an area that overlaps the part, and is joined to the inner wall of the cold storage material container 47 in the other area.

With the above structure, the inner fin 47b is not joined to the cold storage material container 47, that is, the refrigerant tubes 45 in the overheated area S. Thus, heat from the overheated refrigerant is less likely to be transferred to the inside of the cold storage material 50. Further, the inner fin 47b itself is disposed (is floating) inside the cold storage material container 47 also in the overheated area S. Thus, cold of the refrigerant in a non-overheated area is transferred also to the cold storage material 50 in the overheated area through the inner fin 47b. In this manner, it is possible to reduce the transfer of heat in the overheated area to the cold storage material 50 present in the overheated area S and also possible to transfer cold in the non-overheated area to the cold storage material 50 present in the overheated area S. Thus, even when there is the overheated area S in the refrigerant passage, it is possible to cool the cold storage material 50 inside the cold storage material container 47 in an excellent manner. Accordingly, it is possible to eliminate such an inconvenience that the cold storage material 50 inside the cold storage material container 47 in the overheated area S is not cooled and there is a temperature distribution inside the evaporator (evaporator 40) during cold release, or, in the first place, cold storage cannot be performed due to the influence of the overheated area.

That is, in the first embodiment, the inner fin 47b is not joined to the cold storage material container 47 in the overheated area S. Accordingly, the inner fin 47b functions as a "heat transfer suppressor" which suppresses heat transfer from the refrigerant tube 45 to the cold storage material 50 in the overheated area S which is formed by evaporation of the refrigerant near the outlet of the refrigerant passage. Further, the inner fin 47b having such a structure makes it possible to suppress heat transfer from the refrigerant tube 45 to the cold storage material 50 in the overheated area S and avoid a situation in which the cold storage material 50 is less cooled due to the influence of the overheated area S where the refrigerant temperature becomes high. As a result, the evaporator 40 as the cold storage heat exchanger of the first embodiment is capable of ensuring the cold storage performance by reducing the influence of the overheated area S even when there is the overheated area S.

Modifications of First Embodiment

Figure 11:
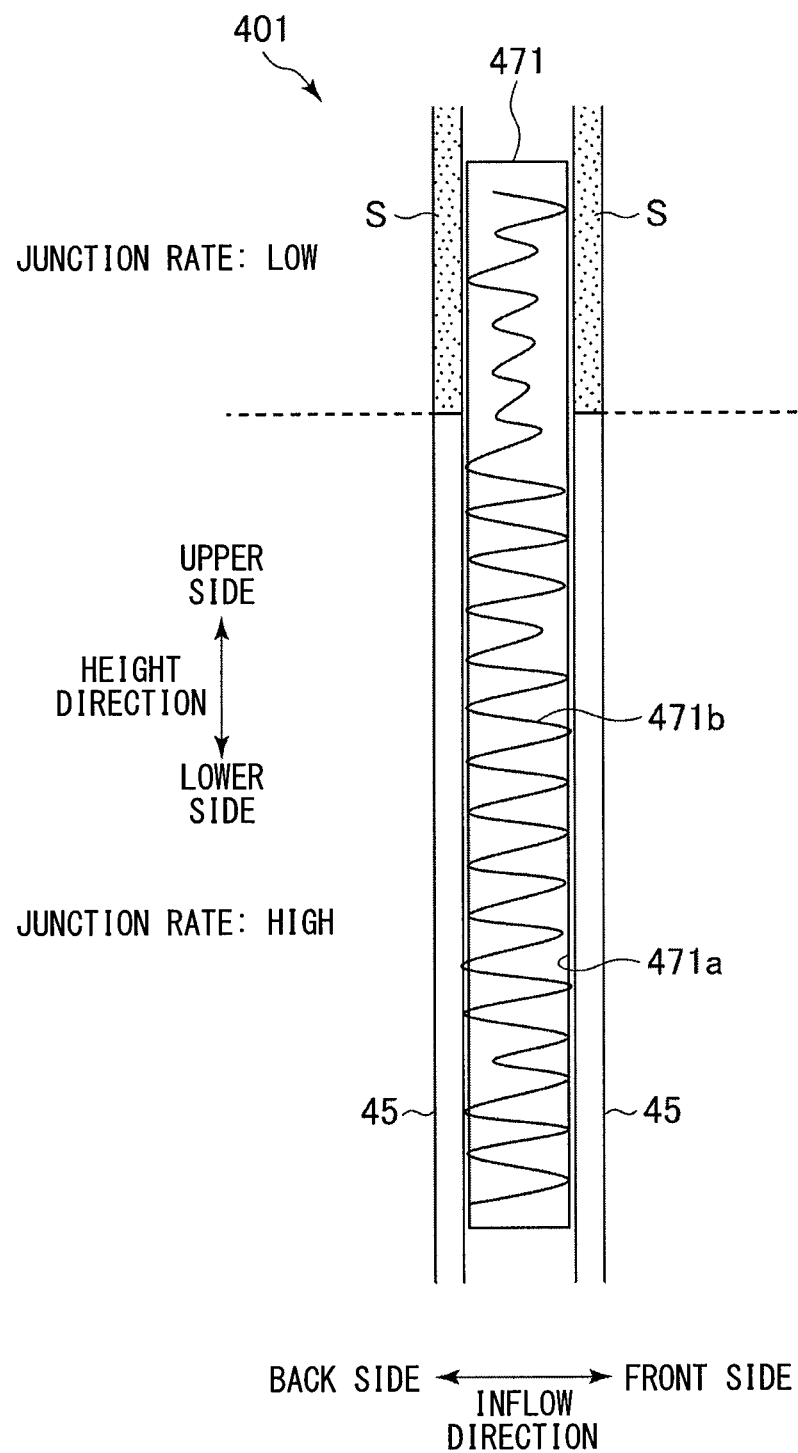
FIG. 11 is a sectional view schematically illustrating a modification of the shape of the inner fin.

A modification of the first embodiment will be described with reference to FIGS. 11 to 20. In the first embodiment, in the evaporator 40, the inner fin 47b is not joined to the inner wall surface of the outer shell 47a of the cold storage material container 47 in the part that is in contact with the overheated area S of the refrigerant tube 45 and is joined to the inner wall surface in the part that is in contact with the area other than the overheated area S of the refrigerant tube 45. However, there may be employed another structure that makes a heat transfer amount from the refrigerant tube 45 to the cold storage material 50 through the inner fin 47b in the overheated area S relatively smaller than a heat transfer amount in an area other than the overheated area S. In other words, it may only be required to make the heat transfer performance of the inner fin 47b in the overheated area S relatively lower than that in the other part. For example, as illustrated in FIG. 11, in an evaporator 401, an inner fin 471b may be joined to an inner wall surface of an outer shell 471a of a cold storage material container 471 with a relatively low joining ratio in a part that is in contact with the overheated area S of the refrigerant tube 45 and joined to the inner wall surface with a relatively high joining ratio in a part that is in contact with an area other than the overheated area S of the refrigerant tube 45. The "relatively low joining ratio" indicates that the number of peaks and valleys of the inner fin 471b that are joined to the inner wall surface of the outer shell 471a is relatively small. The "relatively high joining ratio" indicates that the number of peaks and valleys of the inner fin 471b that are joined to the inner wall surface of the outer shell 471a is relatively large. The evaporator 401 is capable of suppressing heat transfer from the refrigerant tube 45 to the cold storage material 50 in the overheated area S by making the heat transfer amount through the inner fin 471b in the overheated area S relatively small or making the joining ratio between the inner fin 471b and the cold storage material container 471 relatively low in this manner. As a result, it is possible to obtain an effect similar to the effect of the evaporator 40 of the first embodiment.

Figure 12:
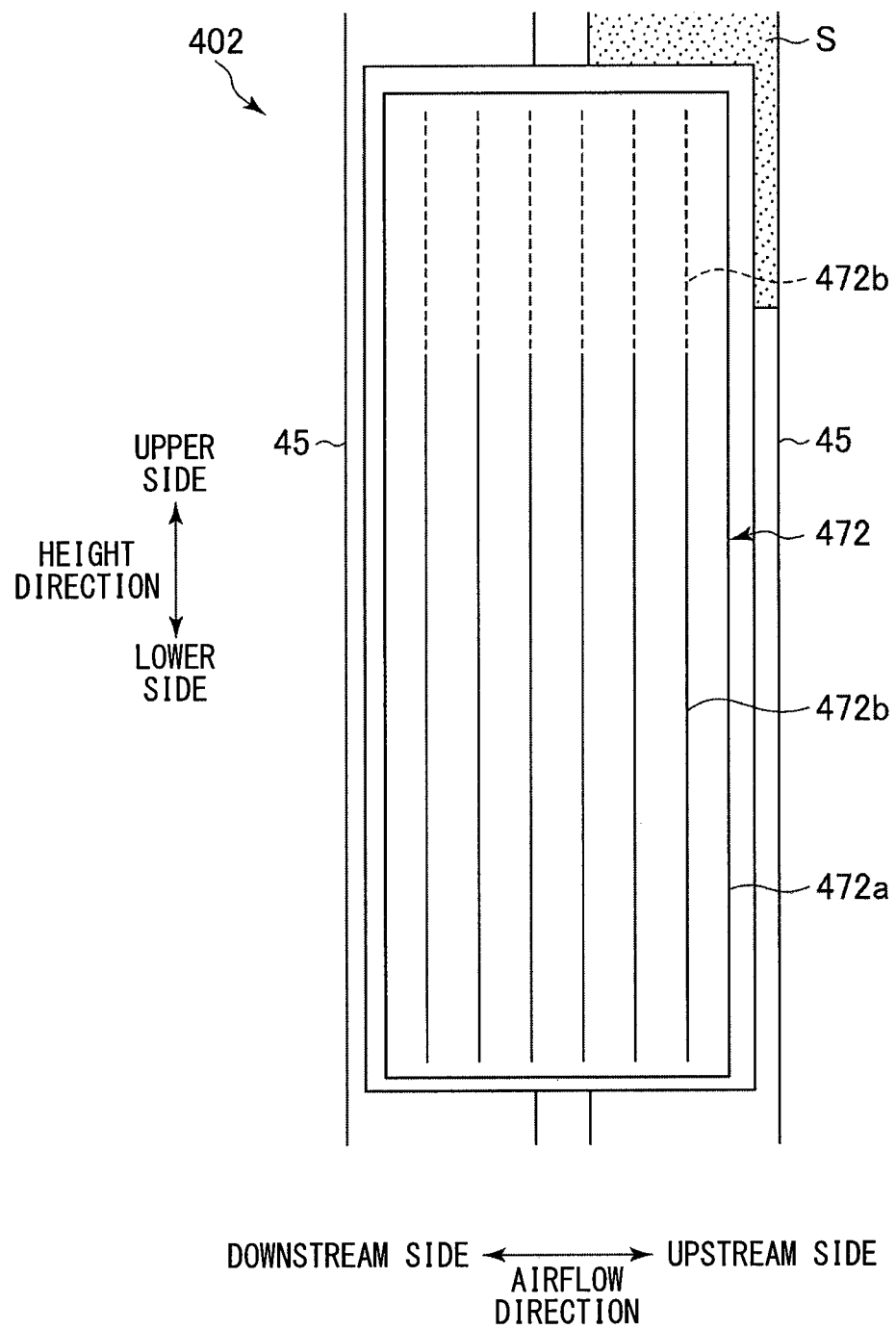
FIG. 12 is a sectional view schematically illustrating a modification of the shape of the inner fin.

In the first embodiment, in the evaporator 40, the corrugated shape of the inner fin 47b is continuous in the longitudinal direction (height direction) of the cold storage material container 47, that is, the peaks and the valleys of the inner fin 47b extend in the airflow direction. However, the corrugated shape of the inner fin 47b may be continuous in a direction different from the above direction. For example, as illustrated in FIG. 12, in an evaporator 402, the corrugated shape of an inner fin 472b may be continuous in the short direction (airflow direction) of a cold storage material container 472, that is, peaks and valleys of the inner fin 472b may extend in the height direction. In this case, the peaks and valleys of the inner fin 472b are not joined to an inner wall surface of an outer shell 472a of the cold storage material container 472 in a part that is in contact with the overheated area S of the refrigerant tube 45 in the height direction and are joined to the inner wall surface in a part that is in contact with an area other than the overheated area S of the refrigerant tube 45. Accordingly, the evaporator 402 is capable of suppressing heat transfer from the refrigerant tube 45 to the cold storage material 50 in the overheated area S. As a result, it is possible to obtain an effect similar to the effect of the evaporator 40 of the first embodiment.

Figure 13:
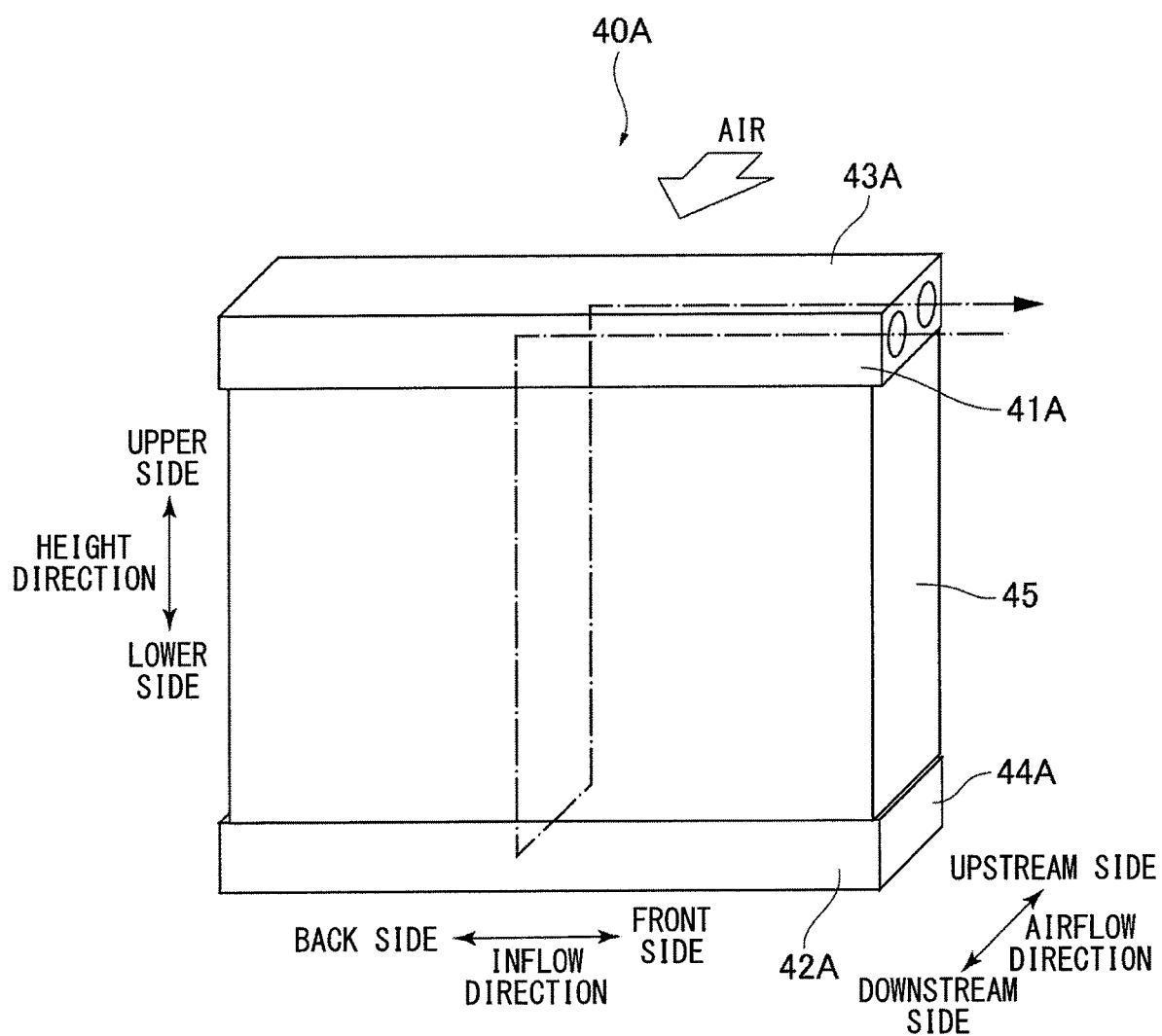
FIG. 13 is a diagram illustrating an example in which the flow of refrigerant differs from that illustrated in FIG. 4.
Figure 14:
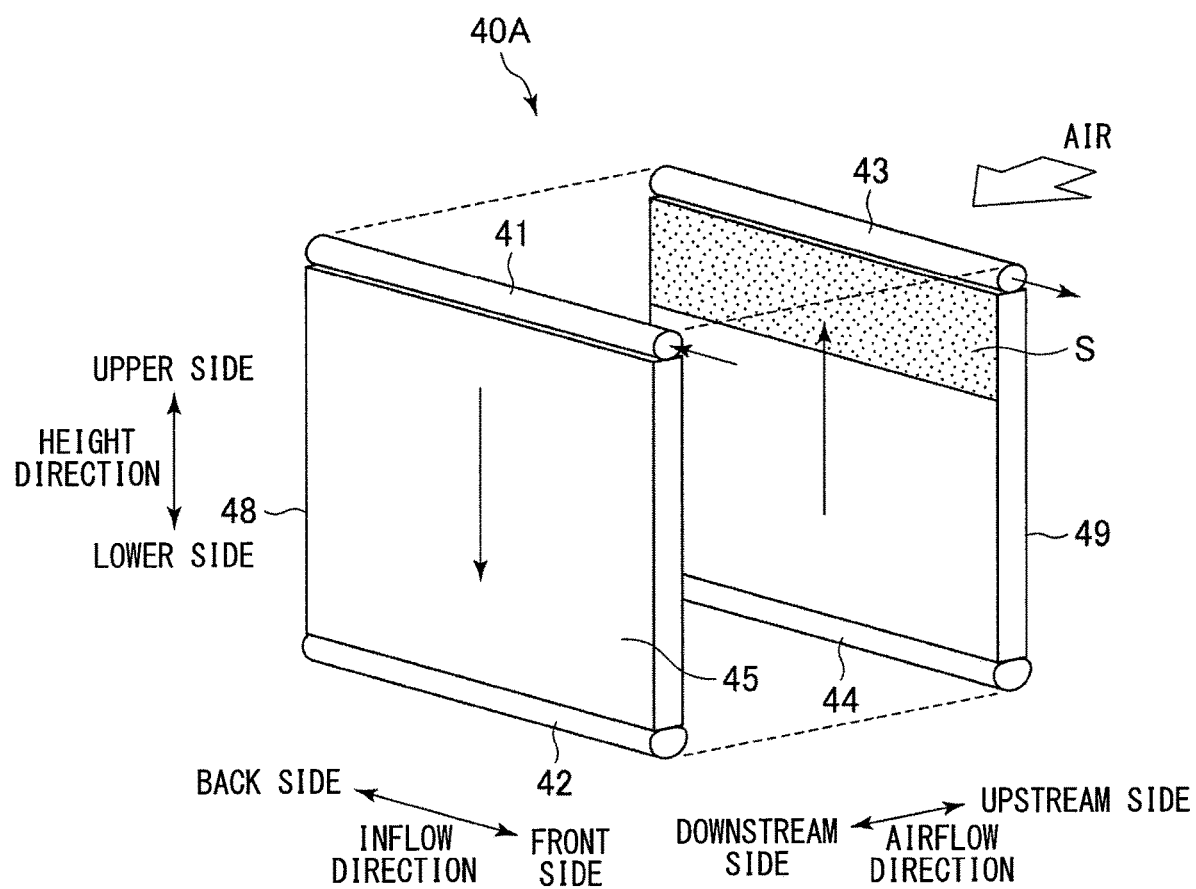
FIG. 14 is a schematic view of an evaporator illustrated in FIG. 13 exploded into the upstream side and the downstream side in the airflow direction.
Figure 15:
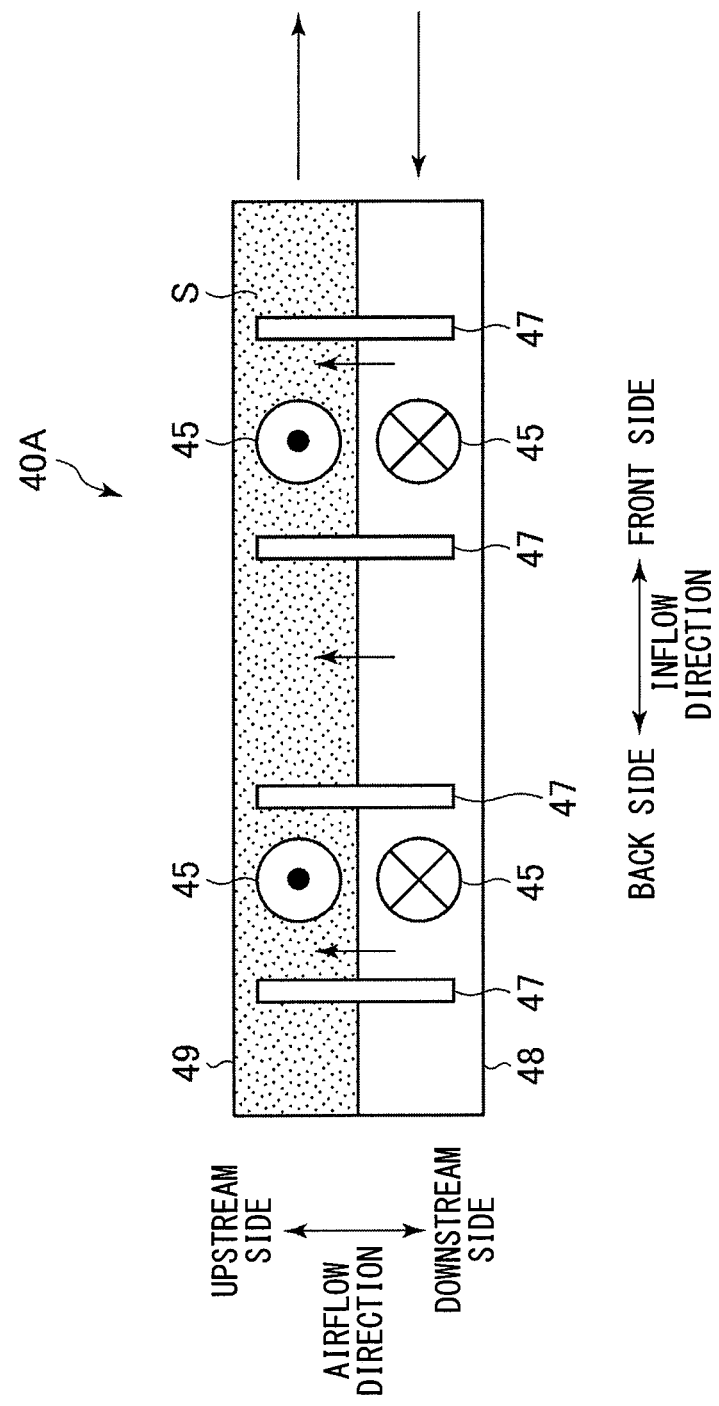
FIG. 15 is a plan view schematically illustrating the flow of refrigerant in the evaporator illustrated in FIG. 13.

In the first embodiment, the four-turn type has been described as an example of the structure of the refrigerant passage inside the evaporator 40. However, the present disclosure is not limited thereto. For example, as illustrated in FIGS. 13 to 15, there may be no section inside a first header 41A, a second header 42A, a third header 43A, and a fourth header 44A. In a cold storage heat exchanger 40A illustrated in FIGS. 13 to 15, a refrigerant flowing into the first header 41A flows into the second header 42A through the refrigerant tubes 45 of the first heat exchange unit 48 (first turn). The second header 42A and the fourth header 44A communicate with each other. Thus, the refrigerant flowing into the second header 42A flows into the fourth header 44A. The refrigerant flowing into the fourth header 44A flows into the third header 43A through the refrigerant tubes 45 of the second heat exchange unit 49 (second turn). The refrigerant flowing into the third header 43A flows out to the outside. That is, the cold storage heat exchanger 40A is configured to include a so-called two-turn type refrigerant passage.

Figure 16:
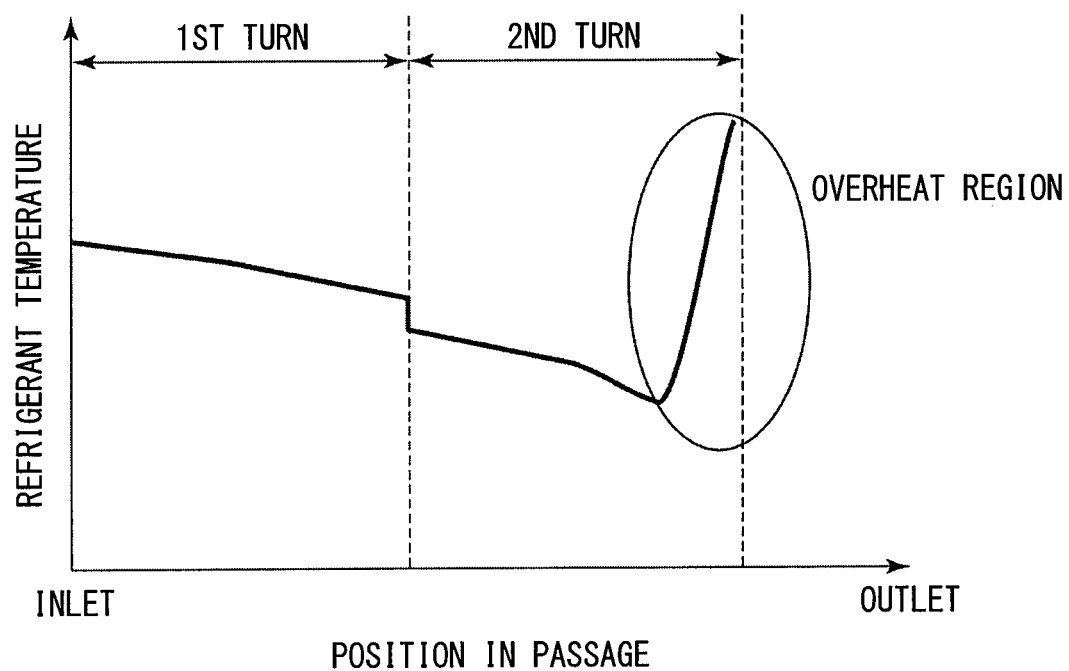
FIG. 16 is a graph showing a transition of a refrigerant temperature in a refrigerant passage inside the evaporator illustrated in FIG. 13.

FIG. 16 illustrates an example of the characteristics of a refrigerant temperature in the two-turn type refrigerant passage. As illustrated in FIG. 16, the refrigerant temperature decreases after the refrigerant is introduced into the refrigerant passage. However, the refrigerant temperature rapidly transitions to a high temperature at a position in the second half of the second turn, and an overheated area S is formed in the following part. For example, as illustrated in FIG. 14, the overheated area S is formed in an area on the upper side in the height direction in refrigerant tubes 45 of the second heat exchange unit 49.

The inner fin 47b of the first embodiment can also be used in a cold storage heat exchanger that forms the flow of a refrigerant as formed in the cold storage heat exchanger 40A and can function as the heat transfer suppressor.

In the cold storage heat exchange 40A, there is no section inside the first header 41A, the second header 42A, the third header 43A, and the fourth header 44A. However, there may be more sections inside the headers.

Figure 17:
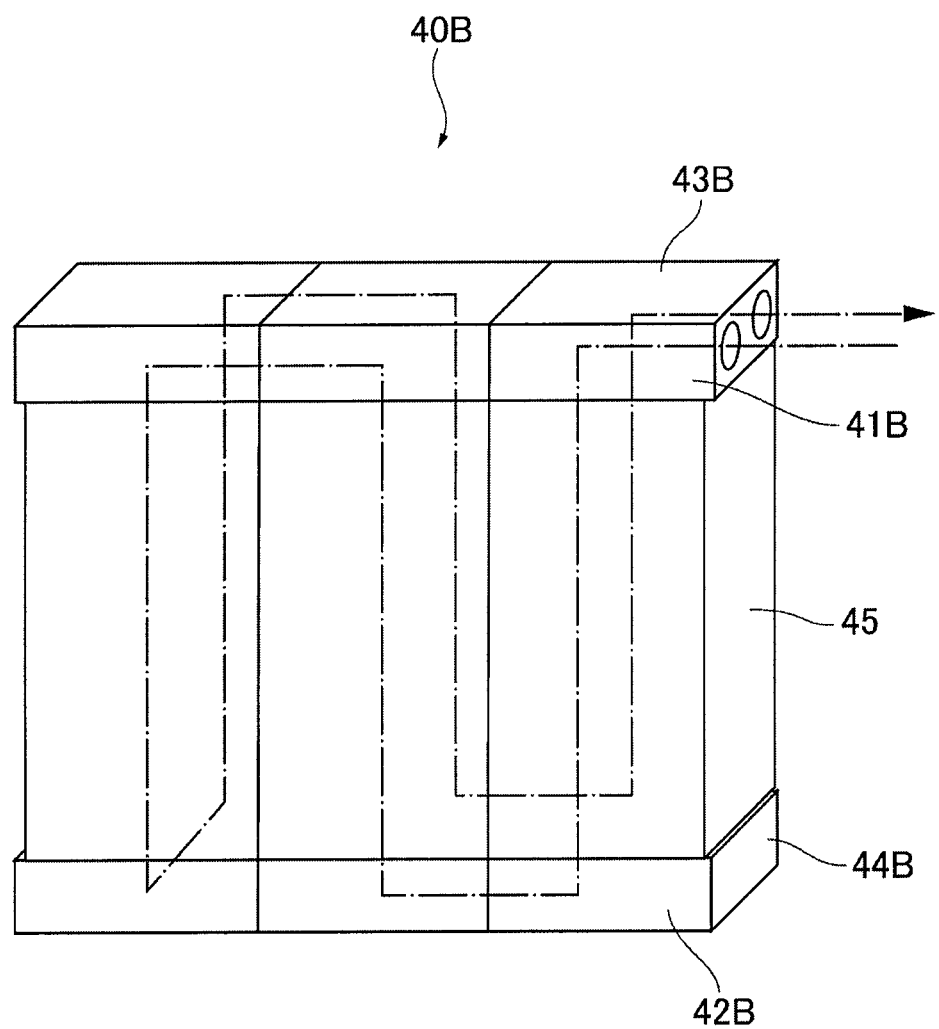
FIG. 17 is a diagram illustrating an example in which the flow of refrigerant differs from that illustrated in FIG. 4.

In a cold storage heat exchanger 40B illustrated in FIG. 17, the inside of each of a first header 41B, a second header 42B, a third header 43B, and a fourth header 44B is partitioned into three sections.

A refrigerant flowing into a first section of the first header 41B flows into a first section of the second header 42B through refrigerant tubes 45 (first turn). The refrigerant flowing into the first section of the second header 42B flows into a second section of the second header 42B. The refrigerant flowing into the second section of the second header 42B flows into a second section of the first header 41B through refrigerant tubes 45 (second turn).

The refrigerant flowing into the second section of the first header 41B flows into a third section of the first header 41B. The refrigerant flowing into the third section of the first header 41B flows into a third section of the second header 42B through refrigerant tubes 45 (third turn). The third section of the second header 42B and a third section of the fourth header 44B communicate with each other. Thus, the refrigerant flowing into the third section of the second header 42B flows into the third section of the fourth header 44B. The refrigerant flowing into the third section of the fourth header 44B flows into a third section of the third header 43B through refrigerant tubes 45 (fourth turn).

The refrigerant flowing into the third section of the third header 43B flows into a second section of the third header 43B. The refrigerant flowing into the second section of the third header 43B flows into a second section of the fourth header 44B through refrigerant tubes 45 (fifth turn). The refrigerant flowing into the second section of the fourth header 44B flows into a first section of the fourth header 44B. The refrigerant flowing into the first section of the fourth header 44B flows into a first section of the third header 43B through refrigerant tubes 45 (sixth turn). The refrigerant flowing into the first section of the third header 43B flows out to the outside. That is, the cold storage heat exchanger 40B is configured to include a so-called six-turn type refrigerant passage.

The inner fin 47b of the first embodiment can also be used in a cold storage heat exchanger that forms the flow of a refrigerant as formed in the cold storage heat exchanger 40B and can function as the heat transfer suppressor.

In the cold storage heat exchangers 40, 40A, 40B, the inlet and the outlet for the refrigerant are formed on the first headers 41, 41A, 41B and the third headers 43, 43A, 43B which are disposed on the upper side in the gravity direction (height direction). The inlet and the outlet for the refrigerant are not limited to the above form. The cold storage heat exchangers 40, 40A, 40B may be configured upside down.

Figure 18:
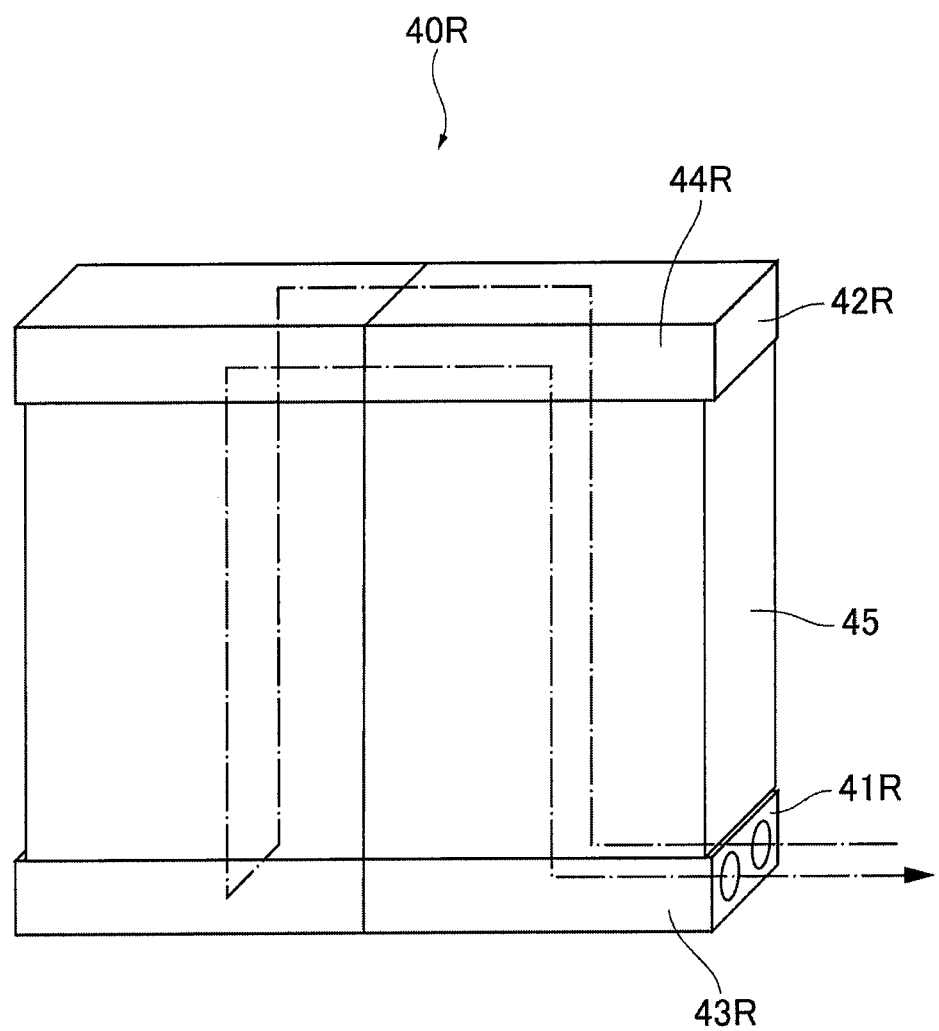
FIG. 18 is a diagram illustrating an example in which the flow of refrigerant differs from that illustrated in FIG. 4.

In a cold storage heat exchanger 40R illustrated in FIG. 18, a first header 41R and a third header 43R are disposed on the lower side in the gravity direction (height direction), and a second header 42R and a fourth header 44R are disposed on the upper side in the gravity direction.

A refrigerant flowing into a first section of the first header 41R flows into a first section of the second header 42R through refrigerant tubes 45 (first turn). The refrigerant flowing into the first section of the second header 42R flows into a second section of the second header 42R. The refrigerant flowing into the second section of the second header 42R flows into a second section of the first header 41R through refrigerant tubes 45 (second turn).

The second section of the first header 41R and a second section of the third header 43R communicate with each other. Thus, the refrigerant flowing into the second section of the first header 41R flows into the second section of the third header 43R. The refrigerant flowing into the second section of the third header 43R flows into a second section of the fourth header 44R through refrigerant tubes 45 (third turn).

The refrigerant flowing into the second section of the fourth header 44R flows into a first section of the fourth header 44R. The refrigerant flowing into the first section of the fourth header 44R flows into a first section of the third header 43R through the refrigerant tubes 45 (fourth turn). The refrigerant flowing into the first section of the third header 43R flows out to the outside. That is, the cold storage heat exchanger 40R is configured to include a so-called four-turn type refrigerant passage in which the arrangement of the cold storage heat exchanger 40 is reversed in the height direction.

Figure 19:
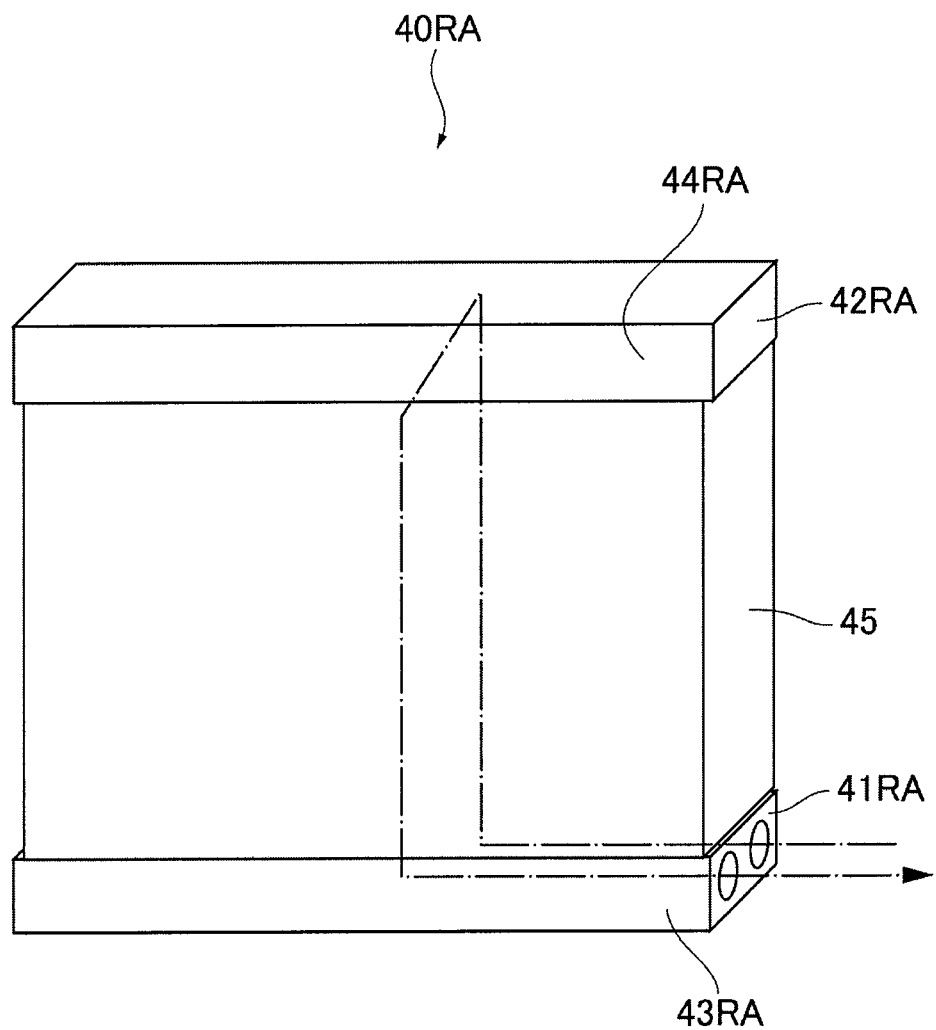
FIG. 19 is a diagram illustrating an example in which the flow of refrigerant differs from that illustrated in FIG. 4.

A cold storage heat exchanger 40RA illustrated in FIG. 19 is upside down of the cold storage heat exchanger 40A illustrated in FIG. 13. The cold storage heat exchanger 40RA includes a so-called two-turn type refrigerant passage. A first header 41RA and a third header 43RA are disposed on the lower side in the gravity direction (height direction). A second header 42RA and a fourth header 44RA are disposed on the upper side in the gravity direction.

Figure 20:
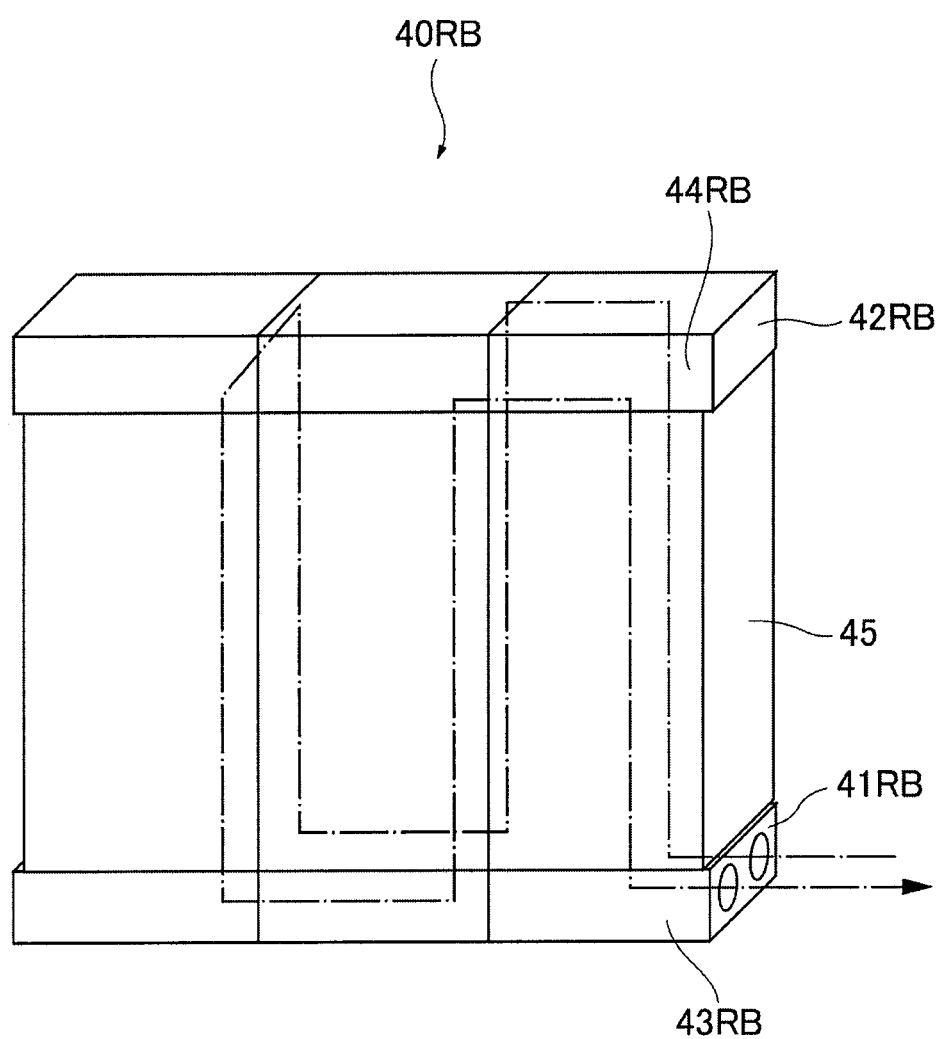
FIG. 20 is a diagram illustrating an example in which the flow of refrigerant differs from that illustrated in FIG. 4.

A cold storage heat exchanger 40RB illustrated in FIG. 20 is upside down of the cold storage heat exchanger 40B illustrated in FIG. 17. The cold storage heat exchanger 40RB includes a so-called six-turn type refrigerant passage. A first header 41RB and a third header 43RB are disposed on the lower side in the gravity direction (height direction). A second header 42RB and a fourth header 44RB are disposed on the upper side in the gravity direction.

Second Embodiment

Figure 21:
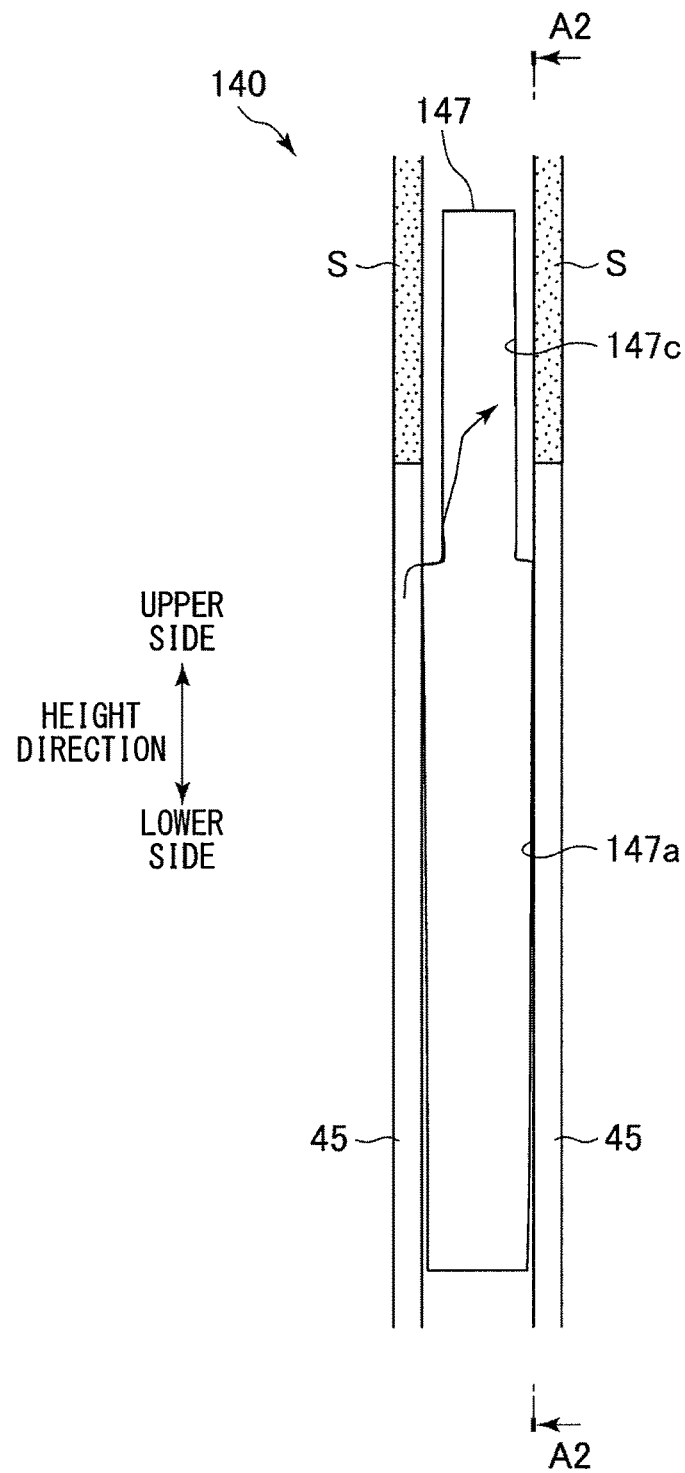
FIG. 21 is a sectional view schematically illustrating the shape of a cold storage material container which functions as a heat transfer suppressor in an evaporator according to a second embodiment.
Figure 22:
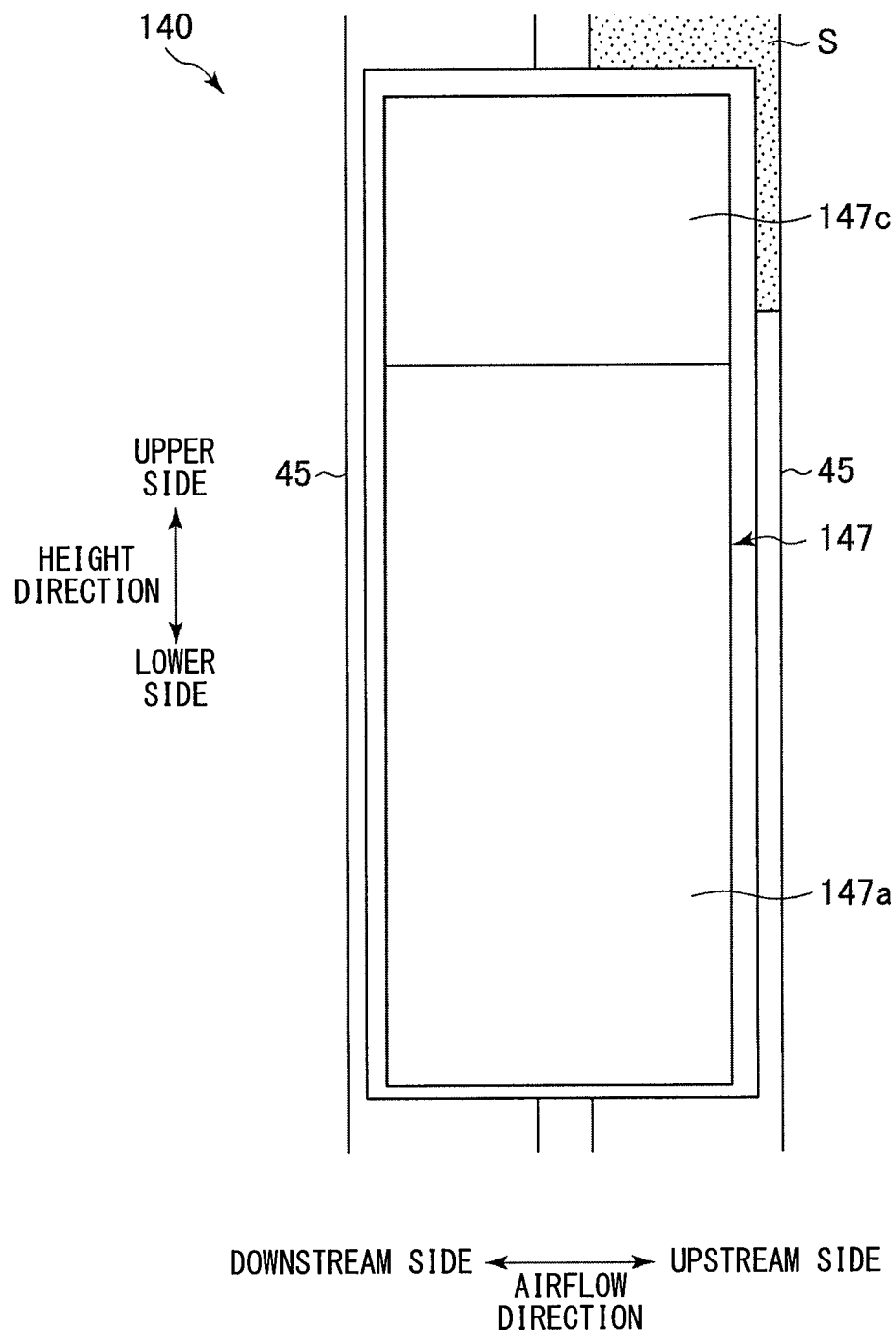
FIG. 22 is a sectional view taken along a line A2-A2 in FIG. 21.
Figure 23:
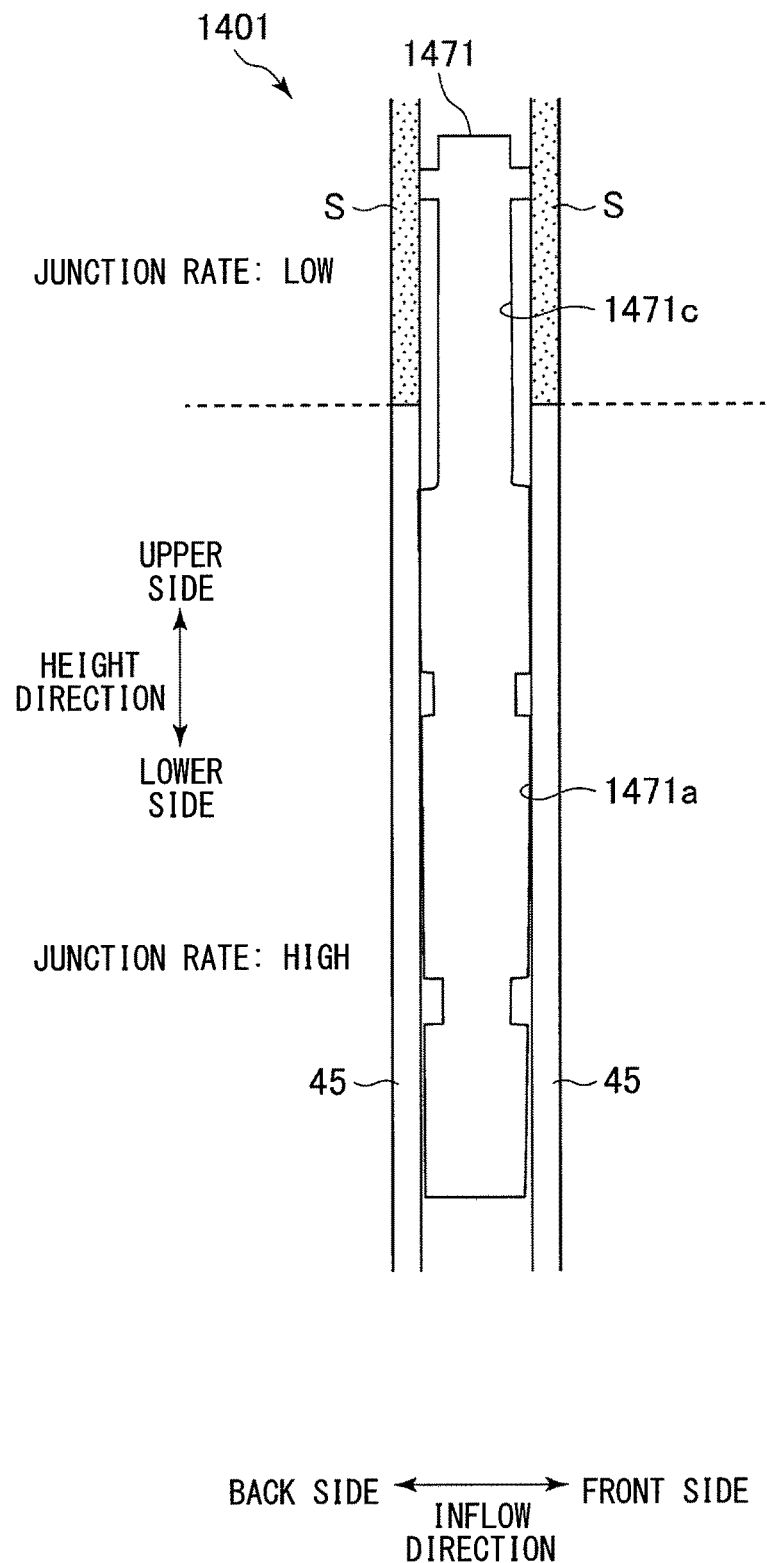
FIG. 23 is a sectional view schematically illustrating a modification of the shape of the cold storage material container.

A second embodiment will be described with reference to FIGS. 21 to 23. An evaporator 140 of the second embodiment differs from the evaporator 40 of the first embodiment in the structure of a heat transfer suppressor which suppresses heat transfer from a refrigerant tube 45 to a cold storage material 50 in an overheated area S. Specifically, as illustrated in FIGS. 21 and 22, the shape of a cold storage material container 147 has a structure that is not joined to the refrigerant tube 45 in the overheated area S of a refrigerant, and the cold storage material container 147 having the above structure functions as the heat transfer suppressor. Further, the evaporator 140 of the second embodiment differs from the evaporator 40 of the first embodiment also in that no inner fin is disposed inside the cold storage material container 147.

In other words, the cold storage material container 147 which is joined to the refrigerant tube 45 having the overheated area S is separated from the refrigerant tube 45 without being joined to the refrigerant tube 45 in a part (area 147c) that is in contact with the overheated area S of the refrigerant tube 45 and joined to the refrigerant tube 45 in a part (outer shell 147a) that is in contact with an area other than the overheated area S of the refrigerant tube 45. FIGS. 21 and 22 illustrate, as an example of such a structure, a shape in which the surface of the area 147c which overlaps the overheated area S in the outer shell 147a of the cold storage material container 147 is recessed in a direction separating from the refrigerant tube 45.

Further, the structure can be reworded as follows. In the evaporator 140, a plurality of refrigerant tubes 45 include at least two refrigerant tubes 45 disposed in the airflow direction of air in an air passage 53. The cold storage material container 147 is joined to the at least two refrigerant tubes 45 which are disposed in the airflow direction. The cold storage material container 147 which is joined to the at least two refrigerant tubes 45 including the refrigerant tube 45 having the overheated area S is separated from the refrigerant tubes 45 without being joined to the refrigerant tubes 45 in the area 147c which includes a part that is in contact with the overheated area S of the refrigerant tube 45 and overlaps the part when viewed in the airflow direction, and the cold storage material container 147 is joined to the refrigerant tubes 45 in an area 147a other than the area 147c.

With the above structure, the cold storage material container 147 is not joined to the refrigerant tubes 45 in the overheated area S. Thus, heat from the overheated refrigerant is less likely to be transferred to the inside of the cold storage material 50. Further, the cold storage material container 147 itself is in contact with a non-overheated area. Thus, cold of the refrigerant in the non-overheated area is transferred also to the cold storage material 50 in the overheated area S. Accordingly, the evaporator 140 of the second embodiment is capable of achieving an effect similar to the effect of the evaporator 40 of the first embodiment.

The shape of the cold storage material container 147 of the second embodiment is not limited to the above shape and may have another structure that makes a heat transfer amount from the refrigerant tube 45 to the cold storage material 50 through the cold storage material container 147 in the overheated area S relatively smaller than a heat transfer amount in an area other than the overheated area S. In other words, it may only be required to make the heat transfer performance of the cold storage material container 147 in the overheated area S relatively lower than that in the other part. For example, as illustrated in FIG. 23, in an evaporator 1401, a cold storage material container 1471 is jointed to the refrigerant tube 45 with a relatively low joining ratio in a part (area 1471c) that is in contact with the overheated area S of the refrigerant tube 45 and joined to the refrigerant tube 45 with a relatively high joining ratio in a part (outer shell 1471a) that is in contact with an area other than the overheated area S of the refrigerant tube 45. The "relatively low joining ratio" indicates that the ratio of a part joined to the refrigerant tube 45 in the outer surface of the cold storage material container 1471 is relatively small. The "relatively high joining ratio" indicates that the ratio of a part joined to the refrigerant tube 45 in the outer surface of the cold storage material container 1471 is relatively large. The evaporator 1401 is capable of suppressing heat transfer from the refrigerant tube 45 to the cold storage material 50 in the overheated area S by making the heat transfer amount of the cold storage material container 1471 in the overheated area S relatively small or making the joining ratio between the cold storage material container 1471 and the refrigerant tube 45 in the overheated area relatively low in this manner. As a result, it is possible to obtain an effect similar to the effect of the evaporator 40 of the first embodiment.

Third Embodiment

Figure 24:
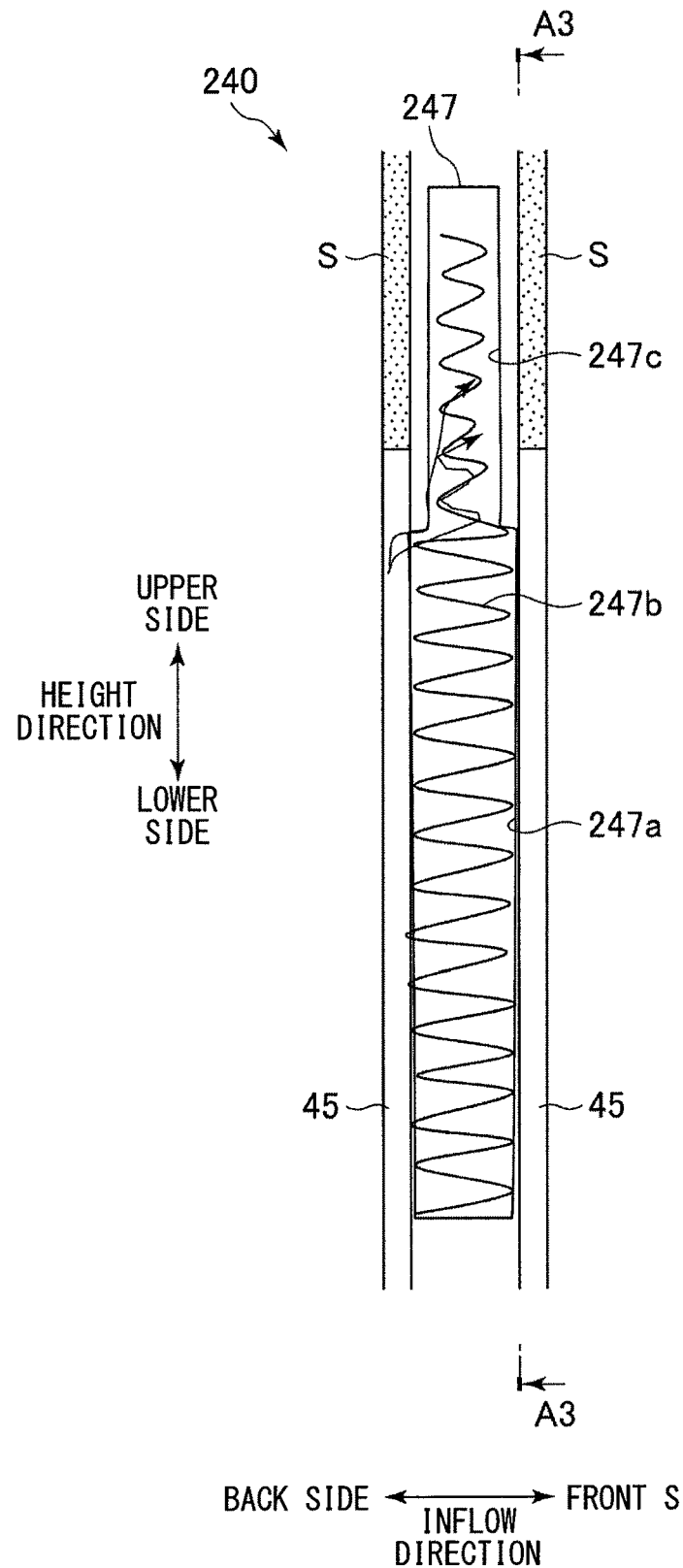
FIG. 24 is a sectional view schematically illustrating the shape of a cold storage material container which functions as a heat transfer suppressor in an evaporator according to a third embodiment.
Figure 25:
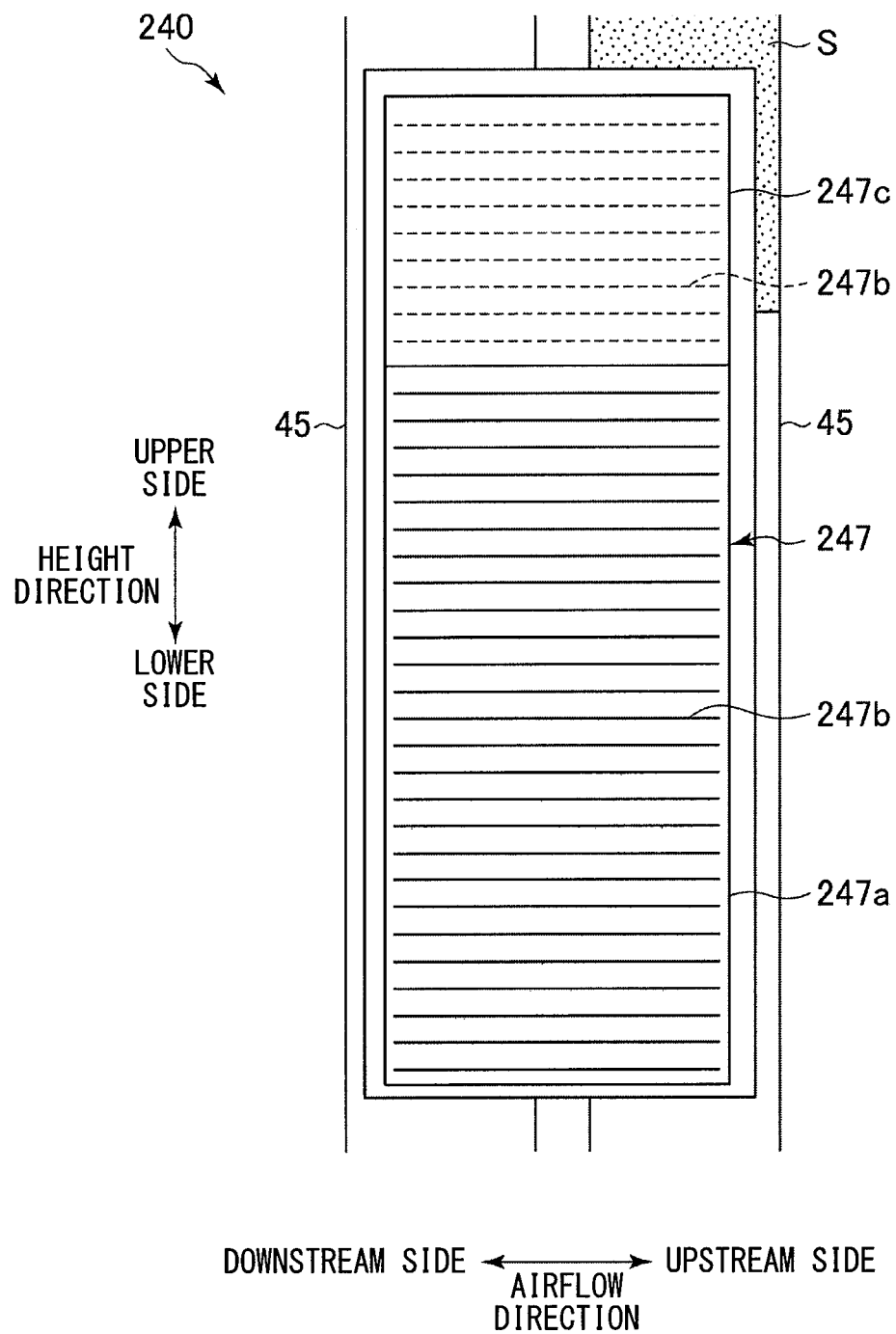
FIG. 25 is a sectional view taken along a line A3-A3 in FIG. 24.
Figure 26:
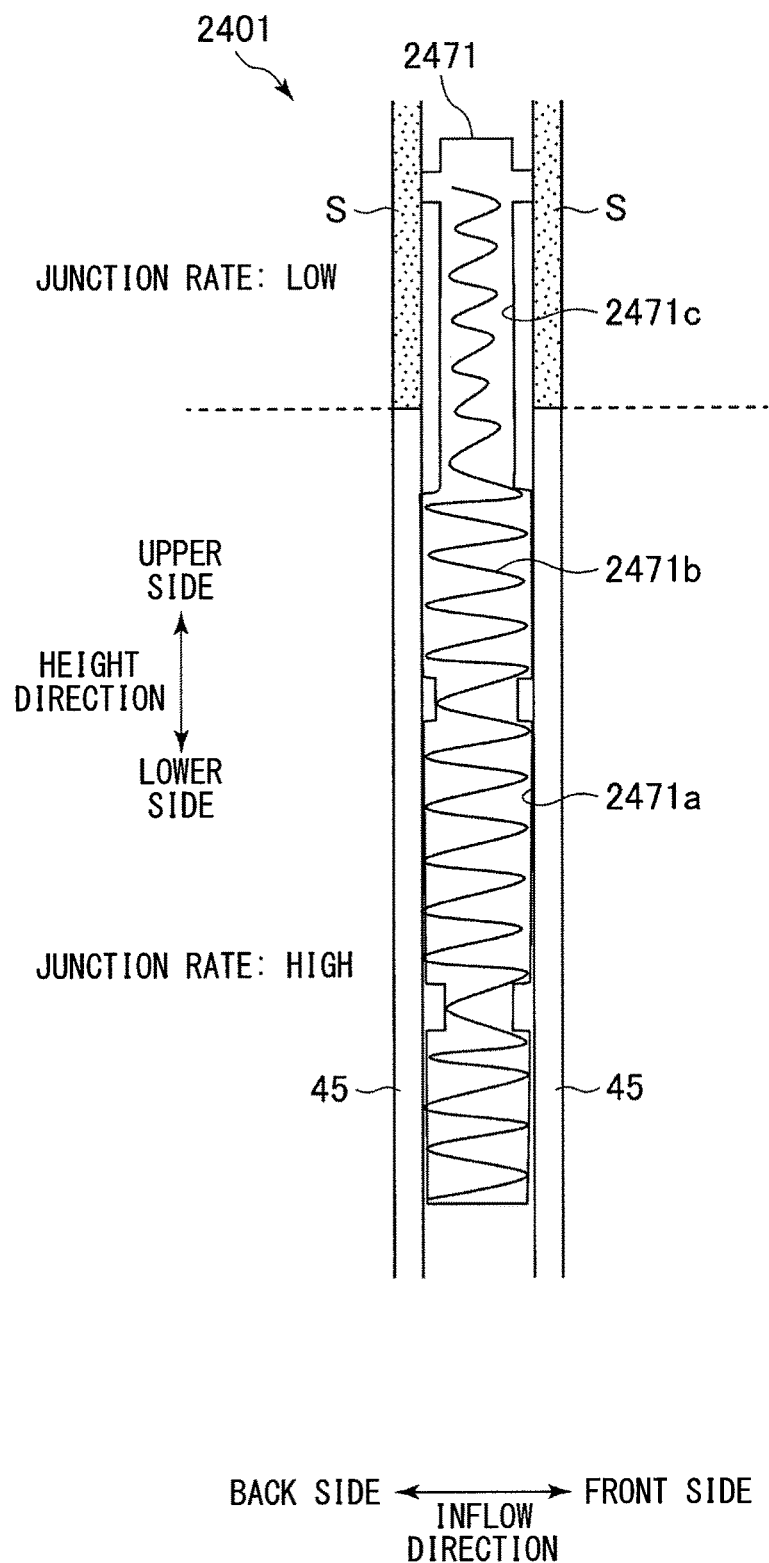
FIG. 26 is a sectional view schematically illustrating a modification of the shapes of the cold storage material container and the inner fin.

A third embodiment will be described with reference to FIGS. 24 to 26. An evaporator 240 of the third embodiment differs from the evaporator 40 of the first embodiment in the structure of a heat transfer suppressor which suppresses heat transfer from a refrigerant tube 45 to a cold storage material 50 in an overheated area S. Specifically, as illustrated in FIGS. 24 and 25, the shape of a cold storage material container 247 has a structure that is not joined to the refrigerant tube 45 in the overheated area S of the refrigerant, and the cold storage material container 247 having the structure functions as the heat transfer suppressor. Further, the evaporator 240 of the third embodiment differs from the evaporator 40 of the first embodiment also in that an inner fin 247b which is disposed inside the cold storage material container 247 is joined to an inner wall surface of an outer shell 247a over the entire area in the longitudinal direction.

In other words, the inner fin 247b extends in the longitudinal direction (height direction) inside the cold storage material container 247, and is joined to an inner wall of the cold storage material container 247. The cold storage material container 247 which is joined to the refrigerant tube 45 having the overheated area S is separated from the refrigerant tube 45 without being joined to the refrigerant tube 45 in a part (area 247c) that is in contact with the overheated area S of the refrigerant tube 45 and joined to the refrigerant tube 45 in a part (outer shell 147a) that is in contact with an area other than the overheated area S of the refrigerant tube 45.

Further, the above structure can be reworded as follows. In the evaporator 240, a plurality of refrigerant tubes 45 include at least two refrigerant tubes 45 disposed in the airflow direction of air in an air passage 53. The cold storage material container 247 is joined to the at least two refrigerant tubes 45 which are disposed in the airflow direction. The inner fin 247b overlaps the at least two refrigerant tubes 45 when viewed in an array direction (inflow direction) of the refrigerant tubes 45 and the cold storage material container 247. The cold storage material container 247 which is joined to the at least two refrigerant tubes 45 including the refrigerant tube 45 having the overheated area S is separated from the refrigerant tubes 45 without being joined to the refrigerant tubes 45 in the area 247c which includes a part that is in contact with the overheated area S of the refrigerant tube 45 and overlaps the part when viewed in the airflow direction and joined to the refrigerant tubes 45 in an area 247a other than the area 247c.

With the above structure, the cold storage material container 247 is not joined to the refrigerant tubes 45 in the overheated area S. Further, the inner fin 247b which is joined to the inside of the cold storage material container 247 is also not joined to the refrigerant tubes 45. Thus, heat from the overheated refrigerant is less likely to be transferred to the inside of the cold storage material 50. The inner fin 247b itself is disposed also inside the cold storage material container 47 in the overheated area S. Thus, cold of the refrigerant in a non-overheated area is transferred also to the cold storage material 50 in the overheated area S through the inner fin 247b. Further, the cold storage material container 247 itself is in contact with the non-overheated area. Thus, cold of the refrigerant in the non-overheated area is transferred also to the cold storage material 50 in the overheated area S. Accordingly, the evaporator 240 of the third embodiment is capable of achieving an effect similar to the effect of the evaporator 40 of the first embodiment.

The evaporator 240 of the third embodiment may also have a structure in which the inner fin 247b is not joined to the inner wall surface of the outer shell 247a of the cold storage material container 247 in a part that is in contact with the overheated area S of the refrigerant tube 45 similarly to the first embodiment. With the above structure, since the inner fin 247b is not joined to the cold storage material container 247, that is, the refrigerant tube 45 in the overheated area S, heat from the overheated refrigerant is further less likely to be transferred to the inside of the cold storage material 50.

The shape of the cold storage material container 247 of the third embodiment is not limited to the above shape and may have another structure that makes a heat transfer amount from the refrigerant tube 45 to the cold storage material 50 through the cold storage material container 247 in the overheated area S relatively smaller than a heat transfer amount in an area other than the overheated area S. In other words, it may only be required to make the heat transfer performance of the cold storage material container 247 in the overheated area S relatively lower than that in the other part. For example, similarly to the structure described in the second embodiment with reference to FIG. 23, as illustrated in FIG. 26, in an evaporator 2401, a cold storage material container 2471 may be jointed to the refrigerant tube 45 with a relatively low joining ratio in a part (area 2471c) that is in contact with the overheated area S of the refrigerant tube 45 and joined to the refrigerant tube 45 with a relatively high joining ratio in a part (outer shell 2471a) that is in contact with an area other than the overheated area S of the refrigerant tube 45. The evaporator 2401 is capable of suppressing heat transfer from the refrigerant tube 45 to the cold storage material 50 in the overheated area S by making the heat transfer amount of the cold storage material container 2471 in the overheated area S relatively small or making the joining ratio between the cold storage material container 2471 and the refrigerant tube 45 in the overheated area S relatively low in this manner. As a result, it is possible to obtain an effect similar to the effect of the evaporator 40 of the first embodiment.

Further, when there is applied a structure that suppresses heat transfer from the refrigerant tube 45 to the cold storage material 50 in the overheated area S by a joining structure between the inner fin 2471b and the cold storage material container 2471 similarly to the first embodiment, a structure similar to the structure described in the first embodiment with reference to FIG. 11 can be applied. Specifically, as illustrated in FIG. 26, in the evaporator 2401, the inner fin 2471b may be joined to the inner wall surface of the outer shell 2471a of the cold storage material container 2471 with a relatively low joining ratio in a part that is in contact with the overheated area S of the refrigerant tube 45 and joined to the inner wall surface with a relatively high joining ratio in a part that is in contact with an area other than the overheated area S of the refrigerant tube 45. The evaporator 2401 is capable of suppressing heat transfer from the refrigerant tube 45 to the cold storage material 50 in the overheated area S also by making the joining ratio between the inner fin 2471b and the cold storage material container 2471 relatively low in this manner. As a result, it is possible to obtain an effect similar to the effect of the evaporator 40 of the first embodiment.

Further, similarly to the structure described in the first embodiment with reference to FIG. 12, in the evaporator 240, the corrugated shape of the inner fin 247b may be continuous in the short direction (airflow direction) of the cold storage material container 247, that is, peaks and valleys of the inner fin 247b may extend in the height direction. Also with the above structure, the evaporator 240 is capable of suppressing heat transfer from the refrigerant tube 45 to the cold storage material 50 in the overheated area S. As a result, it is possible to obtain an effect similar to the effect of the evaporator 40 of the first embodiment.

Fourth Embodiment

Figure 27:
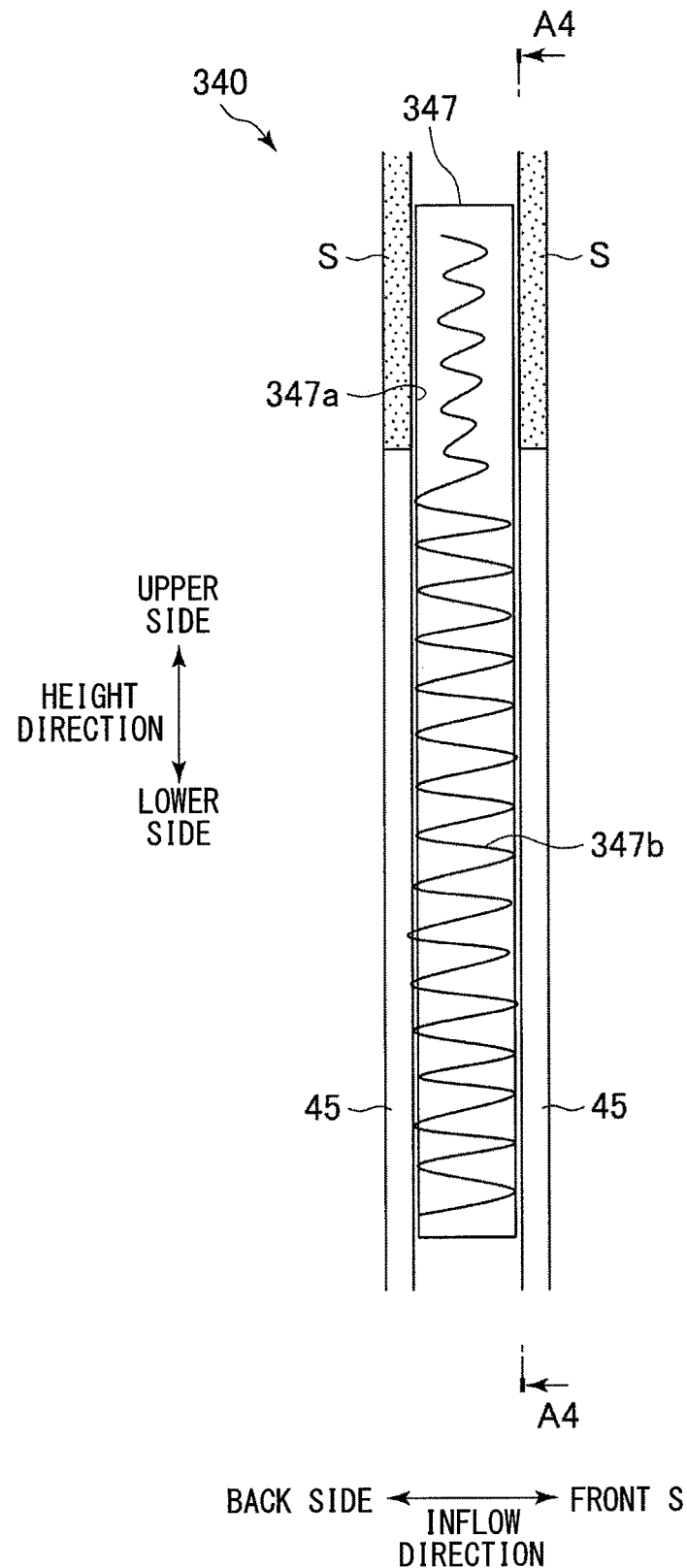
FIG. 27 is a sectional view schematically illustrating the shape of an inner fin which functions as a heat transfer suppressor in an evaporator according to a fourth embodiment.
Figure 28:
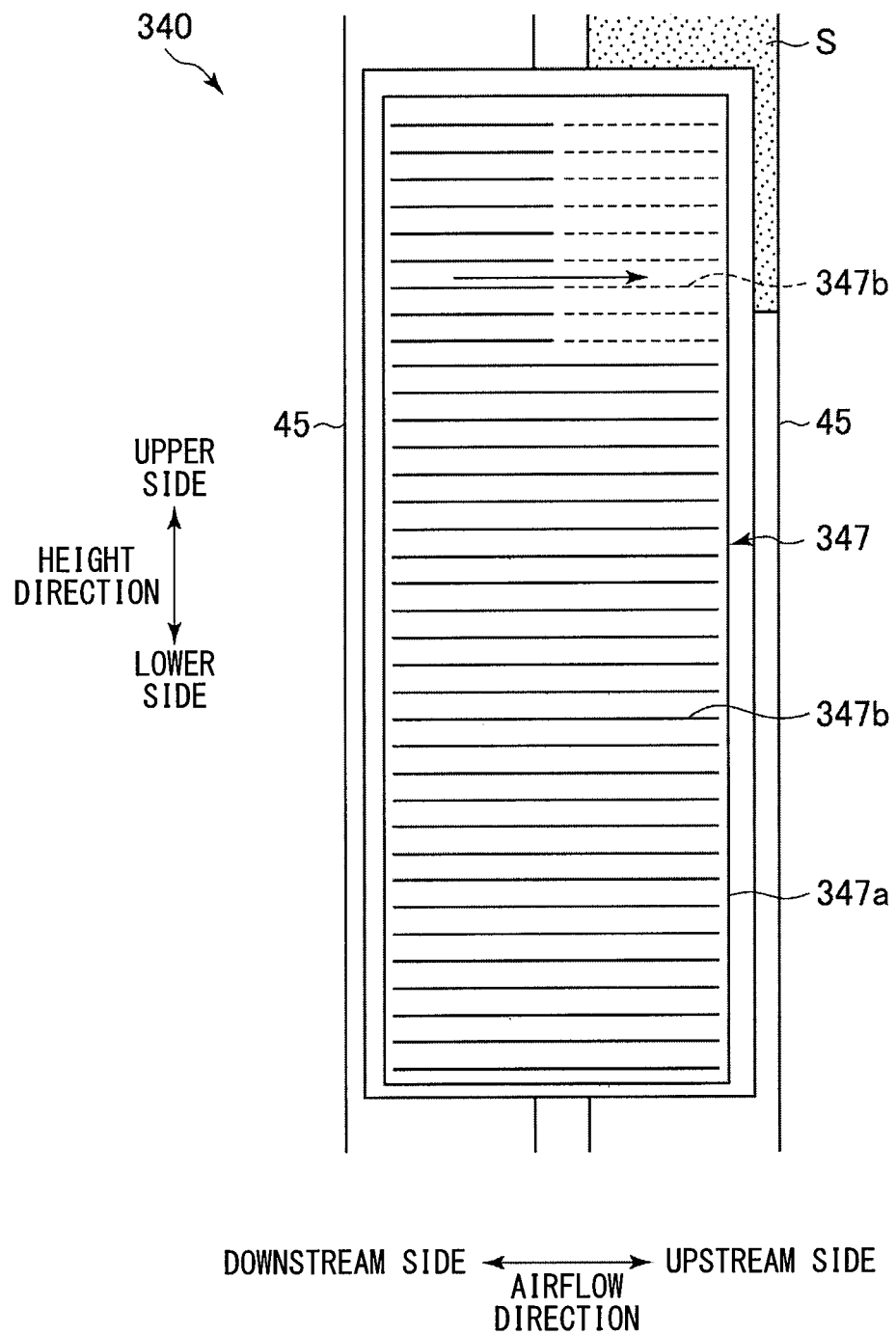
FIG. 28 is a sectional view taken along a line A4-A4 in FIG. 27.

A fourth embodiment will be described with reference to FIGS. 27 and 28. In an evaporator 340 of the fourth embodiment, the shape of an inner fin 347b as the heat transfer suppressor differs from the shape of the inner fin 47b in the evaporator 40 of the first embodiment. Specifically, as illustrated in FIGS. 27 and 28, when refrigerant tubes 45 are disposed on the upstream side and the downstream side in the airflow direction, an overheated area S is typically formed on the upstream side. Thus, the fourth embodiment differs from the first embodiment in that the inner fin 347b is not joined to a cold storage material container 347 only on the upstream side.

In other words, in the evaporator 340, a plurality of refrigerant tube 45 include at least two refrigerant tubes 45 disposed in the airflow direction of air in an air passage 53. The cold storage material container 347 is joined to the at least two refrigerant tubes which are disposed in the airflow direction. The inner fin 347b overlaps the at least two refrigerant tubes 45 when viewed in an array direction (inflow direction) of the refrigerant tubes 45 and the cold storage material container 347. In the cold storage material container 347 which is joined to the at least two refrigerant tubes 45 including the refrigerant tube 45 having the overheated area S, the inner fin 347b is joined to the inner wall of the cold storage material container 347 over the entire area in the longitudinal direction in an area overlapping the refrigerant tube 45 having no overheated area S. Further, in an area overlapping the refrigerant tube 45 having the overheated area S, the inner fin 347b is not joined to the inner wall of the cold storage material container 347 in a part that is in contact with the overheated area S of the refrigerant tube 45 and joined to the inner wall of the cold storage material container 347 in the other part.

With the above structure, the evaporator 340 achieves an effect similar to the effect of the first embodiment. Further, since the inner fin 347b is in contact with the refrigerant tube 45 in a non-overheated area on the downstream side, cold can be transferred from the upstream side to the downstream side. Thus, it is possible to further suppress heat transfer from the refrigerant tube 45 to the cold storage material 50.

Further, the various modifications described in the first embodiment can be applied to the evaporator of 340 of the fourth embodiment.

Fifth Embodiment

Figure 29:
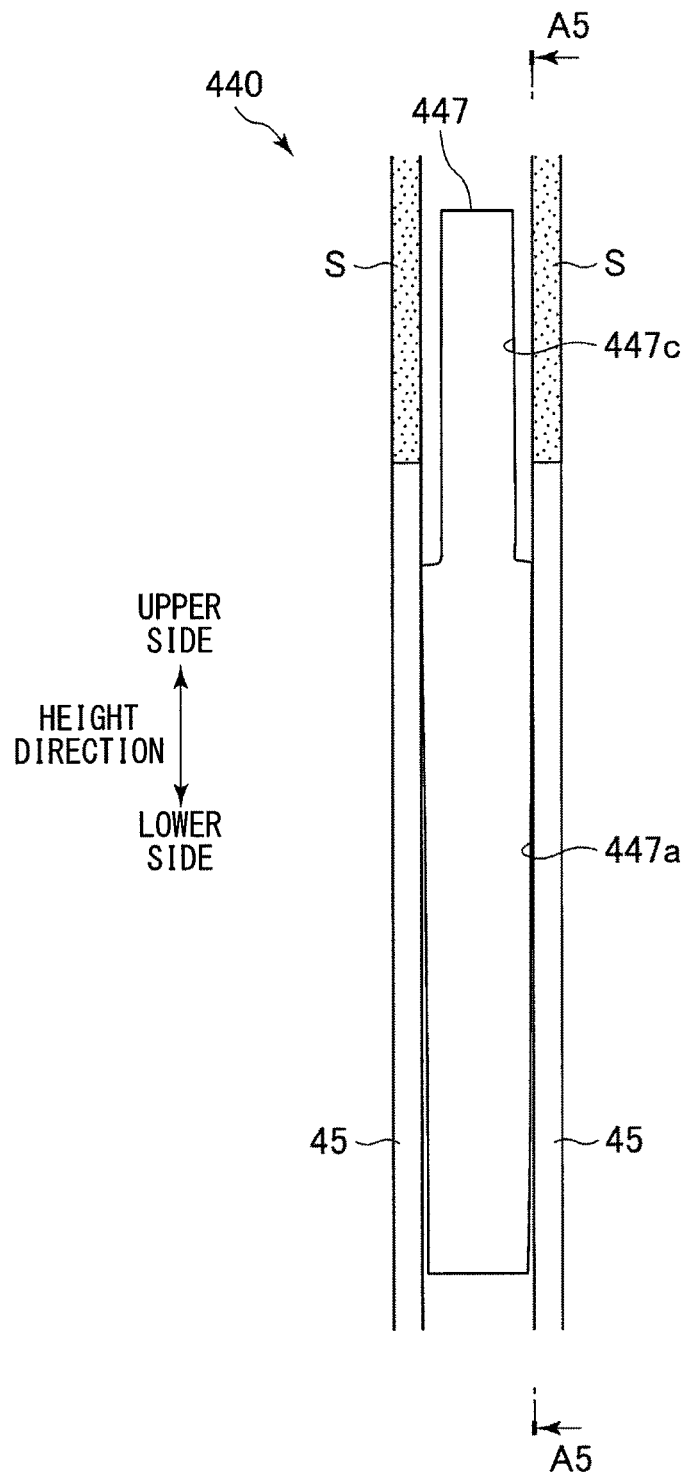
FIG. 29 is a sectional view schematically illustrating the shape of a cold storage material container which functions as a heat transfer suppressor in an evaporator according to a fifth embodiment.
Figure 30:
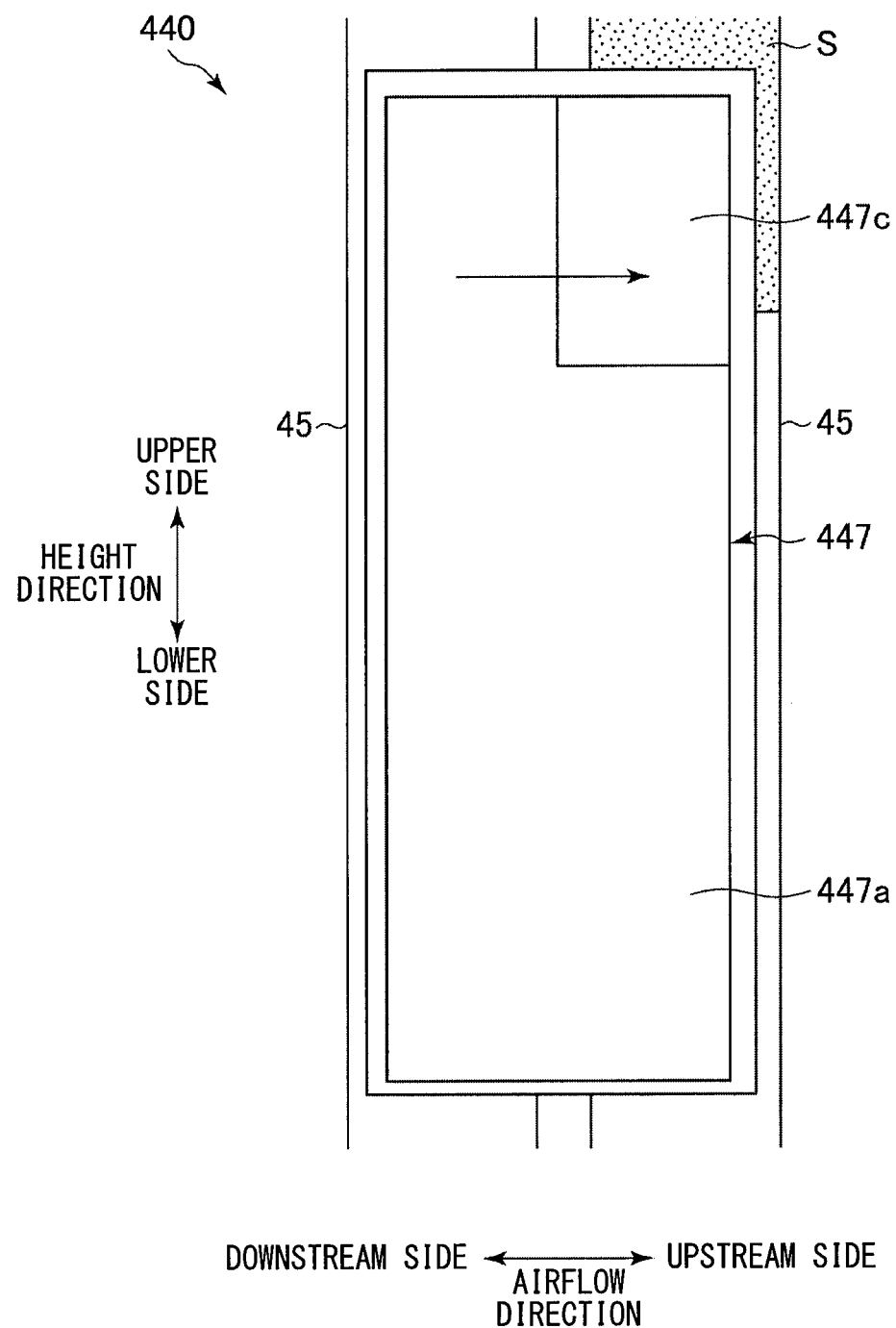
FIG. 30 is a sectional view taken along a line A5-A5 in FIG. 29.

A fifth embodiment will be described with reference to FIGS. 29 and 30. In an evaporator 440 of the fifth embodiment, the shape of a cold storage material container 447 as the heat transfer suppressor differs from the shape of the cold storage material container 147 in the evaporator 140 of the second embodiment. Specifically, as illustrated in FIGS. 29 and 30, when refrigerant tubes 45 are disposed on the upstream side and the downstream side in the airflow direction, an overheated area S is typically formed on the upstream side. Thus, the fifth embodiment differs from the second embodiment in that the cold storage material container 447 is not joined to the refrigerant tubes 45 only on the upstream side.

In other words, in the evaporator 440, a plurality of refrigerant tubes 45 include at least two refrigerant tubes 45 disposed in the airflow direction of air in an air passage 53. The cold storage material container 447 is joined to the at least two refrigerant tubes 45 which are disposed in the airflow direction. The cold storage material container 447 which is joined to the at least two refrigerant tubes 45 including the refrigerant tube 45 having the overheated area S is joined to the refrigerant tubes 45 over the entire area in the extending direction (height direction) in an area overlapping the refrigerant tube 45 having no overheated area S. Further, in an area overlapping the refrigerant tube 45 having the overheated area S, the cold storage material container 447 is separated from the refrigerant tubes 45 without being joined to the refrigerant tubes 45 in a part (area 447c) that is in contact with the overheated area S of the refrigerant tube 45 and joined to the refrigerant tube 45 in a part 447a other than the area 447c.

With the above structure, the evaporator 440 of the fifth embodiment achieves an effect similar to the effect of the second embodiment. Further, since the cold storage material container 447 is in contact with the refrigerant tube 45 in a non-overheated area on the downstream side, cold can be transferred from the upstream side to the downstream side. Thus, it is possible to further suppress heat transfer from the refrigerant tube 45 to the cold storage material 50. Further, the capacity of the cold storage material container 447 can be increased compared to that of the second embodiment. Thus, it is possible to store a larger amount of cold storage material 50.

Further, the various modifications described in the second embodiment can be applied to the evaporator 440 of the fifth embodiment.

Sixth Embodiment

Figure 31:
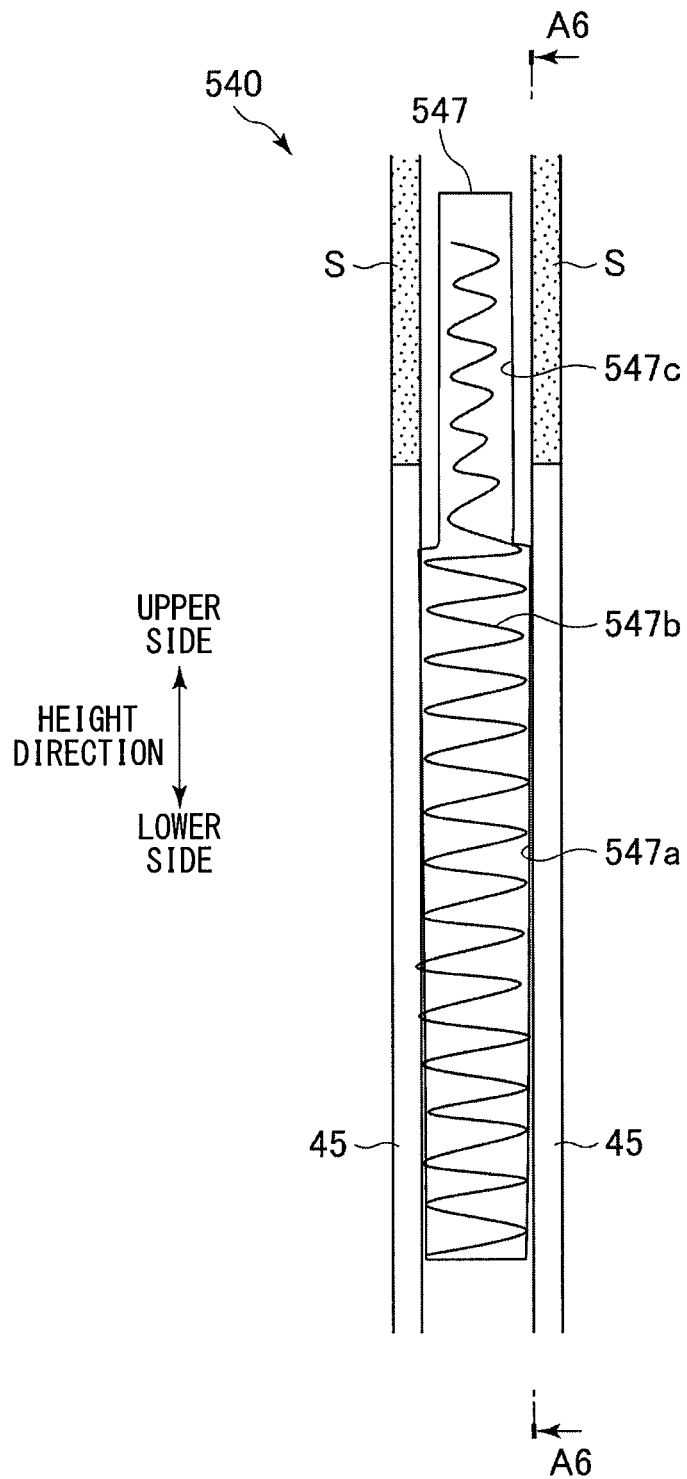
FIG. 31 is a sectional view schematically illustrating the shape of a cold storage material container which functions as a heat transfer suppressor in an evaporator according to a sixth embodiment.
Figure 32:
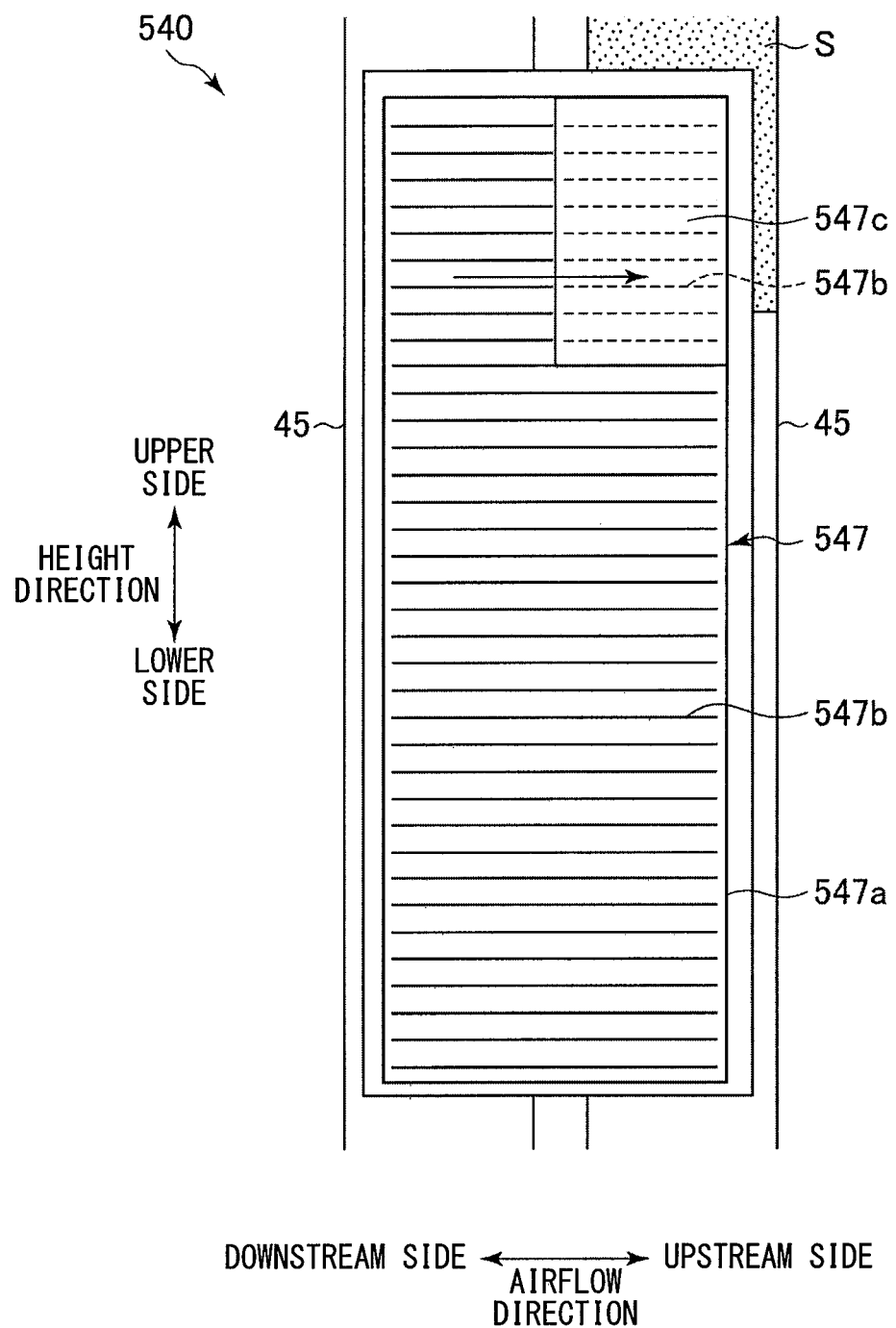
FIG. 32 is a sectional view taken along a line A6-A6 in FIG. 31.

A sixth embodiment will be described with reference to FIGS. 31 and 32. In an evaporator 540 of the sixth embodiment, the shape of a cold storage material container 547 as the heat transfer suppressor differs from the shape of the cold storage material container 247 in the evaporator 240 of the third embodiment. Specifically, as illustrated in FIGS. 31 and 32, when refrigerant tubes 45 are disposed on the upstream side and the downstream side in the airflow direction, an overheated area S is typically formed on the upstream side. Thus, the sixth embodiment differs from the third embodiment in that the cold storage material container 547 is not joined to the refrigerant tubes 45 only on the upstream side.

In other words, in the evaporator 540, a plurality of refrigerant tubes 45 include at least two refrigerant tubes 45 disposed in the airflow direction of air in an air passage 53. The cold storage material container 547 is joined to the at least two refrigerant tubes 45 which are disposed in the airflow direction. An inner fin 547b overlaps the at least two refrigerant tubes 45 when viewed in an array direction (inflow direction) of the refrigerant tubes 45 and the cold storage material container 547. The cold storage material container 547 which is joined to the at least two refrigerant tubes 45 including the refrigerant tube 45 having the overheated area S is joined to the refrigerant tube 45 over the entire area in the extending direction (height direction) in an area overlapping the refrigerant tube 45 having no overheated area S. Further, in an area overlapping the refrigerant tube 45 having the overheated area S, the cold storage material container 547 is separated from the refrigerant tube 45 without being joined to the refrigerant tube 45 in a part (area 547c) that is in contact with the overheated area S of the refrigerant tube 45 and joined to the refrigerant tube 45 in a part 547a other than the area 547c.

With the above structure, the evaporator 540 of the sixth embodiment achieves an effect similar to the effect of the third embodiment. Further, since the cold storage material container 547 and the inner fin 547b are in contact with the refrigerant tube 45 in a non-overheated area on the downstream side, cold can be transferred from the upstream side to the downstream side. Thus, it is possible to further suppress heat transfer from the refrigerant tube 45 to the cold storage material 50. Further, the capacity of the cold storage material container 547 can be increased compared to that of the third embodiment. Thus, it is possible to store a larger amount of cold storage material 50.

Further, the various modifications described in the third embodiment can be applied to the evaporator 540 of the sixth embodiment.

Seventh Embodiment

A seventh embodiment will be described with reference to FIGS. 33 to 38. In the seventh embodiment and embodiments thereafter, an overheated area S1 as a subject differs from the overheated area S of the first to sixth embodiments. An evaporator 1040 (cold storage heat exchanger) according to the seventh embodiment suppresses heat transfer from a refrigerant tube 45 to a cold storage material 50 in the overheated area S1 which is formed due to flow rate variations in a refrigerant passage when the flow rate of a refrigerant is low.

Figure 36:
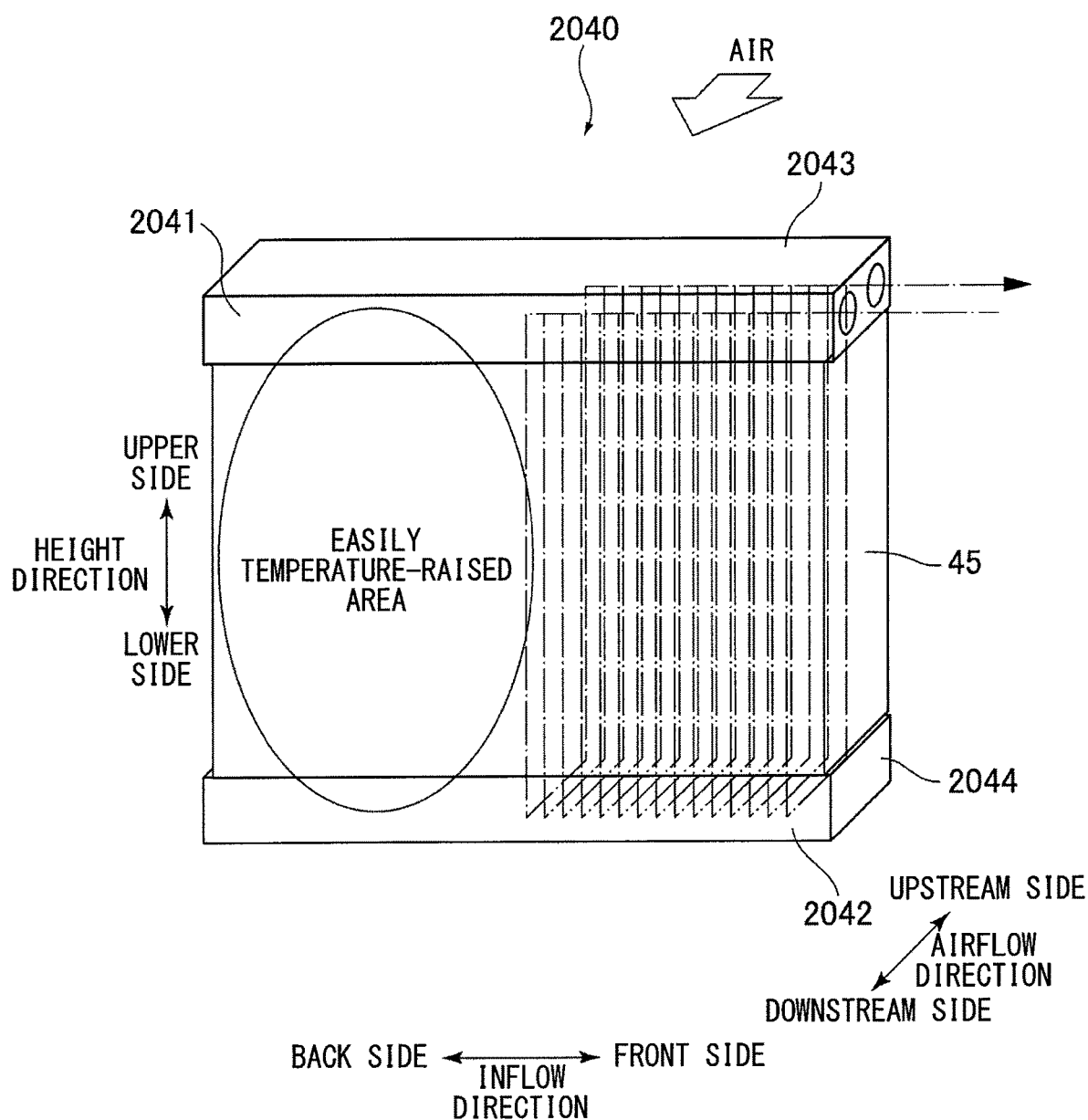
FIG. 36 is a diagram schematically illustrating the flow of refrigerant in an evaporator according to a comparative example of the seventh embodiment.
Figure 37:
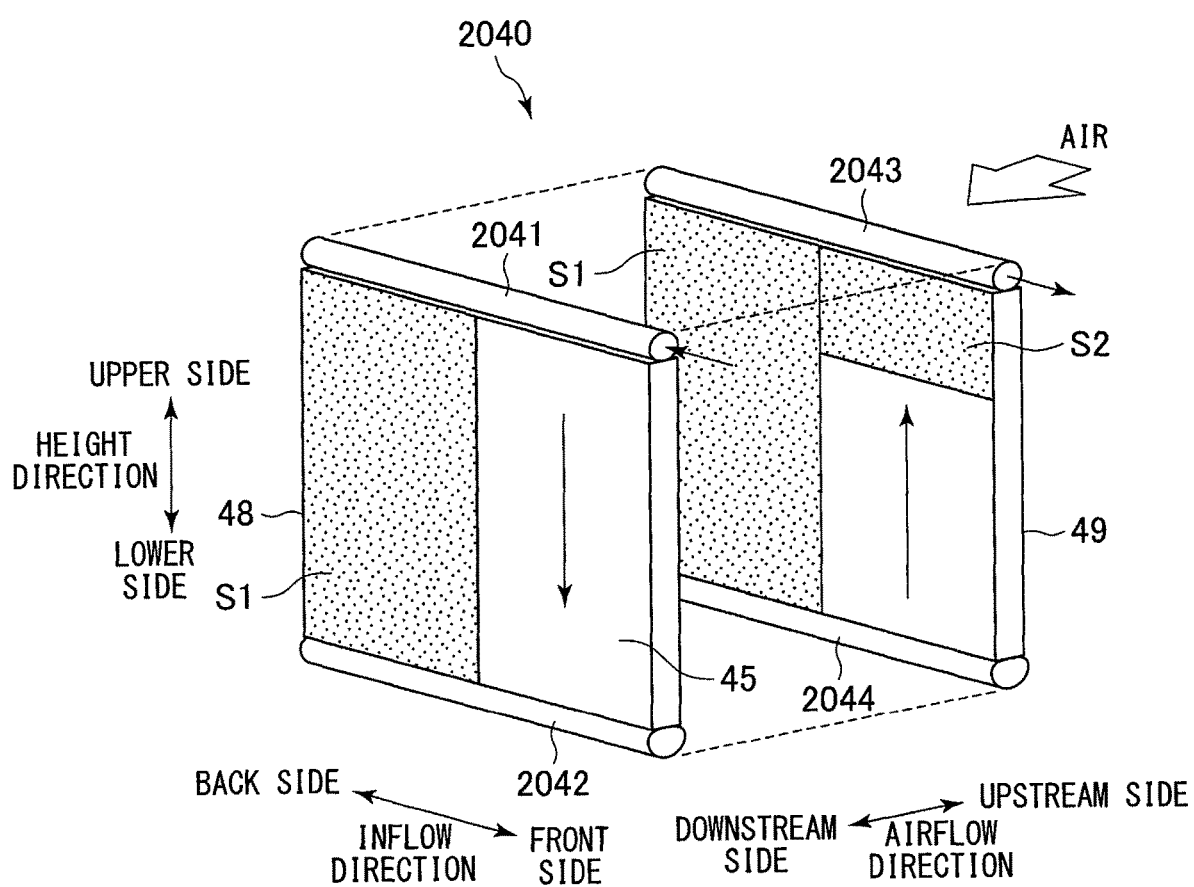
FIG. 37 is a schematic view of the evaporator illustrated in FIG. 36 exploded into the upstream side and the downstream side in the airflow direction.
Figure 38:
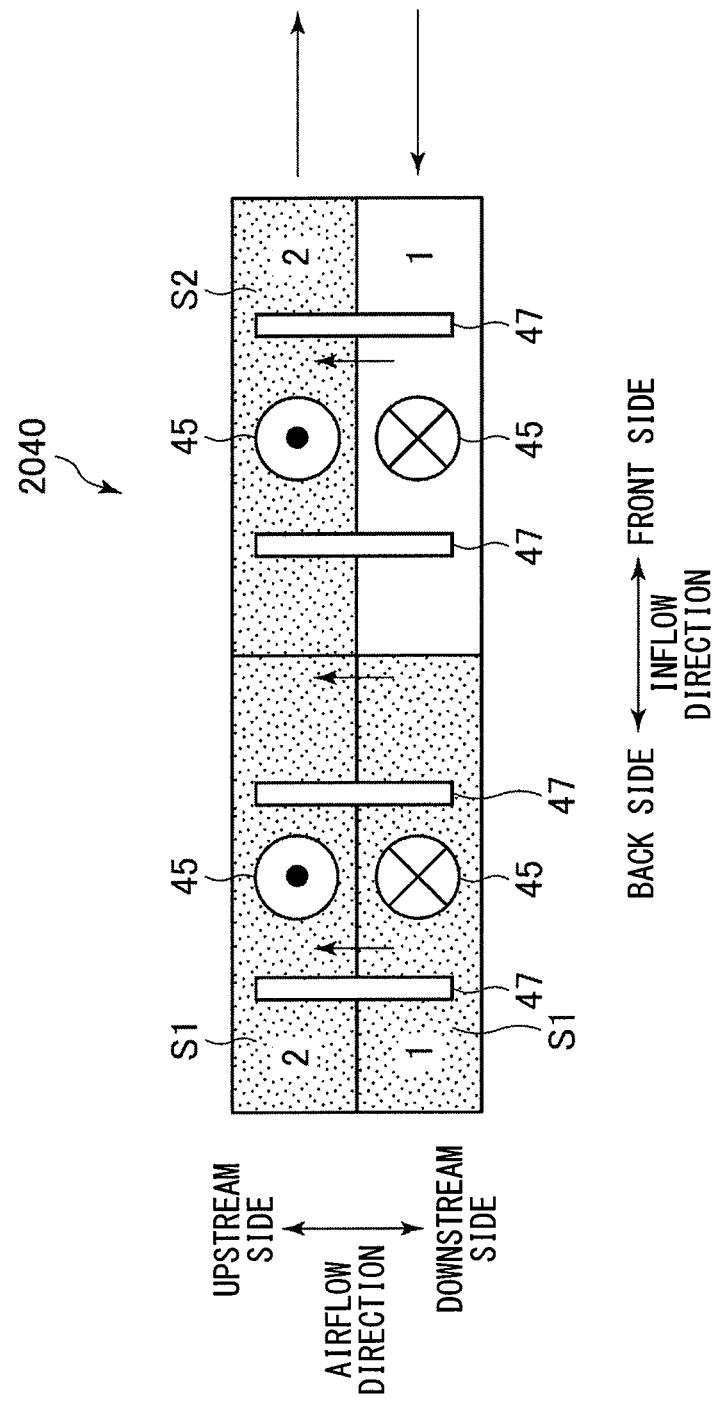
FIG. 38 is a plan view schematically illustrating the flow of refrigerant in the evaporator illustrated in FIG. 36.
Figure 39:
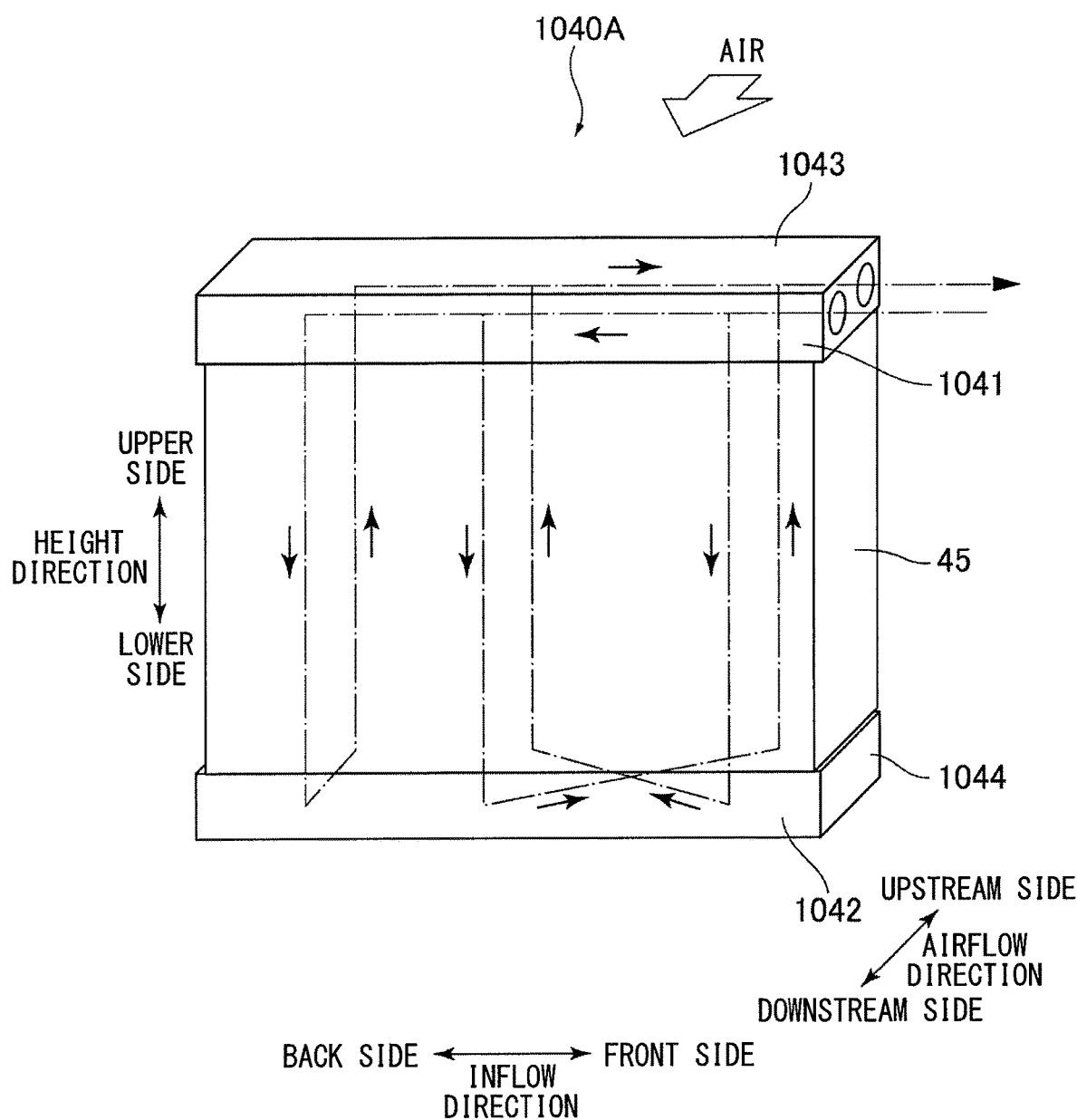
FIG. 39 is a diagram schematically illustrating the flow of refrigerant in an evaporator according to a modification of the seventh embodiment.
Figure 40:
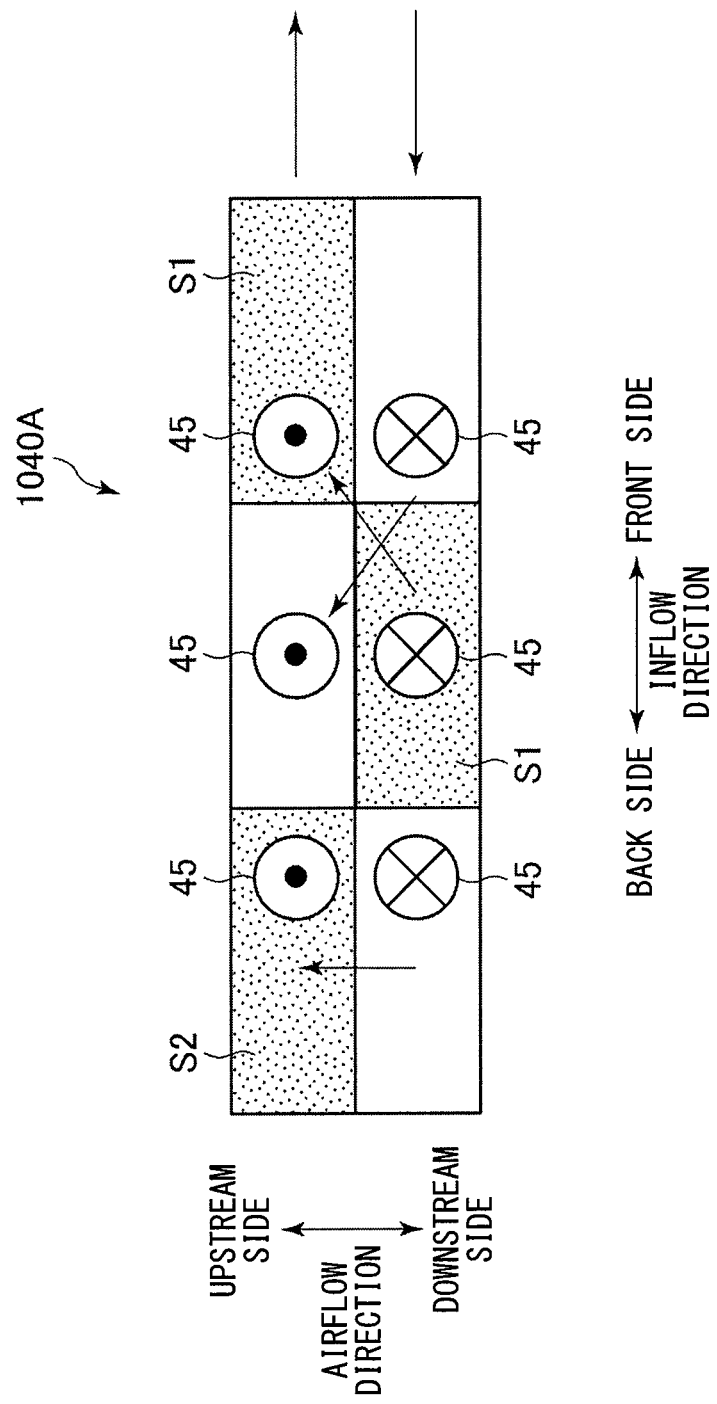
FIG. 40 is a plan view schematically illustrating the flow of refrigerant in the evaporator illustrated in FIG. 39.
Figure 41:
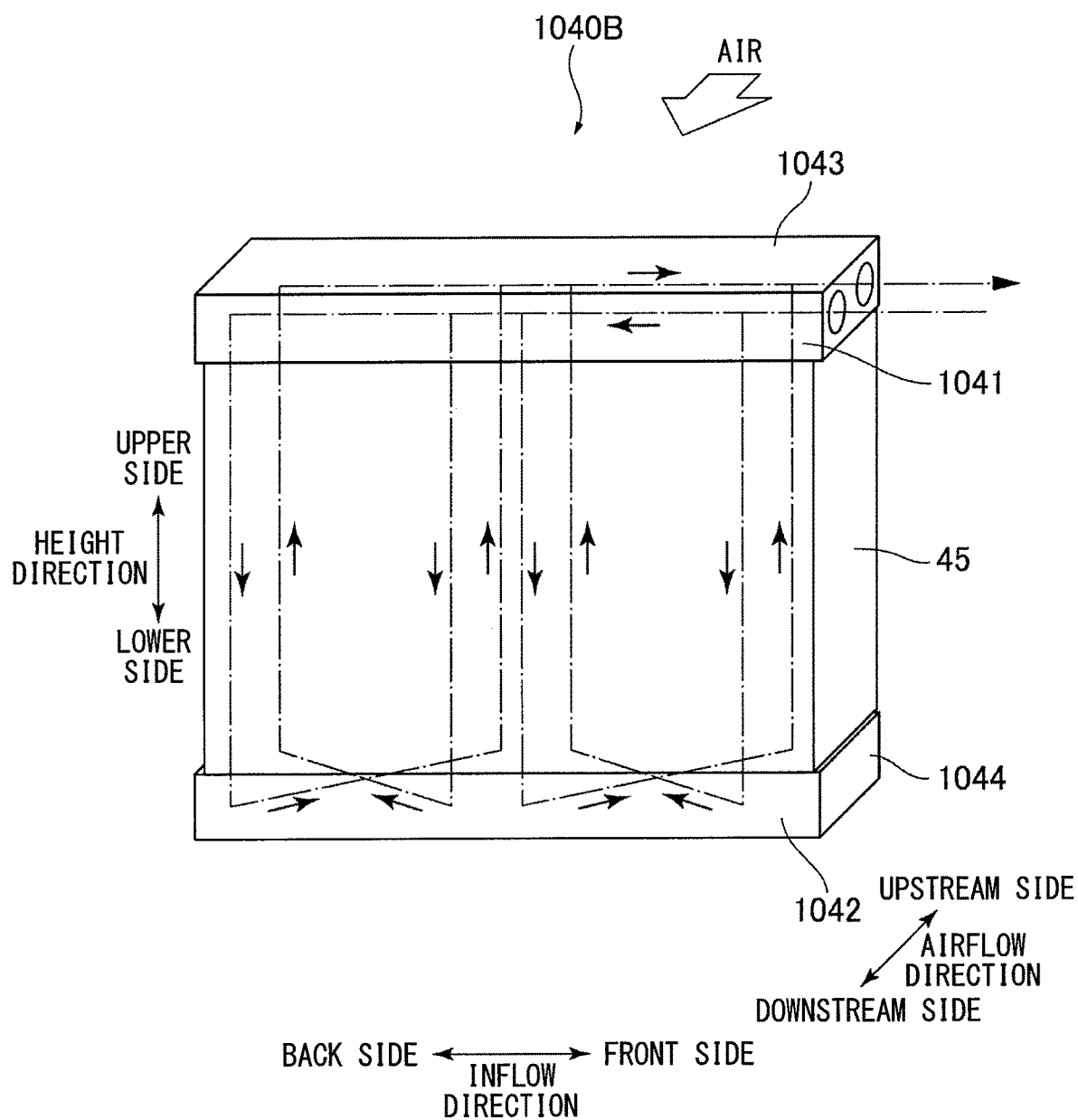
FIG. 41 is a diagram schematically illustrating the flow of refrigerant in an evaporator according to a modification of the seventh embodiment.
Figure 42:
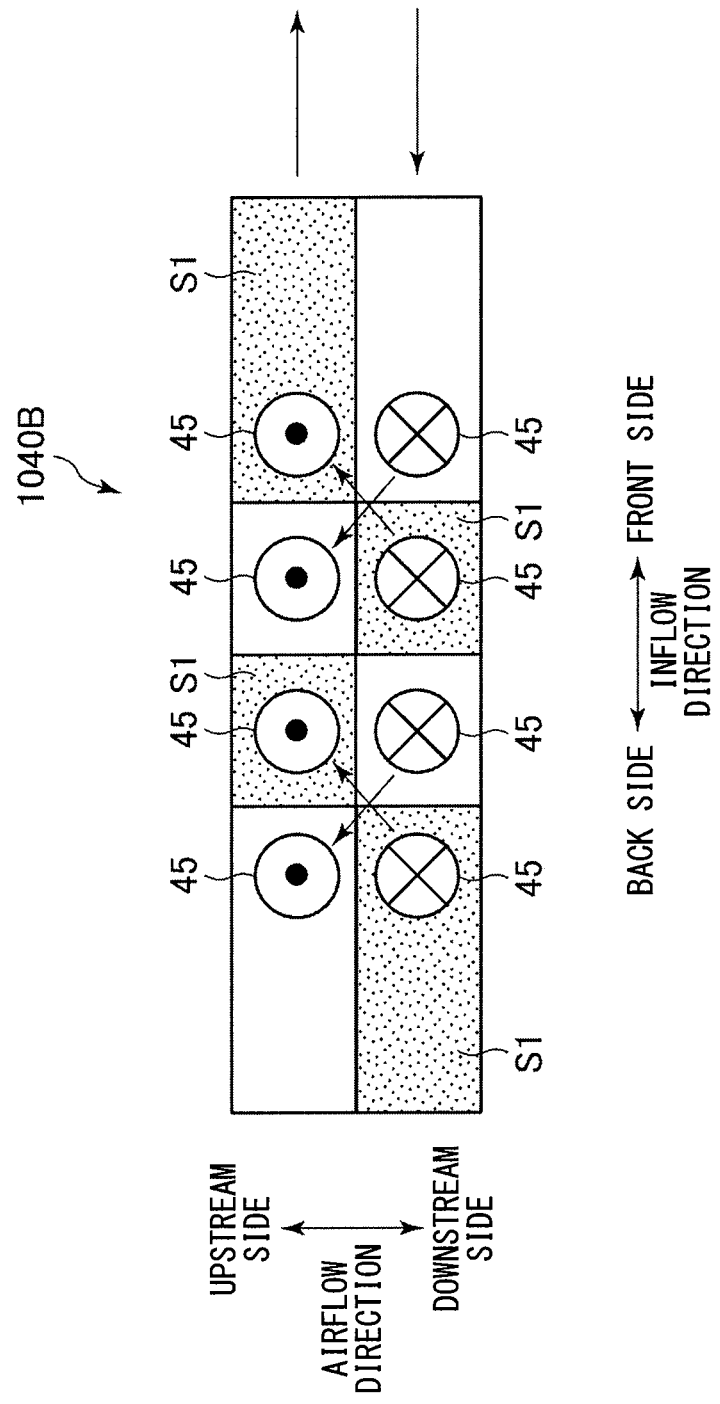
FIG. 42 is a plan view schematically illustrating the flow of refrigerant in the evaporator illustrated in FIG. 41.

First, an issue in an evaporator 2040 which includes a conventional two-turn type refrigerant passage will be described as a comparative example with reference to FIGS. 36 to 38.

In the evaporator 2040, a refrigerant flowing into a first header 2041 flows into a second header 2042 through refrigerant tubes 45 of a first heat exchange unit 48 (first turn). The second header 2042 and a fourth header 2044 communicate with each other. Thus, the refrigerant flowing into the second header 2042 flows into the fourth header 2044. The refrigerant flowing into the fourth header 2044 flows into a third header 2043 through refrigerant tubes 45 of a second heat exchange unit 49 (second turn). The refrigerant flowing into the third header 2043 flows out to the outside.

In the evaporator 2040 having such a structure, when the flow rate of the refrigerant is low, the refrigerant is likely to flow only to refrigerant tubes 45 on the front side in the inflow direction near an inlet of the refrigerant passage and less likely to be supplied to refrigerant tubes 45 on the back side in the inflow direction. Thus, when the flow rate of the refrigerant inside the refrigerant passage is low, there is the overheated area S1 in an area on the back side in the inflow direction. An overheated area S2 (second overheated area) illustrated in FIG. 37 is an overheated area which is formed near an outlet and a subject in the first to sixth embodiments.

The evaporator 1040 of the seventh embodiment is characterized in the structure of the refrigerant passage in order to reduce the influence of the overheated area S1 as described above and ensure a cold storage performance of the cold storage material 50. The evaporator 1040 is similar to the evaporator 1040 of the first embodiment in the basic structure, but differs from the evaporator 1040 of the first embodiment in the structure of the refrigerant passage, more specifically, in sections inside a first header 1041, a second header 1042, a third header 1043, and a fourth header 1044 and a mutual communication relationship therebetween.

Figure 33:
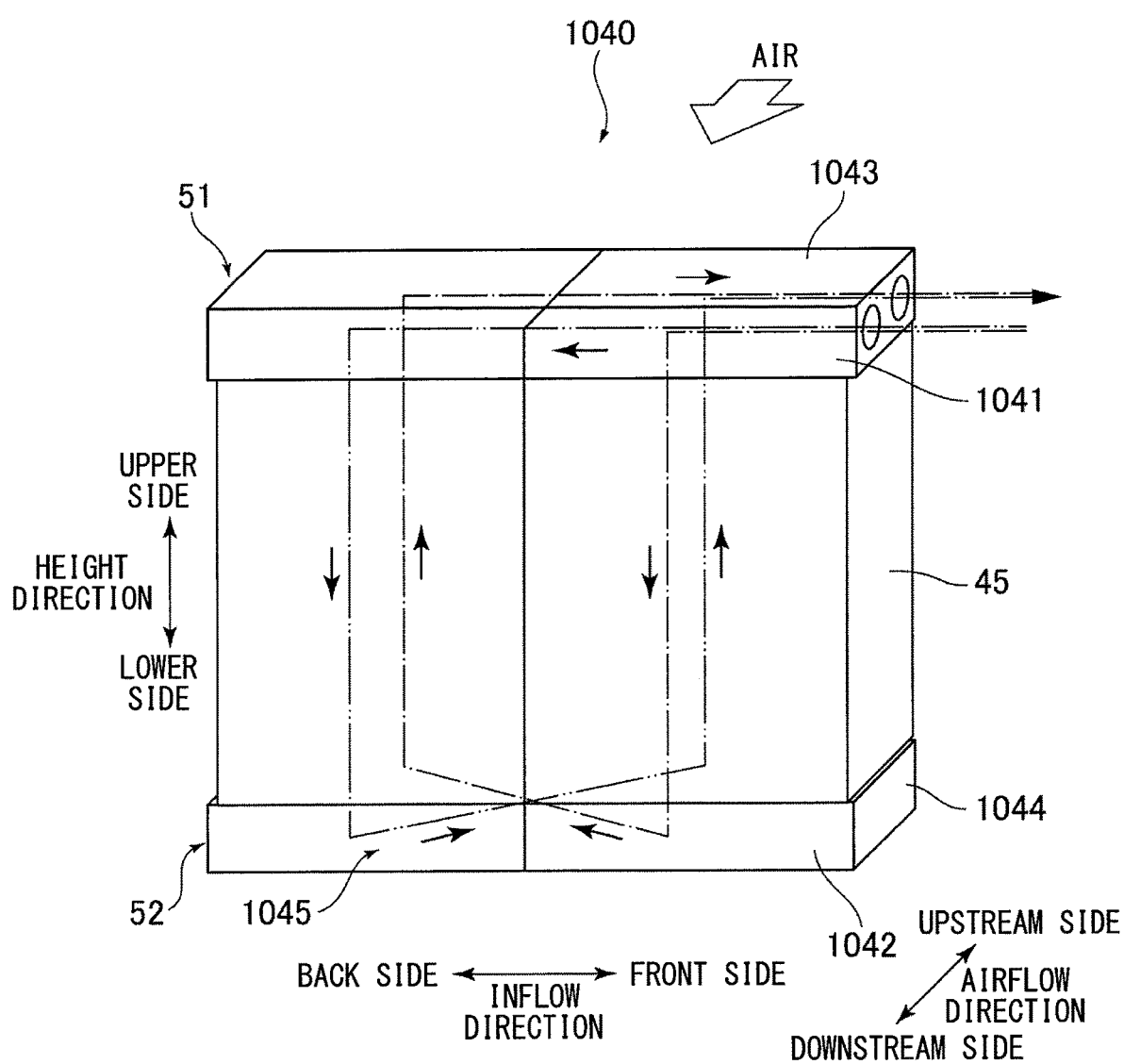
FIG. 33 is a diagram schematically illustrating the flow of refrigerant in an evaporator according to a seventh embodiment.
Figure 34:
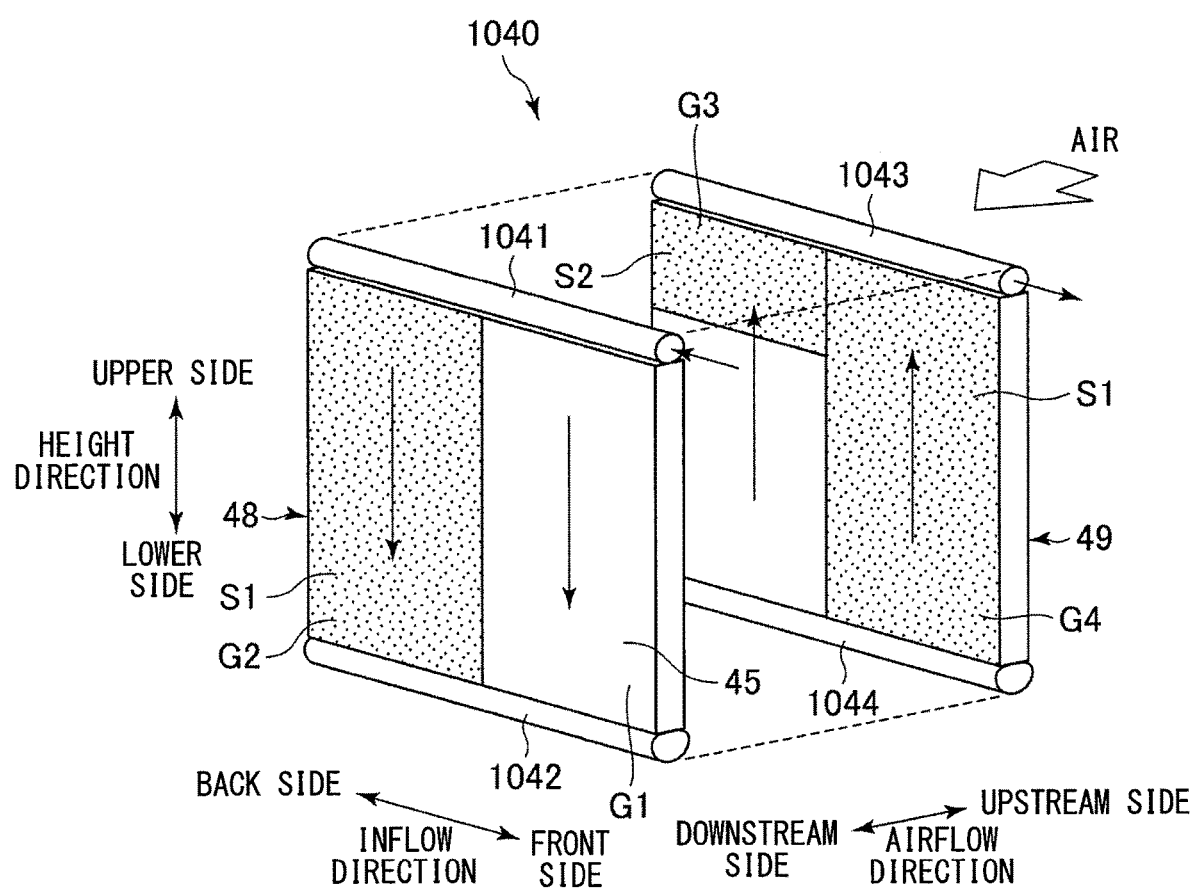
FIG. 34 is a schematic view of the evaporator illustrated in FIG. 33 exploded into the upstream side and the downstream side in the airflow direction.
Figure 35:
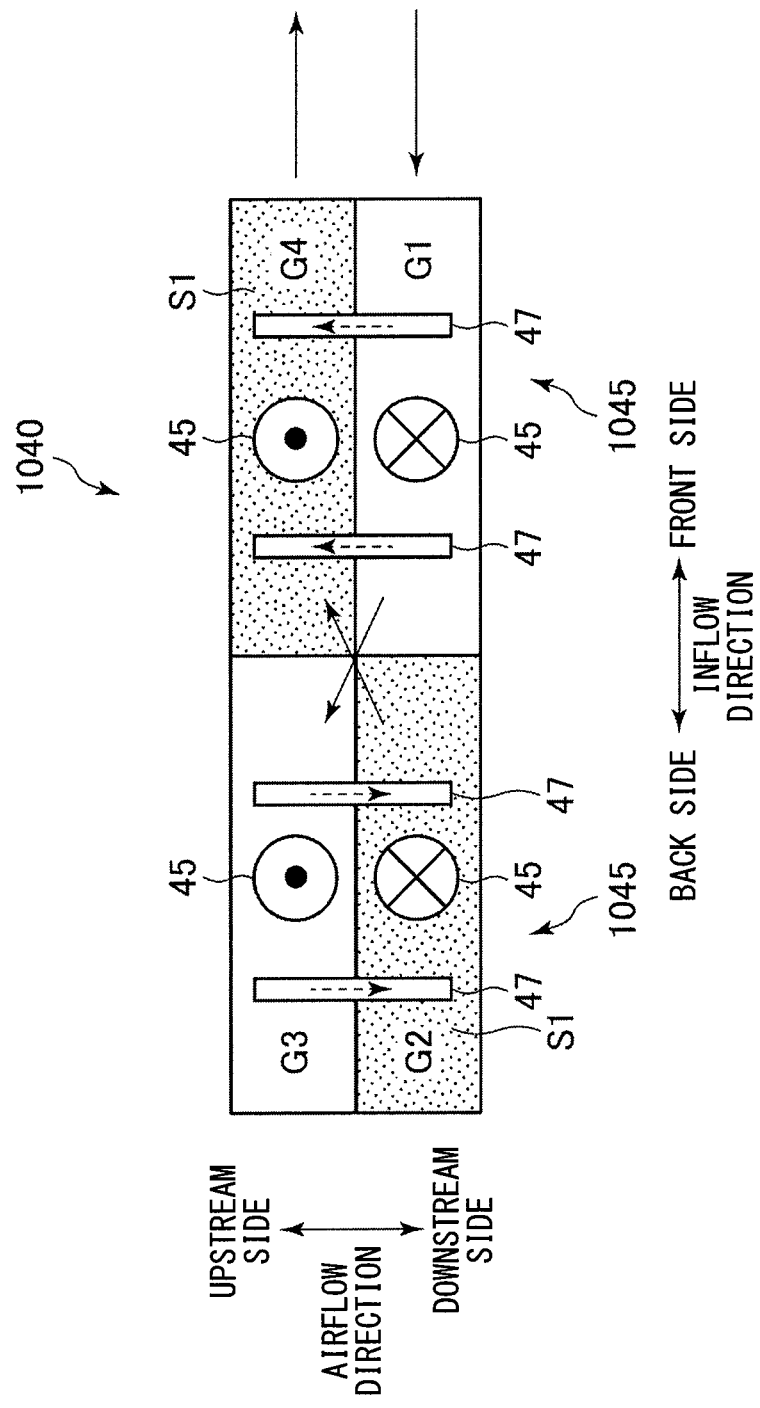
FIG. 35 is a plan view schematically illustrating the flow of refrigerant in the evaporator illustrated in FIG. 33.

As illustrated in FIGS. 33 to 35, a first section and a second section communicate with each other inside the first header 1041 differently from the first header 41 of the first embodiment. Thus, a refrigerant supplied to the first header 1041 is distributed to a plurality of refrigerant tubes 45 belonging to a first group G1 and a second group G2. The refrigerant flows into a first section of the second header 1042 through the refrigerant tubes 45 of the first group G1 and flows into a second section of the second header 1042 through the refrigerant tubes 45 of the second group G2.

The second header 1042 differs from the second header 42 of the first embodiment in that the first section and the second section are uncommunicably sealed. Similarly, the fourth header 1044 differs from the fourth header 44 of the first embodiment in that a first section and a second section are uncommunicably sealed. The first section of the second header 42 which is located on the front side in the inflow direction and the downstream side in the airflow direction communicates with the first section of the fourth header 1044 which is located on the back side in the inflow direction and the upstream side in the airflow direction. The second section of the second header 42 which is located on the back side in the inflow direction and the downstream side in the airflow direction communicates with the second section of the fourth header 1044 which is located on the front side in the inflow direction and the upstream side in the airflow direction. Correspondingly, the refrigerant flows into the first section of the fourth header 1044 from the first section of the second header 1042 and flows into the second section of the fourth header 1044 from the second section of the second header 1042.

A first section and a second section communicate with each other inside the third header 1043 differently from the third header 43 of the first embodiment. The refrigerant flowing into the first section of the fourth header 1044 is distributed to a plurality of refrigerant tubes 45 belonging to a third group G3. The refrigerant flowing into the second section of the fourth header 1044 is distributed to a plurality of refrigerant tubes 45 belonging to a fourth group G4. The refrigerant flows into the third header 1043 through the refrigerant tubes 45 of the third group G3 and the fourth group G4 so as to be collected therein. The refrigerant inside the third header 1043 flows out of the refrigerant outlet and flows toward the compressor 10.

In this manner, in the evaporator 1040 of the seventh embodiment, the refrigerant passage has a structure that changes the position in the inflow direction of the refrigerant introduced from the first header 1041 on the upper side in the height direction in a second header tank 52 on the lower side in the height direction. That is, the position of the refrigerant introduced from the front side in the inflow direction through the refrigerant tubes 45 of the first group G1 is changed to the back side in the inflow direction. Further, the position of the refrigerant introduced from the back side in the inflow direction through the refrigerant tubes 45 of the second group G2 is changed to the front side in the inflow direction. As illustrated in FIGS. 33 and 35, a schematic shape of the refrigerant passage inside the second header tank 52 is an X shape when viewed in the height direction. Further, a schematic shape of the refrigerant passage inside the evaporator 1040 is a crossed shape of two two-turn type refrigerant passages. The structure of the refrigerant passage of the seventh embodiment is referred to as a "flow change type" for convenience.

The structure of the flow change type refrigerant passage of the seventh embodiment can be described as follows. The evaporator 1040 includes a first header tank 51 which is formed in such a manner that refrigerant tubes 45 communicate with the first header tank 51 at one end side thereof and the longitudinal direction of the first header tank 51 is aligned with the array direction (inflow direction) of the refrigerant tubes 45 and the cold storage material container 47 and the second header tank 52 which is formed in such a manner that the refrigerant tubes 45 communicate with the second header tank 52 at the other end side thereof and the longitudinal direction of the second header tank 52 is aligned with the inflow direction. The refrigerant tubes 45 are arranged in two rows so as to be paired in the airflow direction of air in the air passage 53. The inside of the first header tank 51 is divided into the first header 1041 and the third header 1043. The first header 1041 is an inlet side passage which communicates with some of the refrigerant tubes 45 disposed on the downstream side in the airflow direction and includes an inlet of the refrigerant passage on one end in the longitudinal direction thereof. The third header 1043 is an outlet side passage which communicates with some of the refrigerant tubes 45 disposed on the upstream side in the airflow direction and includes an outlet of the refrigerant passage on one end (or the other end) in the longitudinal direction thereof.

The refrigerant tubes 45 are divided into the first group G1, the second group G2, the third group G3, and the fourth group G4. The refrigerant tubes 45 of the first group G1 communicate with the first header 1041 as the inlet side passage, and are disposed on one end side in the longitudinal direction (the front side in the inflow direction). The refrigerant tubes 45 of the second group G2 communicate with the first header 1041 as the inlet side passage, and are disposed on the other end side in the longitudinal direction (the back side in the inflow direction). The refrigerant tubes 45 of the third group G3 communicate with the third header 1043 as the outlet side passage, and are disposed on the other end side in the longitudinal direction. The refrigerant tubes 45 of the fourth group G4 communicate with the third header 1043 as the outlet side passage, and are disposed on the one end side in the longitudinal direction.

The second header tank 52 is configured to allow communication between the first group G1 and the third group G3 and communication between the second group G2 and the fourth group G4 and change the position of a refrigerant introduced to the front side in the inflow direction from the first header 1041 and the position of a refrigerant introduced to the back side in the inflow direction from the first header 1041 to the back side and the front side, respectively, so as to be led to the third header 1043. The overheated area S1 is formed in the second group G2 and the fourth group G4 of the refrigerant tubes 45 due to flow rate variations in the refrigerant passage when the flow rate of the refrigerant is low. With the above structure of the refrigerant passage, as illustrated in FIG. 35, it is possible to achieve a structure in which a single cold storage material container 47 is joined to both of the second group G2 having the overheated area S1 and the third group G3 having no overheated area S1. Similarly, it is possible to achieve a structure in which a single cold storage material container 47 is joined to both of the first group G1 having no overheated area S1 and the fourth group G4 having the overheated area S1.

With the structure of the flow change type refrigerant passage as described above, even in a condition in which the refrigerant introduced into the first header 1041 is less likely to flow into the back side in the inflow direction, for example, when the flow rate of the refrigerant is low, it is possible to provide the flow of the refrigerant with a relatively high flow rate over the entire area in the inflow direction through the refrigerant tubes 45 of the first group G1 and the third group G3. That is, it is possible to flow the refrigerant to the back side in the inflow direction in an excellent manner even when the flow rate of the refrigerant is low. A single cold storage material container 47 is jointed to two refrigerant tubes 45 which are disposed in parallel in the airflow direction. The refrigerant flows through one of the two refrigerant tubes 45 with a relatively high flow rate. Accordingly, even when the overheated area S1 is formed on the other one of the two refrigerant tubes 45 to which the cold storage material container 47 is joined, cold in a non-overheated area can be transferred to the cold storage material 50 in the overheated area S1. Thus, it is possible to cool the cold storage material 50 inside the cold storage material container 47 in an excellent manner.

That is, the seventh embodiment is characterized in a refrigerant passage structure 1045 in which a single cold storage material container 47 is joined to both of the refrigerant tube 45 having the overheated area S1 and the refrigerant tube 45 having no overheated area by changing the position in the inflow direction of the refrigerant in the second header tank 52 by the flow change type refrigerant passage. The refrigerant passage structure 1045 functions as a "heat transfer suppressor" which suppresses heat transfer from the refrigerant tube 45 to the cold storage material 50 in the overheated area S1 which is formed due to flow rate variations in the refrigerant passage when the flow rate of the refrigerant is low. Further, the refrigerant passage structure 1045 as described above makes it possible to suppress heat transfer from the refrigerant tube 45 to the cold storage material 50 in the overheated area S1 and avoid a situation in which the cold storage material 50 is less cooled due to the influence of the overheated area S1 where the refrigerant temperature becomes high. As a result, the evaporator 1040 as the cold storage heat exchanger of the seventh embodiment is capable of ensuring the cold storage performance by reducing the influence of the overheated area S1 even when there is the overheated area S1.

Further, the surface of the cold storage material container 47 may have recesses and projections, and the projections may be joined to the refrigerant tubes 45.

Modifications of Seventh Embodiment

Modifications of the seventh embodiment will be described with reference to FIGS. 39 to 42. In the seventh embodiment, there has been described, as an example, one flow change type refrigerant passage, that is, the refrigerant passage structure 1045 in which the position in the inflow direction of the refrigerant is changed at one location in the second header tank 52. However, another structure that includes at least one flow change type refrigerant passage may be employed. For example, an evaporator 1040A illustrated in FIGS. 39 and 40 uses one flow change type refrigerant passage in combination with a conventional two-turn type refrigerant passage. An evaporator 1040B illustrated in FIGS. 41 and 42 uses two flow change type refrigerant passages which are disposed in the inflow direction in combination. Further, a plurality of flow change type refrigerant passages may be disposed in the inflow direction. The refrigerant passages of the evaporator 1040A and the evaporator 1040B also make it possible to achieve a structure similar to the refrigerant passage structure 1045 of the seventh embodiment. Thus, it is possible to achieve an effect similar to the effect of the evaporator 1040 of the seventh embodiment.

Eighth Embodiment

Figure 43:
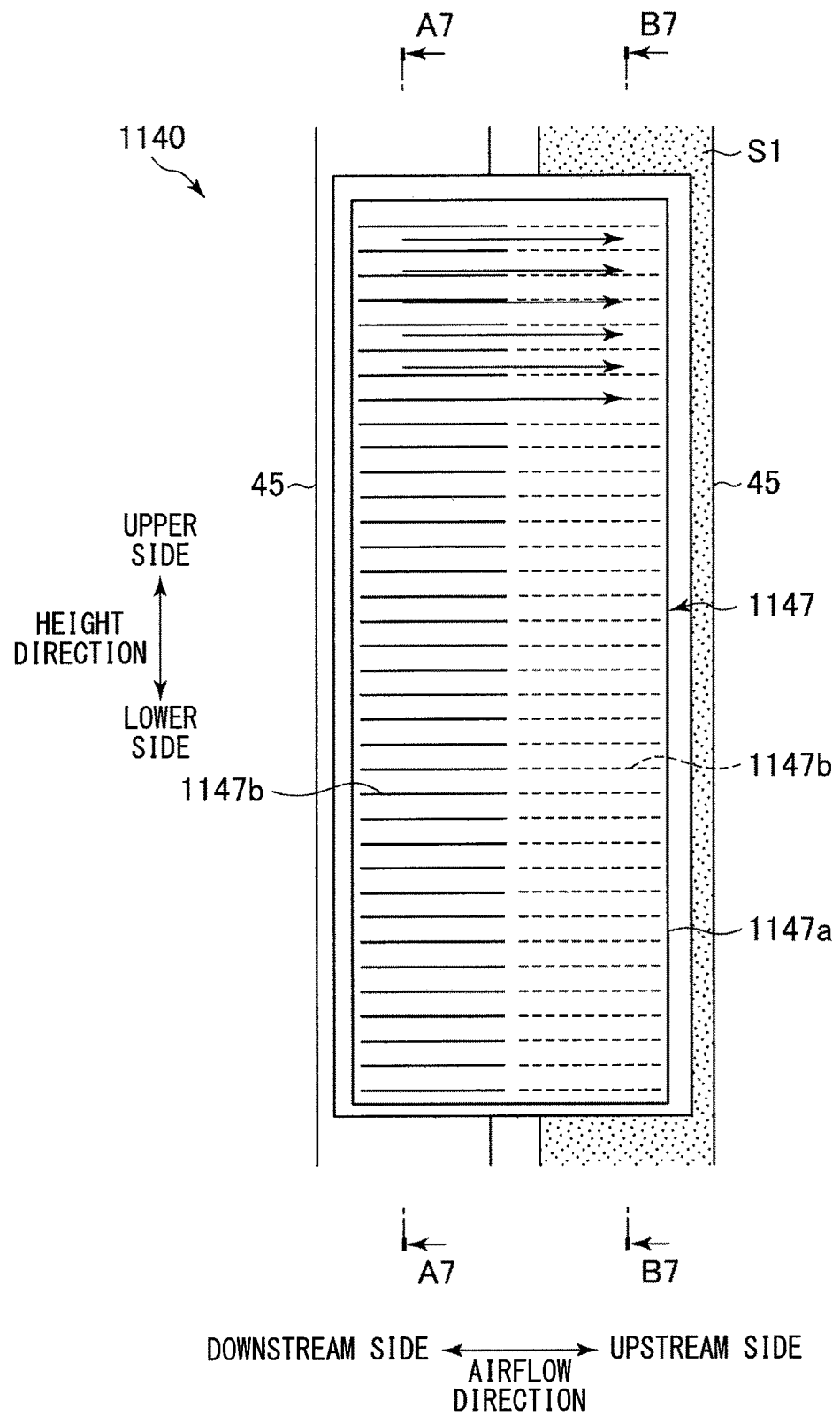
FIG. 43 is a sectional view schematically illustrating the shape of an inner fin which functions as a heat transfer suppressor in an evaporator according to an eighth embodiment.
Figure 44:
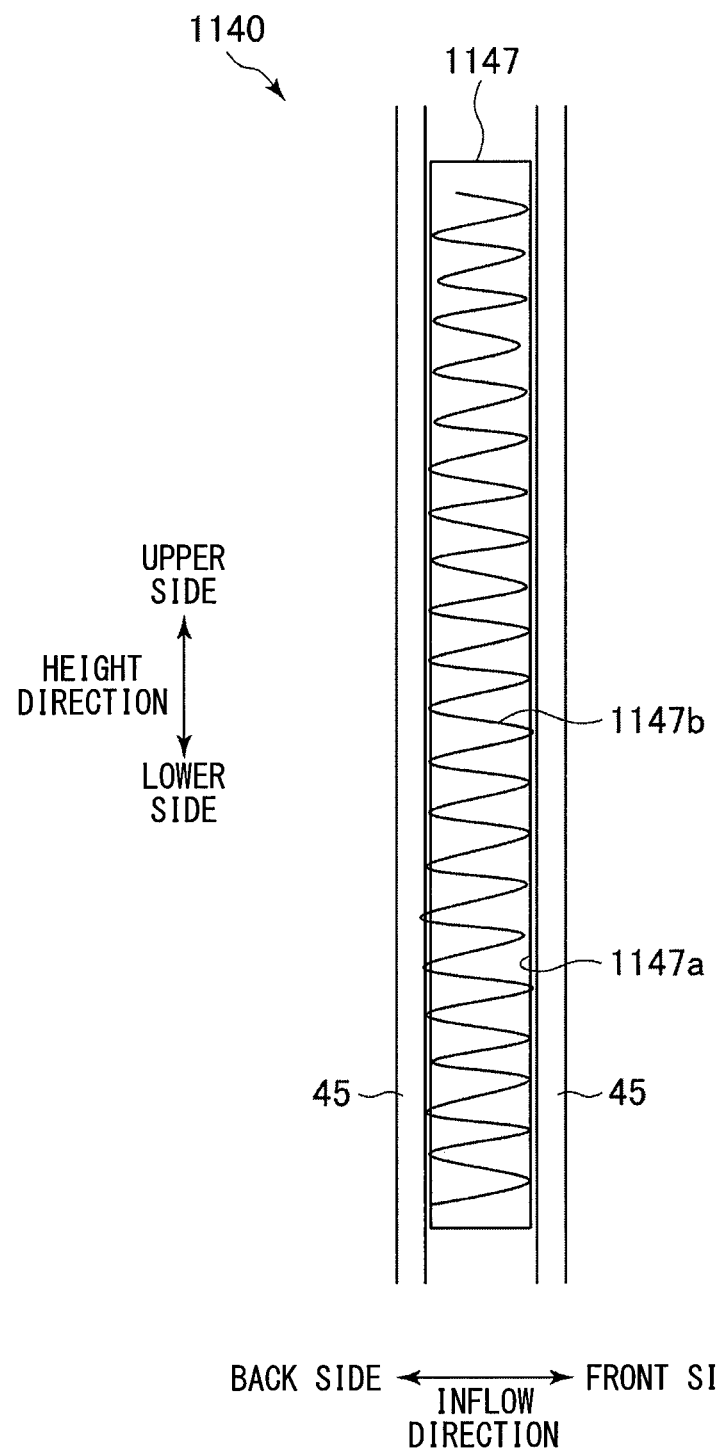
FIG. 44 is a sectional view taken along a line A7-A7 in FIG. 43.
Figure 45:
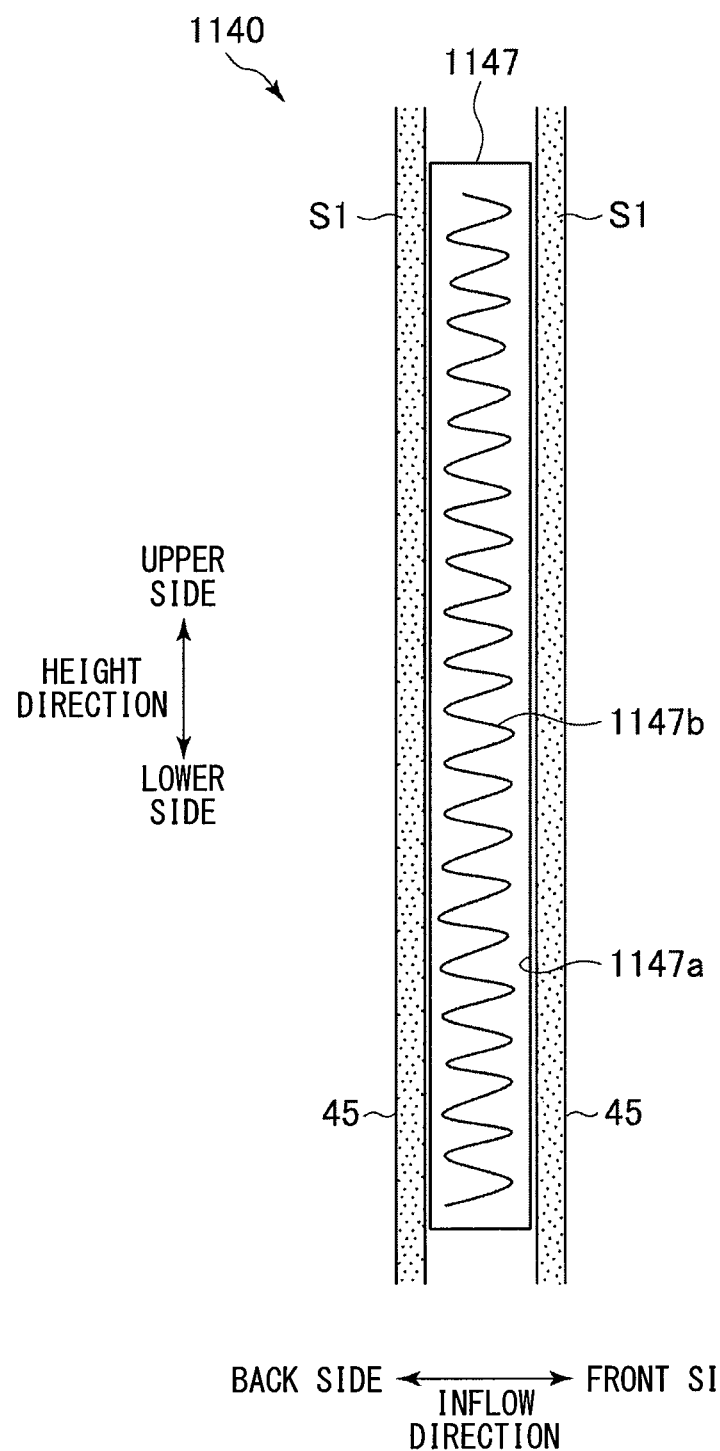
FIG. 45 is a sectional view taken along a line B7-B7 in FIG. 43.

An eight embodiment will be described with reference to FIGS. 43 to 45. An evaporator 1140 of the eighth embodiment differs from the evaporator 1040 of the seventh embodiment in that a function of an inner fin 1147*b* is further provided in addition to the structure of the seventh embodiment as the heat transfer suppressor which suppresses heat transfer from the refrigerant tube 45 to the cold storage material 50 in the overheated area 51 which is formed due to flow rate variations in the refrigerant passage when the flow rate of the refrigerant is low. Specifically, as illustrated in FIGS. 43 to 45, the evaporator 1140 of the eighth embodiment differs from the evaporator 1040 of the seventh embodiment in that, in a cold storage material container 1147 which is in contact with the overheated area 51 (the back and downstream side, the front and upstream side), the inner fin 1147*b* is not in contact with the overheated area 51.

In other words, the inner fin 1147*b* extends in the longitudinal direction (height direction) of the cold storage material container 1147 inside the cold storage material container 1147. The inner fin 1147*b* is not joined to the inner wall of the cold storage material container 1147 in a part where the cold storage material container 1147 is joined to refrigerant tubes 45 of the second group G2 and the fourth group G4 having the overheated area 51 (a cross section taken along line B7-B7 in FIG. 43). Further, the inner fin 1147*b* is joined to the inner wall of the cold storage material container 1147 in a part where the cold storage material container 1147 is in contact with refrigerant tubes 45 of the first group G1 and the third group G3 having no overheated area 51 (a cross section taken along line A7-A7 in FIG. 43). The inner fin 1147*b* functions as the heat transfer suppressor.

With the above structure, the evaporator 1140 of the eighth embodiment achieves an effect similar to the effect of the seventh embodiment. Further, since the inner fin 1147*b* is not in contact with the cold storage material container 1147 in the overheated area S1, heat in the overheated area S1 is less likely to be transferred to the cold storage material 50 inside the cold storage material container 1147. Thus, it is possible to more appropriately cool the cold storage material inside the cold storage material container 1147 with cold in a non-overheated area without the influence of the heat in the overheated area S1.

A joining structure between the inner fin 1147*b* and the cold storage material container 1147 of the eighth embodiment is not limited to the above structure and may have another structure that makes a heat transfer amount from the refrigerant tube 45 to the cold storage material 50 through the inner fin 1147*b* in the overheated area S1 relatively smaller than a heat transfer amount in an area other than the overheated area S1. In other words, it may only be required to make the heat transfer performance of the inner fin 1147*b* in the overheated area S1 relatively lower than the other part. For example, similarly to the structure described in the first embodiment with reference to FIG. 11, the inner fin 1171*b* may be joined to the inner wall surface of an outer shell 1147*a* of the cold storage material container 1147 with a relatively low joining ratio in a part that is in contact with the overheated area S1 of the refrigerant tube 45 and joined to the inner wall surface with a relatively high joining ratio in a part that is in contact with an area other than the overheated area S1 of the refrigerant tube 45. It is possible to suppress heat transfer from the refrigerant tube 45 to the cold storage material 50 in the overheated area S1 by making the heat transfer amount through the inner fin 1147*b* in the overheated area S1 relatively small or making the joining ratio between the inner fin 1147*b* and the cold storage material container 1147 in the overheated area S1 relatively low in this manner. As a result, it is possible to obtain an effect similar to the effect of the evaporator 1140 of the present embodiment.

Further, similarly to the structure described in the first embodiment with reference to FIG. 12, the corrugated shape of the inner fin 1147*b* may be continuous in the short direction (airflow direction) of the cold storage material container 1147, that is, peaks and valleys of the inner fin 1147*b* may extend in the height direction. In this case, peaks and valleys of the inner fin 1147*b* that are in contact with the overheated area S1 of the refrigerant tube 45 in the airflow direction are not joined to the inner wall surface of the outer shell 1147*a* of the cold storage material container 1147, and peaks and valleys of the inner fin 1147*b* that are in contact with an area other than the overheated area S1 are joined to the inner wall surface. Also with the above structure, it is possible to suppress heat transfer from the refrigerant tube 45 to the cold storage material 50 in the overheated area S1 and achieve an effect similar to the effect of the evaporator 1140 of the present embodiment.

Ninth Embodiment

Figure 46:
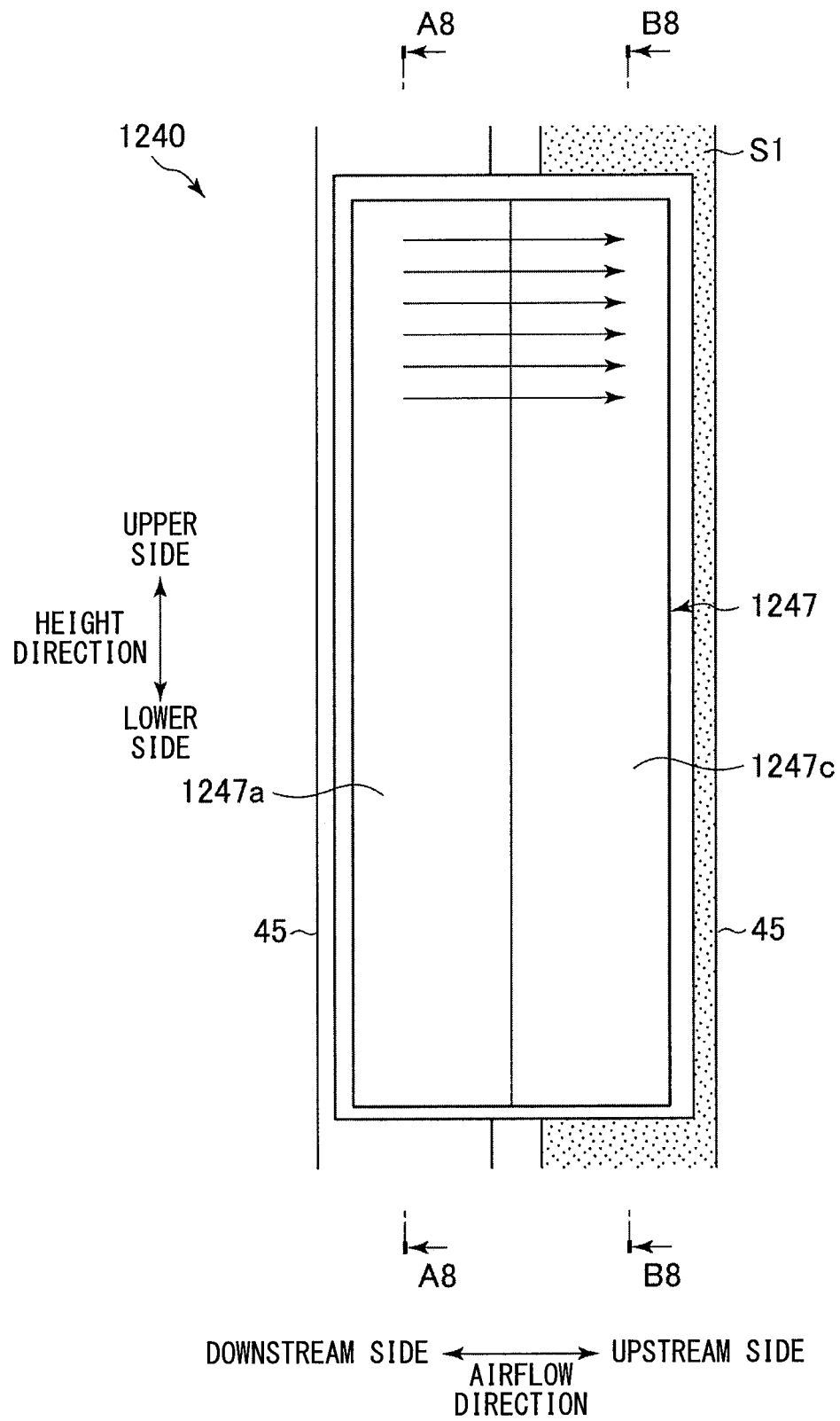
FIG. 46 is a sectional view schematically illustrating the shape of a cold storage material container which functions as a heat transfer suppressor in an evaporator according to a ninth embodiment.
Figure 47:
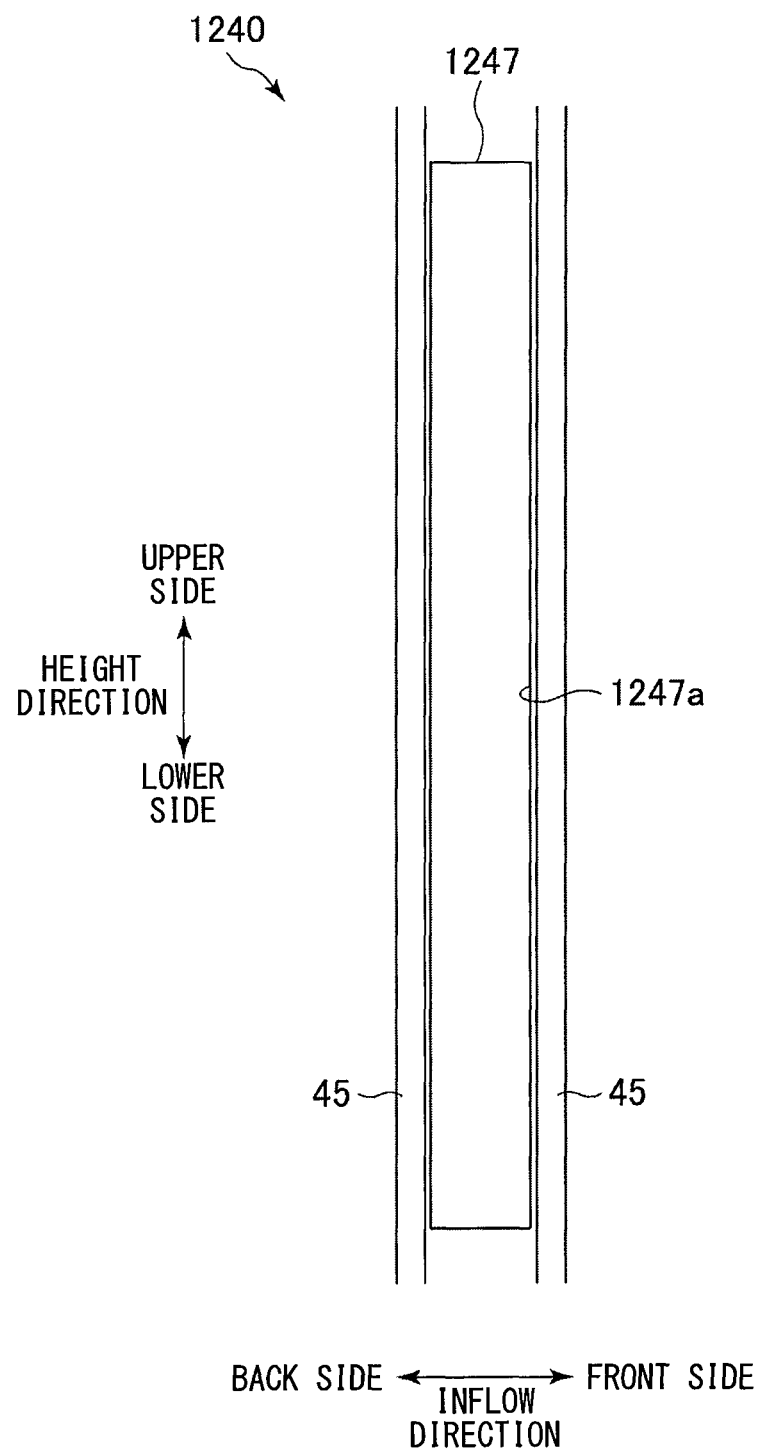
FIG. 47 is a sectional view taken along a line A8-A8 in FIG. 46.
Figure 48:
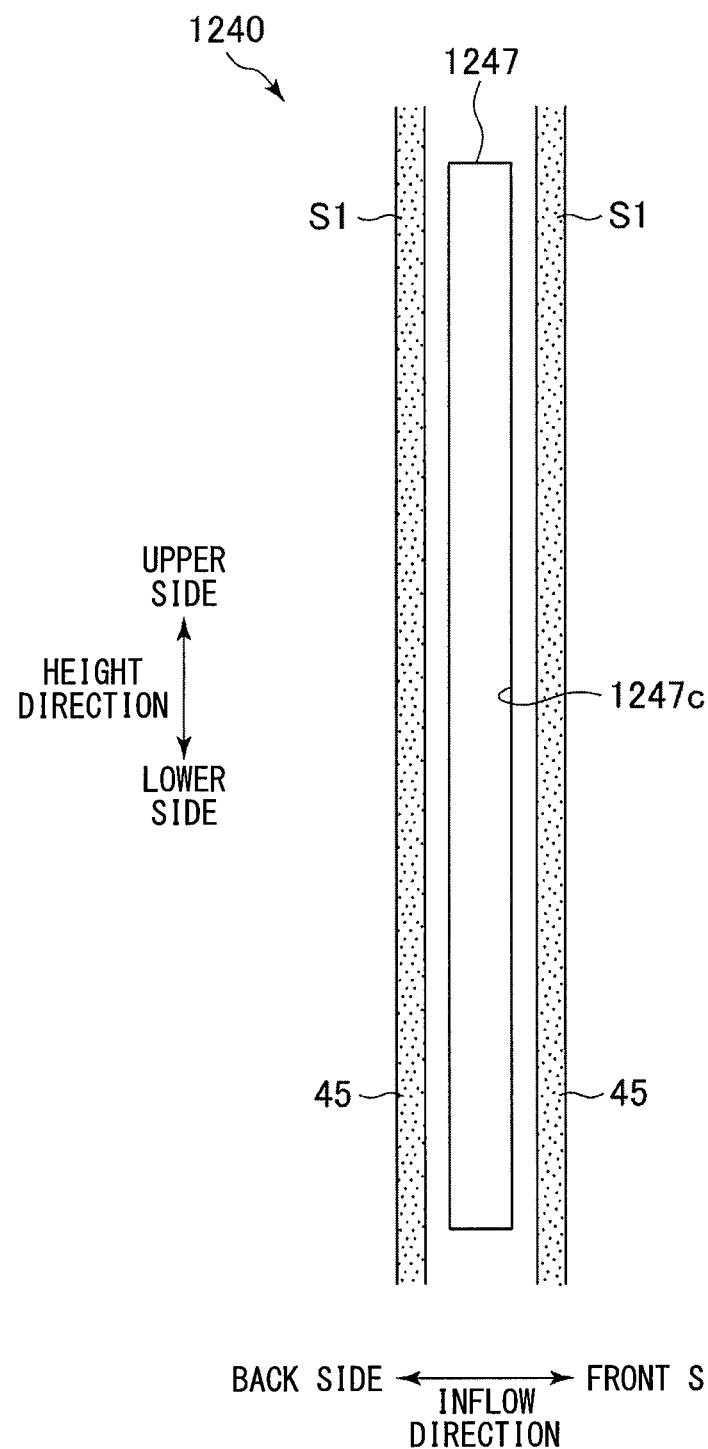
FIG. 48 is a sectional view taken along a line B8-B8 in FIG. 46.

A ninth embodiment will be described with reference to FIGS. 46 to 48. An evaporator 1240 of the ninth embodiment differs from the evaporator 1040 of the seventh embodiment in that a function of a cold storage material container 1247 is also provided in addition to the structure of the seventh embodiment as the heat transfer suppressor which suppresses heat transfer from the refrigerant tube 45 to the cold storage material 50 in the overheated area S1 which is formed due to flow rate variations in the refrigerant passage when the flow rate of the refrigerant is low. Specifically, as illustrated in FIGS. 46 to 48, the evaporator 1240 of the ninth embodiment differs from the evaporator 1040 of the seventh embodiment in that the cold storage material container 1247 which is in contact with the overheated area S1 (the back and downstream side, the front and upstream side) is not joined to the refrigerant tube 45 having the overheated area S1. Further, the evaporator 1240 of the ninth embodiment differs from the evaporator 1040 of the seventh embodiment in that no inner fin is disposed inside the cold storage material container 1247.

In other words, the cold storage material container 1247 is separated from the refrigerant tubes 45 without being joined to the refrigerant tubes 45 in a part that is in contact with refrigerant tubes 45 of the second group G2 and the fourth group G4 having the overheated area S1 (a cross section taken along line B8-B8 in FIG. 46, an area 1247*c*). Further, the cold storage material container 1247 is joined to the refrigerant tubes 45 in a part that is in contact with refrigerant tubes 45 of the first group G1 and the third group G3 having no overheated area S1 (a cross section taken along line A8-A8 in FIG. 46, an outer shell 1247*a*). The cold storage material container 1247 functions as the heat transfer suppressor.

With the above structure, the evaporator 1240 of the ninth embodiment achieves an effect similar to the effect of the seventh embodiment. Further, since the cold storage material container 1247 is not in contact with the refrigerant tubes 45 in the overheated area S1, heat in the overheated area S1 is less likely to be transferred to the cold storage material 50 inside the cold storage material container 1247. Thus, it is possible to more appropriately cool the cold storage material 50 inside the cold storage material container 1247 with cold in a non-overheated area without the influence of the heat in the overheated area S1.

Figure 49:
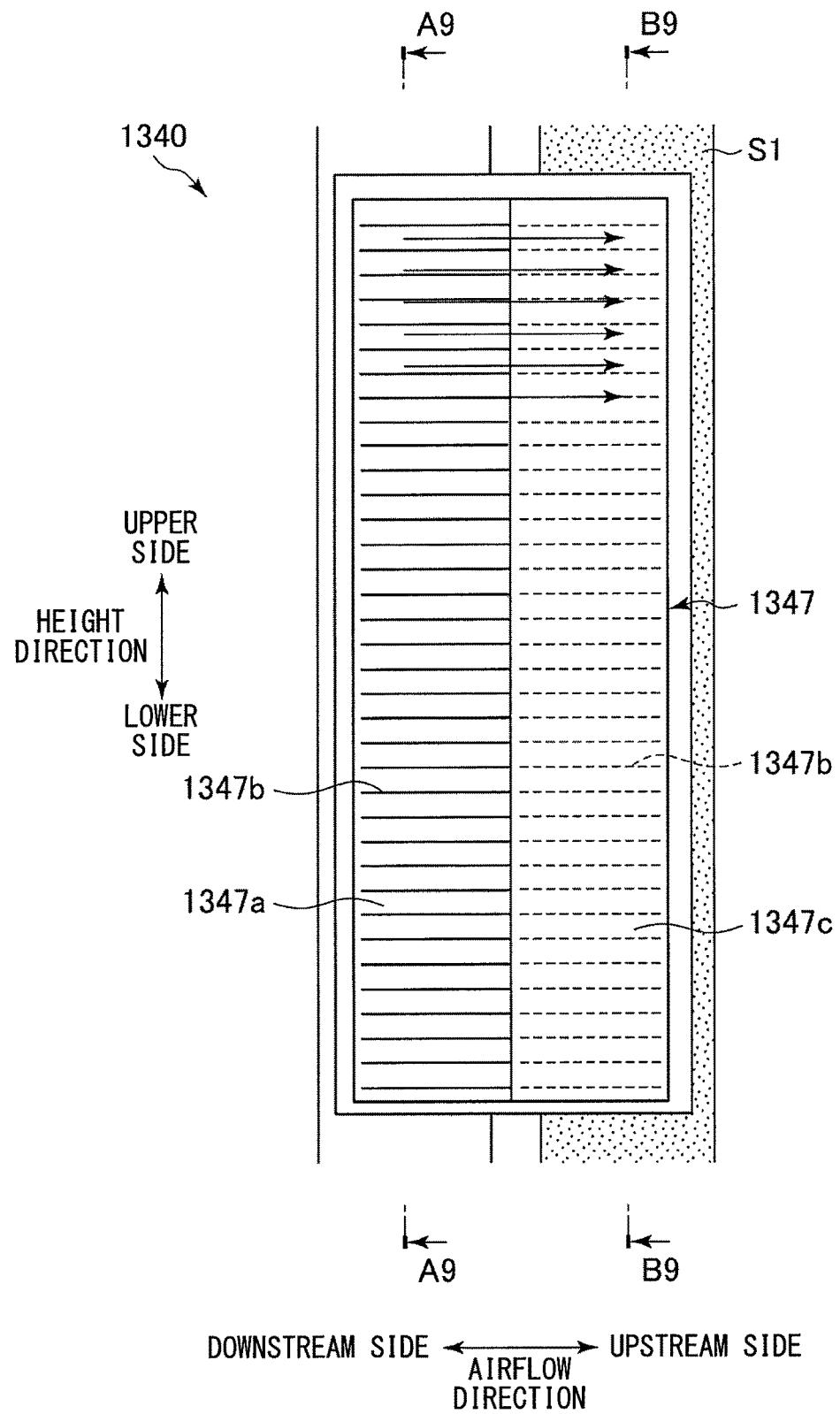
FIG. 49 is a sectional view schematically illustrating the shape of a cold storage material container which functions as a heat transfer suppressor in an evaporator according to a tenth embodiment.
Figure 50:
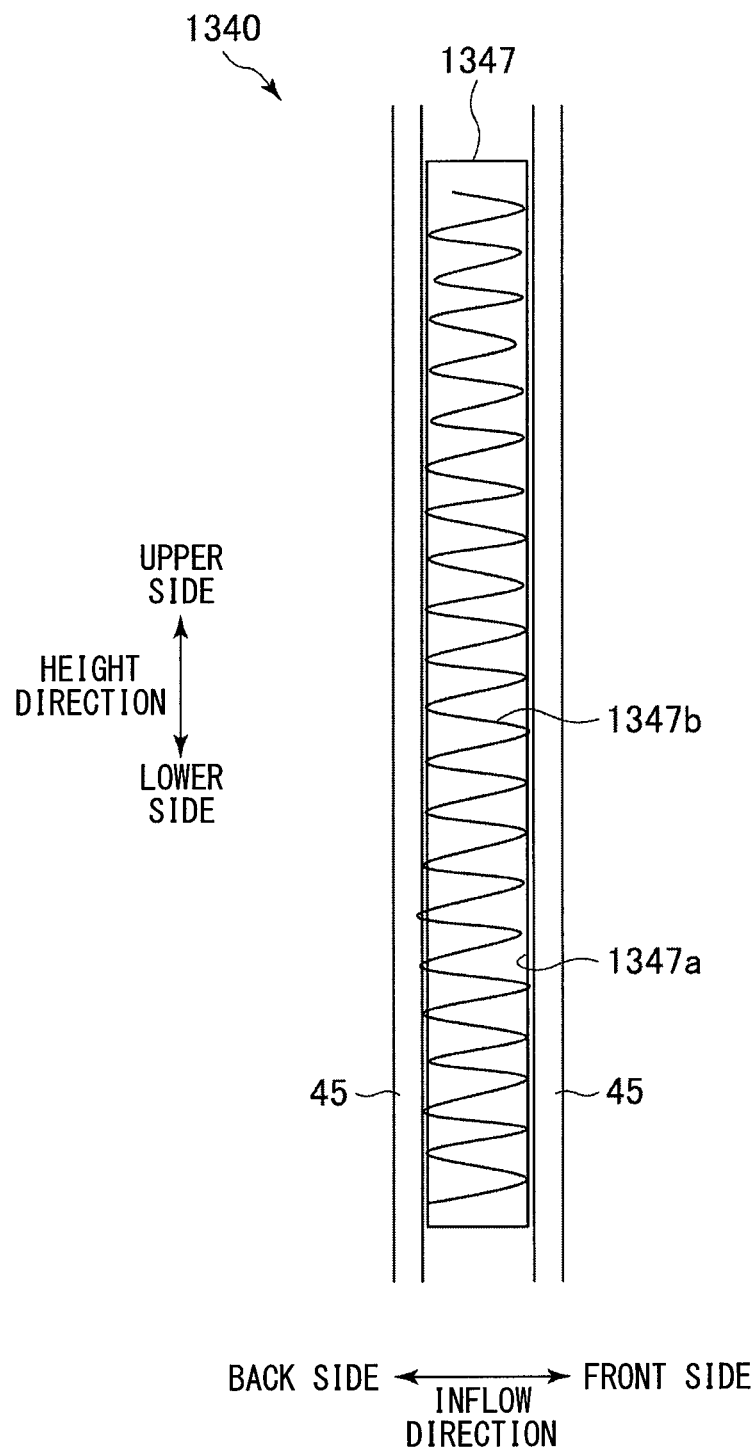
FIG. 50 is a sectional view taken along a line A9-A9 in FIG. 49.
Figure 51:
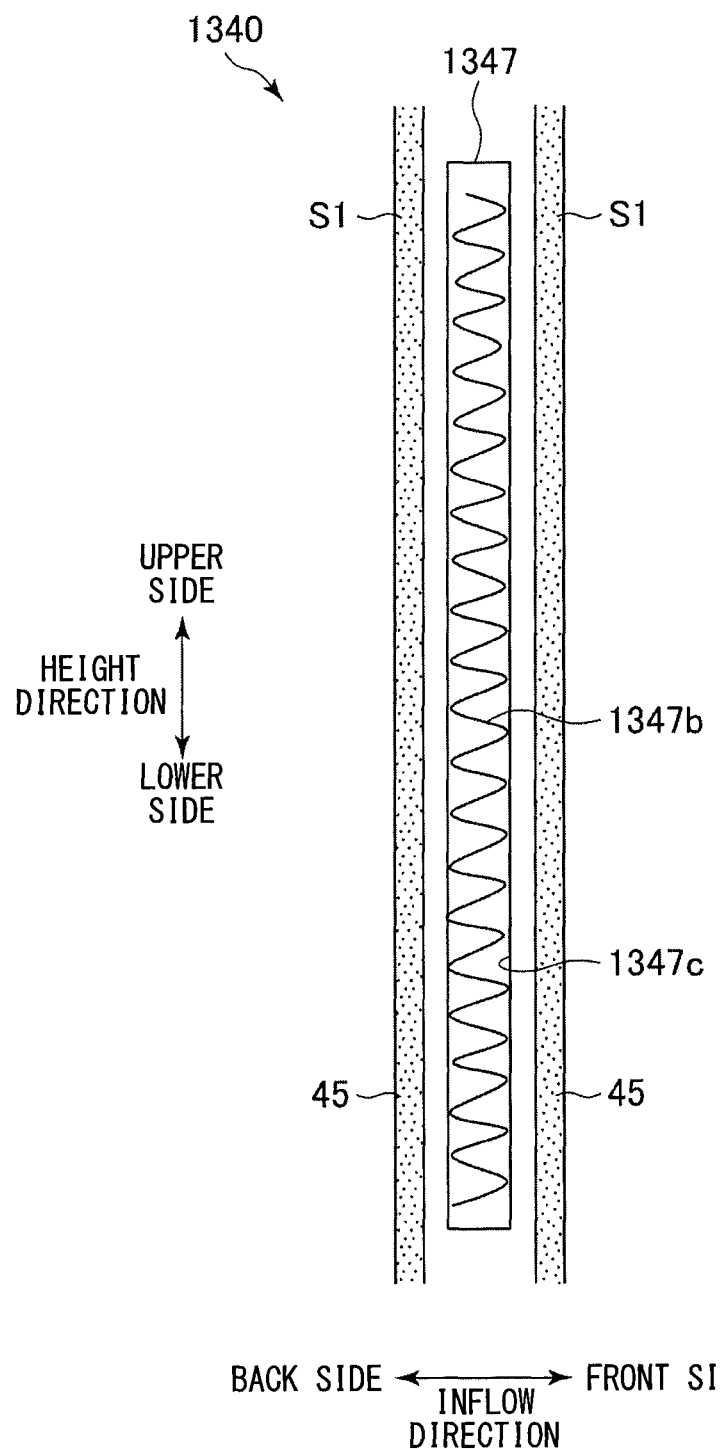
FIG. 51 is a sectional view taken along a line B9-B9 in FIG. 49.

The shape of the cold storage material container 1247 of the ninth embodiment is not limited to the above shape and may have another structure that makes a heat transfer amount from the refrigerant tube 45 to the cold storage material 50 through the cold storage material container 1247 in the overheated area S1 relatively smaller than a heat transfer amount in an area other than the overheated area S1. In other words, it may only be required to make the heat transfer performance of the cold storage material container 1247 in the overheated area S relatively lower than that in the other area. For example, similarly to the structure described in the second embodiment with reference to FIG. 23, the cold storage material container 1247 may be jointed to the refrigerant tube 45 with a relatively low joining ratio in a part (area 1247*c*) that is in contact with the overheated area S1 of the refrigerant tube 45 and joined to the refrigerant tube 45 with a relatively high joining ratio in a part (outer shell 1247*a*) that is in contact with an area other than the overheated area S1 of the refrigerant tube 45. It is possible to suppress heat transfer from the refrigerant tube 45 to the cold storage material 50 in the overheated area S1 by making the heat transfer amount of the cold storage material container 1247 in the overheated area S1 relatively small or making the joining ratio between the cold storage material container 1247 and the refrigerant tube 45 relatively low in this manner. As a result, it is possible to obtain an effect similar to the effect of the evaporator 1240 of the present embodiment Tenth Embodiment A tenth embodiment will be described with reference to FIGS. 49 to 51. An evaporator 1340 of the tenth embodiment differs from the evaporator 1040 of the seventh embodiment in that a function of a cold storage material container 1247 is also provided in addition to the structure of the seventh embodiment as the heat transfer suppressor which suppresses heat transfer from the refrigerant tube 45 to the cold storage material 50 in the overheated area S1 which is formed due to flow rate variations in the refrigerant passage when the flow rate of the refrigerant is low. Specifically, as illustrated in FIGS. 49 to 51, the evaporator 1340 of the tenth embodiment differs from the evaporator 1040 of the seventh embodiment in that the cold storage material container 1247 which is in contact with the overheated area S1 (the back and downstream side, the front and upstream side) is not joined to the refrigerant tube 45 having the overheated area S1.

In other words, an inner fin 1347*b* extends in the longitudinal direction (height direction) of the cold storage material container 1347 inside the cold storage material container 1347, and is joined to the inner wall of the cold storage material container 1347 over the entire area in the longitudinal direction. The cold storage material container 1347 is separated from the refrigerant tubes 45 without being joined to the refrigerant tubes 45 in a part that is in contact with refrigerant tubes 45 of the second group G2 and the fourth group G4 having the overheated area S1 (a cross section taken along line B9-B9 in FIG. 49, an area 1347*c*). Further, the cold storage material container 1347 is joined to the refrigerant tubes 45 in a part that is in contact with refrigerant tubes 45 of the first group G1 and the third group G3 having no overheated area S1 (a cross section taken along line A9-A9 in FIG. 49, an outer shell 1347*a*). The cold storage material container 1347 functions as the heat transfer suppressor.

With the above structure, the evaporator 1340 of the tenth embodiment achieves an effect similar to the effect of the seventh embodiment. Further, since the cold storage material container 1347 is not in contact with the refrigerant tubes 45 in the overheated area S1, heat in the overheated area S1 is less likely to be transferred to the cold storage material 50 inside the cold storage material container 1347. Further, since the inner fin 1347*b* is disposed inside the cold storage material container 1347, cold in a non-overheated side is easily transferred to the overheated area side. Thus, it is possible to more appropriately cool the cold storage material 50 inside the cold storage material container 1347 with cold in the non-overheated area without the influence of the heat in the overheated area S1.

Similarly to the eighth embodiment, the evaporator 1340 of the tenth embodiment may have a structure in which the inner fin 1347b is not joined to the inner wall of the cold storage material container 1347 in a part (area 1347c) where the cold storage material container 1347 is joined to the refrigerant tubes 45 of the second group G2 and the fourth group G4 having the overheated area S1. With the above structure, the inner fin 1347b is not joined to the cold storage material container 1347, that is, the refrigerant tubes 45 in the overheated area S1. Thus, heat from the overheated refrigerant is further less likely to be transferred to the inside of the cold storage material 50.

The shape of the cold storage material container 1347 of the tenth embodiment is not limited to the above shape and may have another structure that makes a heat transfer amount from the refrigerant tube 45 to the cold storage material 50 through the cold storage material container 1247 in the overheated area S1 relatively smaller than a heat transfer amount in an area other than the overheated area S1. In other words, it may only be required to make the heat transfer performance of the cold storage material container 1347 in the overheated area S relatively lower than that in the other part. For example, similarly to the structure described in the second embodiment with reference to FIG. 23, the cold storage material container 1347 may be jointed to the refrigerant tube 45 with a relatively low joining ratio in a part (area 1347c) that is in contact with the overheated area S1 of the refrigerant tube 45 and joined to the refrigerant tube 45 with a relatively high joining ratio in a part (outer shell 1347a) that is in contact with an area other than the overheated area S1 of the refrigerant tube 45. It is possible to suppress heat transfer from the refrigerant tube 45 to the cold storage material 50 in the overheated area S1 by making the heat transfer amount of the cold storage material container 1347 in the overheated area S1 relatively small or making the joining ratio between the cold storage material container 1347 and the refrigerant tube 45 relatively low in this manner. As a result, it is possible to obtain an effect similar to the effect of the evaporator 1340 of the present embodiment.

Further, when there is applied a structure that suppresses heat transfer from the refrigerant tube 45 to the cold storage material 50 in the overheated area S1 by a joining structure between the inner fin 1347b and the cold storage material container 1347 similarly to the eighth embodiment, a structure similar to the structure described in the first embodiment with reference to FIG. 11 can be applied. Specifically, the inner fin 1347b is joined to the inner wall surface of the outer shell 1347a of the cold storage material container 1347 with a relatively low joining ratio in a part that is in contact with the overheated area S1 of the refrigerant tube 45 and joined to the inner wall surface with a relatively high joining ratio in a part that is in contact with an area other than the overheated area S1 of the refrigerant tube 45. It is possible to suppress heat transfer from the refrigerant tube 45 to the cold storage material 50 in the overheated area S1 also by making the joining ratio between the inner fin 1347b and the cold storage material container 1347 relatively low in this manner. As a result, it is possible to obtain an effect similar to the effect of the evaporator 1340 of the present embodiment Further, similarly to the structure described in the first embodiment with reference to FIG. 12, the corrugated shape of the inner fin 1347b may be continuous in the short direction (airflow direction) of the cold storage material container 1347, that is, peaks and valleys of the inner fin 1347b may extend in the height direction. Also with the above structure, it is possible to suppress heat transfer from the refrigerant tube 45 to the cold storage material 50 in the overheated area S1 and obtain an effect similar to the effect of the evaporator 1340 of the present embodiment.

Eleventh Embodiment

An eleventh embodiment will be described with reference to FIG. 52. An evaporator 1440 of the eleventh embodiment differs from the evaporator 1040 of the seventh embodiment (refer to FIGS. 33 to 35) in that, in a plurality of refrigerant tubes 45, a high-melting point cold storage material 50A is disposed in a part that is in contact with the second group G2 and the fourth group G4 having an overheated area S1, the high-melting point cold storage material 50A having a relatively high melting point compared to the other part (the first group G1 in the present embodiment), and the high-melting point cold storage material 50A is disposed also in a part that is in contact with the third group G3 having an overheated area S2.

As described above with reference to FIG. 34, in the flow change type refrigerant flow passage structure 1045, the overheated area S1 is formed in the second group G2 and the fourth group G4 of the refrigerant tubes 45 due to flow rate variations in the refrigerant passage when the flow rate of the refrigerant is low. Further, the overheated area S2 is formed near the outlet of the third group G3 of the refrigerant tubes 45 by a mechanism similar to that of the overheated area S of the first to sixth embodiments. In the eleventh embodiment, the high-melting point cold storage material 50A is stored inside each of cold storage material containers 47 which are in contact with the refrigerant tubes 45 having the overheated areas S1, S2 (that is, the second group G2, the third group G3, and the fourth group G4).

Figure 52:
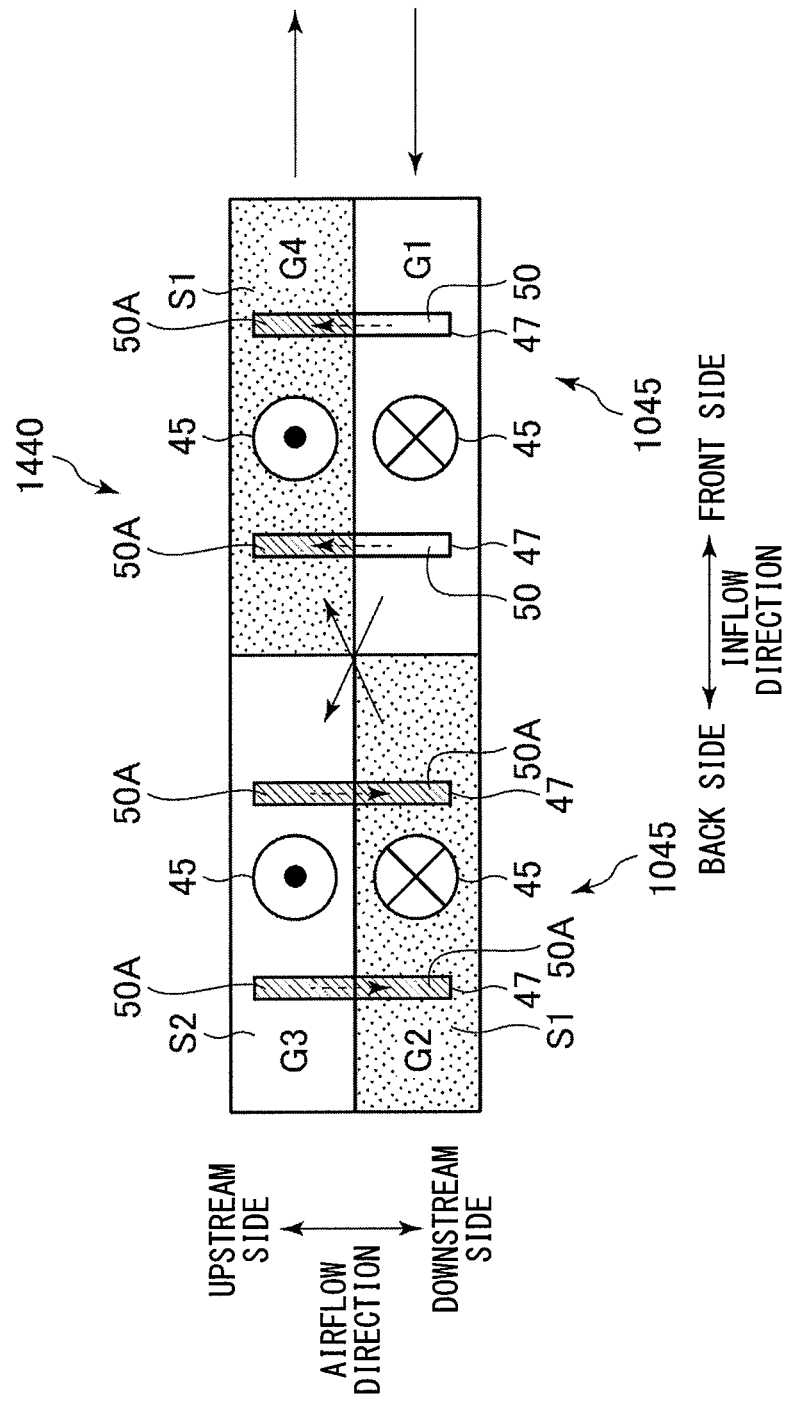
FIG. 52 is a plan view schematically illustrating the flow of refrigerant in an evaporator according to an eleventh embodiment.

As illustrated in FIG. 52, in the cold storage material container 47 that is in contact with both of the first group G1 and the fourth group G4 of the refrigerant tubes 45, a part that is in contact with the first group G1 (the half part on the downstream side in the airflow direction) is filled with the cold storage material 50 having a normal melting point, and a part that is in contact with the fourth group G4 (the half part on the upstream side in the airflow direction) is filled with the high-melting point cold storage material 50A. Such a structure can be achieved, for example, by partitioning an internal space of a single cold storage material container 47 with a partition plate which is embedded inside the cold storage material container 47 at a substantially intermediate position in the airflow direction. In the cold storage material container 47 that is in contact with both of the second group G2 and the third group G3 of the refrigerant tubes 45, the entire internal space thereof is merely filled with the high-melting point cold storage material 50A.

When the melting point of the cold storage material is increased by using the high-melting point cold storage material 50A, a temperature difference from a refrigerant which cools the cold storage material increases. Thus, the cold storage material is more easily cooled (more easily congealed). For example, it is assumed that a temperature of the refrigerant in a normal area of the refrigerant tube 45 is −3° C., a temperature of the refrigerant in the overheated areas S1, S2 of the refrigerant tube 45 is 0° C., and a melting point of the cold storage material which performs heat exchange with the refrigerant in the normal area of the refrigerant tube 45 is 5° C. In this case, when a melting point of the cold storage material which performs heat exchange with the refrigerant in the overheated areas S1, S2 of the refrigerant tube 45 is substantially equal to the melting point of the cold storage material in the normal area, congelation of the cold storage material in the overheated areas S1, S2 becomes relatively difficult, and the congealability of the cold storage material in the overheated areas S1, S2 becomes lower than that in the normal area. On the other hand, when the melting point of the cold storage material in the overheated areas S1, S2 is made higher than the melting point of the cold storage material in the normal area by a temperature difference (here, +3° C.) between the refrigerant in the normal area and the refrigerant in the overheated areas S1, S2, the congealability of the cold storage material in the overheated areas S1, S2 becomes equal to that in the normal area. Further, when the melting point of the cold storage material in the overheated areas S1, S2 is made higher than the melting point of the cold storage material in the normal area by more than the temperature difference between the refrigerant in the normal area and the refrigerant in the overheated areas S1, S2, the congealability of the cold storage material in the overheated areas S1, S2 becomes higher than that in the normal area.

As described above, the evaporator 1440 of the eleventh embodiment has the structure in which the high-melting point cold storage material 50A is disposed in each part that is in contact with the refrigerant tubes 45 having the overheated areas S1, S2. Thus, it is possible to equalize the congealability of the cold storage materials without depending on whether the refrigerant which performs heat exchange with the cold storage material is located in the overheated areas S1, S2 or in the normal area. Accordingly, it is possible to reduce the influence of the overheated areas S1, S2 and improve the heat storage and release performance of the evaporator 1440.

Modification of Eleventh Embodiment

In the eleventh embodiment, there has been described, as an example, the structure in which the high-melting point cold storage material 50A is filled inside the cold storage material container 47 that is in contact with the refrigerant tubes 45 of the third group G3 having the overheated area S2 over the entire area of the cold storage material container 47 in the height direction. However, it may only be required that the high-melting point cold storage material 50A be filled at least in a part that is in contact with the overheated area S2. For example, the high-melting point cold storage material 50A may be stored only in a part that is in contact with the vicinity of the outlet side passage having the overheated area S2 in the cold storage material container 47 that is in contact with the refrigerant tubes 45 of the third group G3. Such a structure can be achieved, for example, by partitioning an internal space of a single cold storage material container 47 with a partition plate which is embedded inside the cold storage material container 47 along a part overlapping the overheated area S2 (e.g., a quarter part of the cold storage material container 47 on the upstream side in the airflow direction and the upper side in the height direction).

Twelfth Embodiment

A twelfth embodiment will be described with reference to FIG. 53. An evaporator 1540 of the twelfth embodiment differs from the evaporator 1040 of the seventh embodiment (refer to FIGS. 33 to 35) in that, in a plurality of refrigerant tubes 45, a high-melting point cold storage material 50A is disposed in a part that is in contact with the second group G2 and the fourth group G4 having an overheated area 51. In other words, the evaporator 1540 of the twelfth embodiment differs from the evaporator 1440 of the eleventh embodiment (refer to FIG. 52) in that the high-melting point cold storage material 50A is not disposed in a part that is in contact with the third group G3 having an overheated area S2.

Figure 53:
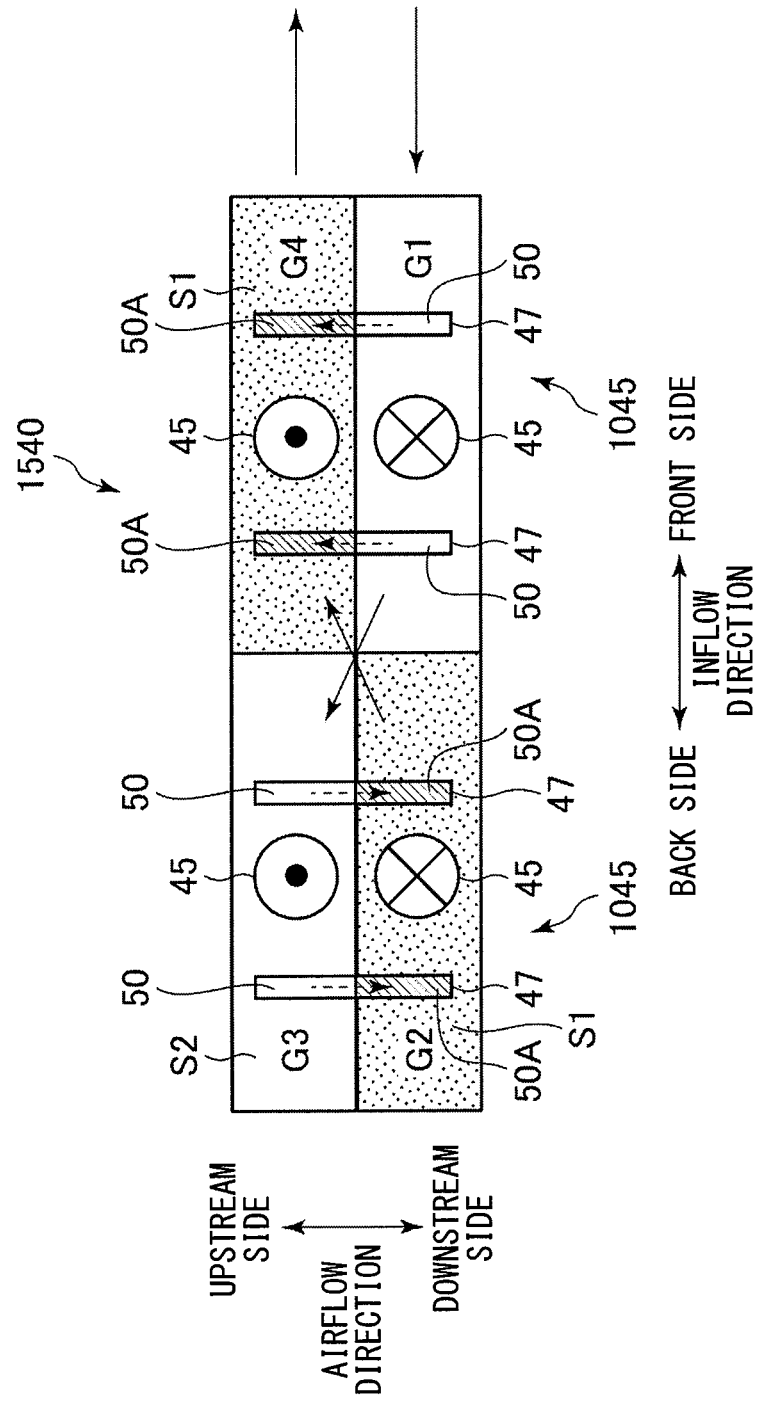
FIG. 53 is a plan view schematically illustrating the flow of refrigerant in an evaporator according to a twelfth embodiment.

As illustrated in FIG. 53, in the cold storage material container 47 that is in contact with both of the second group G2 and the third group G3 of the refrigerant tubes 45, a part that is in contact with the third group G3 (the half part on the upstream side in the airflow direction) is filled with the cold storage material 50 having a normal melting point, and a part that is in contact with the second group G2 (the half part on the downstream side in the airflow direction) is filled with the high-melting point cold storage material 50A. The structure of the cold storage material container 47 that is in contact with both of the first group G1 and the fourth group G4 of the refrigerant tubes 45 is similar to that in the eleventh embodiment described above with reference to FIG. 52.

The evaporator 1540 of the twelfth embodiment has the structure in which the high-melting point cold storage material 50A is disposed in the part that is in contact with the refrigerant tube 45 having the overheated area S1 similarly to the evaporator 1440 of the eleventh embodiment. Thus, it is possible to equalize the congealability of the cold storage materials without depending on whether the refrigerant which performs heat exchange with the cold storage material is located in the overheated area S1 or in the normal area similarly to the eleventh embodiment. Accordingly, it is possible to achieve an effect of reducing the influence of the overheated area S1 and improving the heat storage and release performance.

Further, in the evaporator 1540 of the twelfth embodiment, the cold storage materials having two different melting points (the cold storage material 50 and the high-melting point cold storage material 50A) are stored inside the cold storage material container 47 equally in the right and left (with the same amount in the airflow direction) corresponding to a distribution of the refrigerant temperature (the distribution in the order from the normal area to the overheated area S1 in the airflow direction). With the above structure, the cold storage materials having two different melting points are equally congealed. As a result, it is possible to equalize a blowout temperature distribution during heat release.

Thirteenth Embodiment

Figure 54:
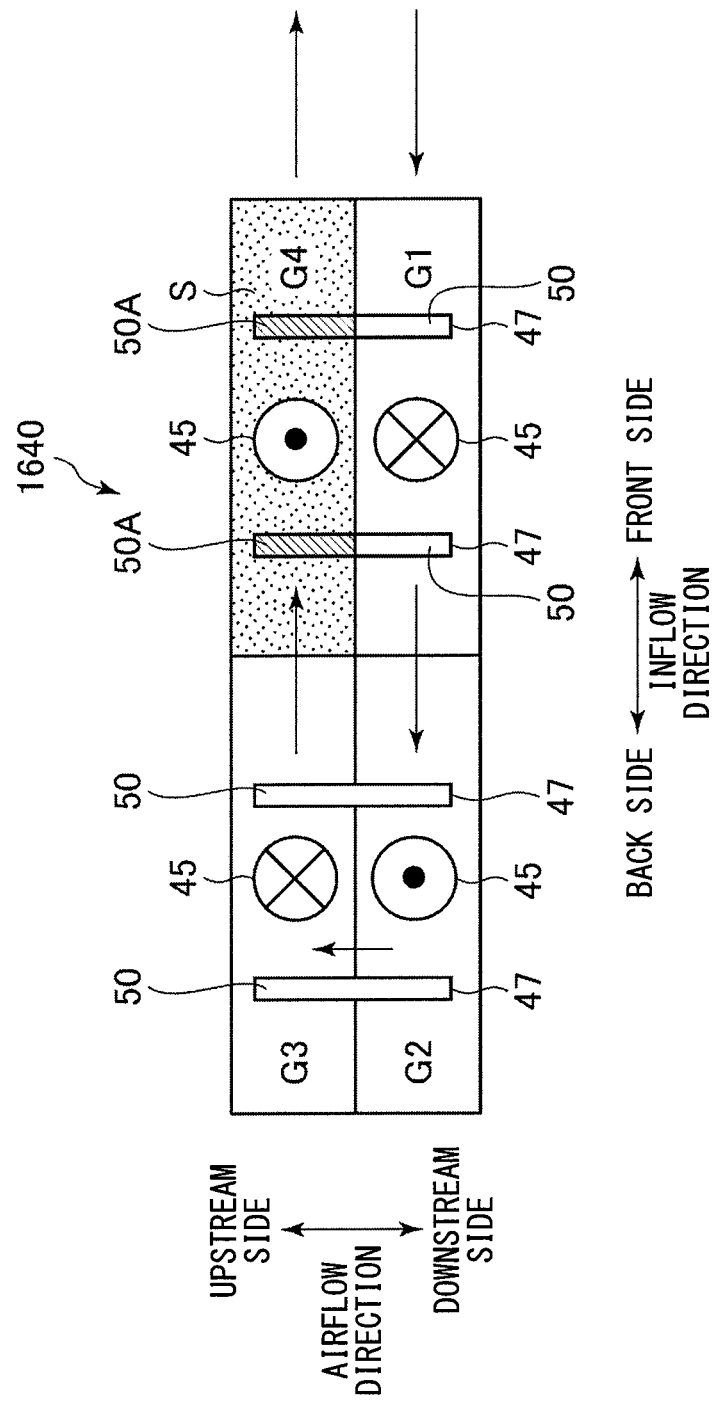
FIG. 54 is a plan view schematically illustrating the flow of refrigerant in an evaporator according to a thirteenth embodiment.

A thirteenth embodiment will be described with reference to FIG. 54. An evaporator 1640 of the thirteenth embodiment differs from the evaporator 40 of the first embodiment in that the cold storage material in a part that is in contact with the overheated area S is a high-melting point cold storage material 50A.

As described above with reference to FIG. 5, in the so-called four-turn type refrigerant passage structure, the overheated area S is formed by evaporation of a refrigerant in the substantially half area on the upper side in the height direction in the refrigerant tubes 45 of the fourth group G4, that is, near the outlet of the refrigerant passage. In the thirteenth embodiment, the high-melting point cold storage material 50A is stored in each cold storage material container 47 that is in contact with the refrigerant tube 45 having the overheated area S (that is, the fourth group G4).

In the thirteenth embodiment, it may only be required that at least the cold storage material in a part that is in contact with the overheated area S be the high-melting point cold storage material 50A. For example, the high-melting point cold storage material 50A may be filled inside the cold storage material container 47 that is in contact with the refrigerant tube 45 of the fourth group G4 having the overheated area S over the entire area in the height direction of the cold storage material container 47 or may be filled only in a part that is in contact with the overheated area S.

The evaporator 1640 of the thirteenth embodiment has the structure in which the high-melting point cold storage material 50A is disposed in the part that is in contact with the refrigerant tube 45 having the overheated area S1 similarly to the evaporator 1440 of the eleventh embodiment. Thus, also in the four-turn type refrigerant passage structure, it is possible to equalize the congealability of the cold storage materials without depending on whether the refrigerant which performs heat exchange with the cold storage material is located in the overheated area S1 or in the normal area similarly to the flow change type refrigerant flow passage structure 1045 of the eleventh embodiment. Accordingly, it is possible to achieve an effect of reducing the influence of the overheated area S and improving the heat storage and release performance. The structure of the third embodiment can also be applied to the second to sixth embodiments relating to the four-turn type refrigerant passage structure.

Fourteenth Embodiment

A fourteenth embodiment will be described with reference to FIG. 55. An evaporator 1740 of the fourteenth embodiment differs from each of the above embodiments in that a pair of partition plates 47*d* which partitions an internal space of the cold storage material container 47 in the longitudinal direction (that is, the height direction) which is the extending direction of the refrigerant tubes 45 is disposed inside the cold storage material container 47.

Figure 55:
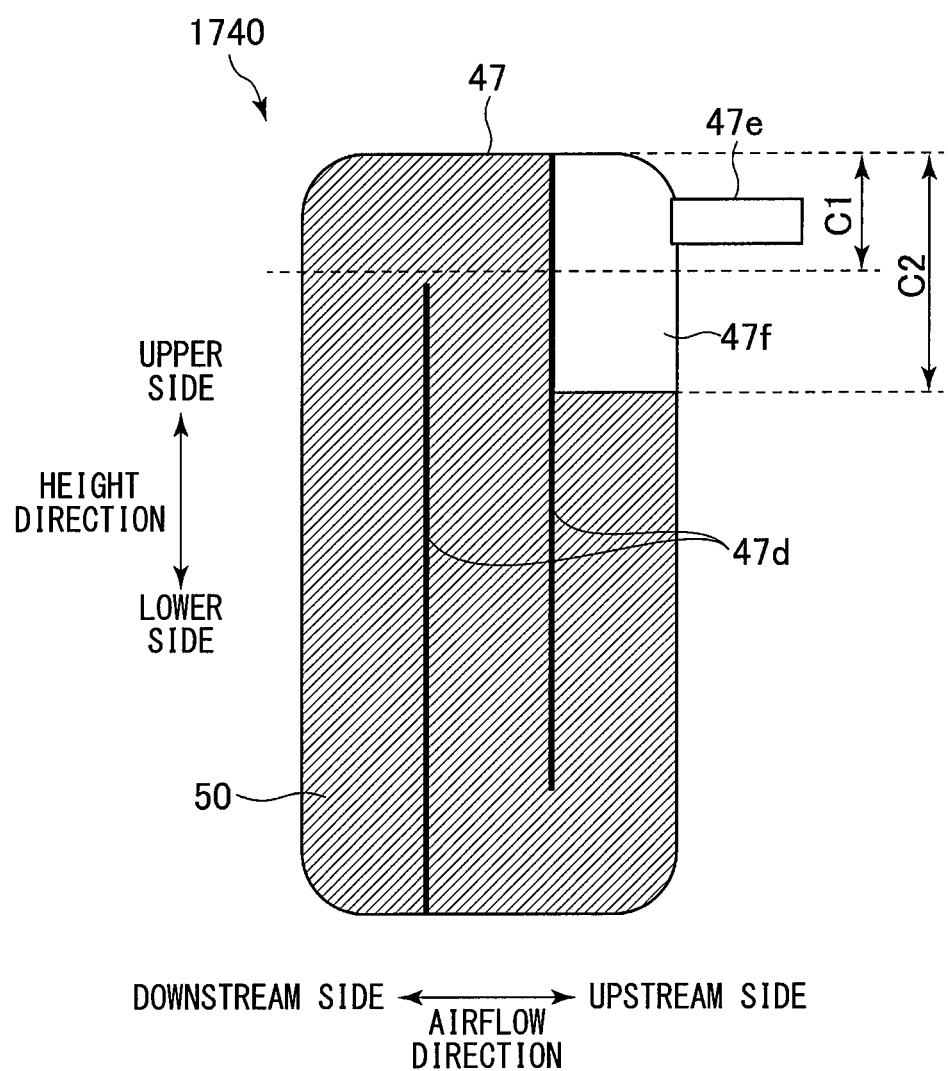
FIG. 55 is a schematic view illustrating an internal structure of a cold storage material container of an evaporator according to a fourteenth embodiment.

As illustrated in FIG. 55, one of the partition plates 47*d* (the right plate in FIG. 55) has a space in an end on one side in the longitudinal direction (the lower side in the height direction in FIG. 55) of the cold storage material container 47. Further, the other one of the partition plates 47*d* (the left plate in FIG. 55) has a space in an end on the other side in the longitudinal direction (on the upper side in the height direction in FIG. 55) of the cold storage material container 47. The partition plates 47*d* are disposed at substantially regular intervals in the airflow direction. Further, the cold storage material container 47 is provided with a cold storage material filling pipe 47*e* on one of side walls in the airflow direction that is closer to the right partition plate.

The cold storage material 50 is filled into the cold storage material container 47 through the cold storage material filling pipe 47*e*. At this time, an approximately 15% of space is typically left on the upper side of the inside of the cold storage material container 47 without completely filling the internal space of the cold storage material container 47 with the cold storage material 50 as a countermeasure against expansion by freezing. For example, as illustrated in FIG. 55, a space having an approximately height C1 is left on the upper end in the internal space. The overheated areas S1, S2 described in the above embodiments are mainly formed on the upper side in the height direction of the refrigerant tubes 45. Thus, in a conventional structure, the upper side in the height direction of the cold storage material container 47 may be less cooled, and a cooling failure may occur.

In the structure of the fourteenth embodiment, the internal space of the cold storage material container 47 is partitioned into three areas by the pair of partition plates 47*d*, and the partitioned areas lie in a line in series. Thus, when the cold storage material 50 is injected with an approximately 15% of space left as a countermeasure against expansion by freezing in a manner similar to a conventional manner, as illustrated in FIG. 55, a space 47*f* is formed only in an area communicating with the cold storage material filling pipe 47*e*, and each of the other two areas on the back side is filled with the cold storage material 50 over the entire area in the height direction thereof. That is, although a height c2 from the upper end is larger than a conventional height c1 when only the space 47*f* is viewed, there is no position where the cold storage material 50 is not present in the height direction when the entire internal space of the cold storage material container 47 is viewed. In other words, when the internal space of the cold storage material container 47 is viewed in the airflow direction, the cold storage material 50 is disposed over the entire area in the height direction. Accordingly, it is possible to prevent formation of a space on the upper end inside the cold storage material container 47 and eliminate an uncooled part on the upper side in the height direction of the cold storage material container 47.

It may only be required that at least a pair of partition plates 47*d* be disposed inside the cold storage material container 47, and a plurality of pairs of partition plates may be provided.

Fifteenth Embodiment

Figure 56:
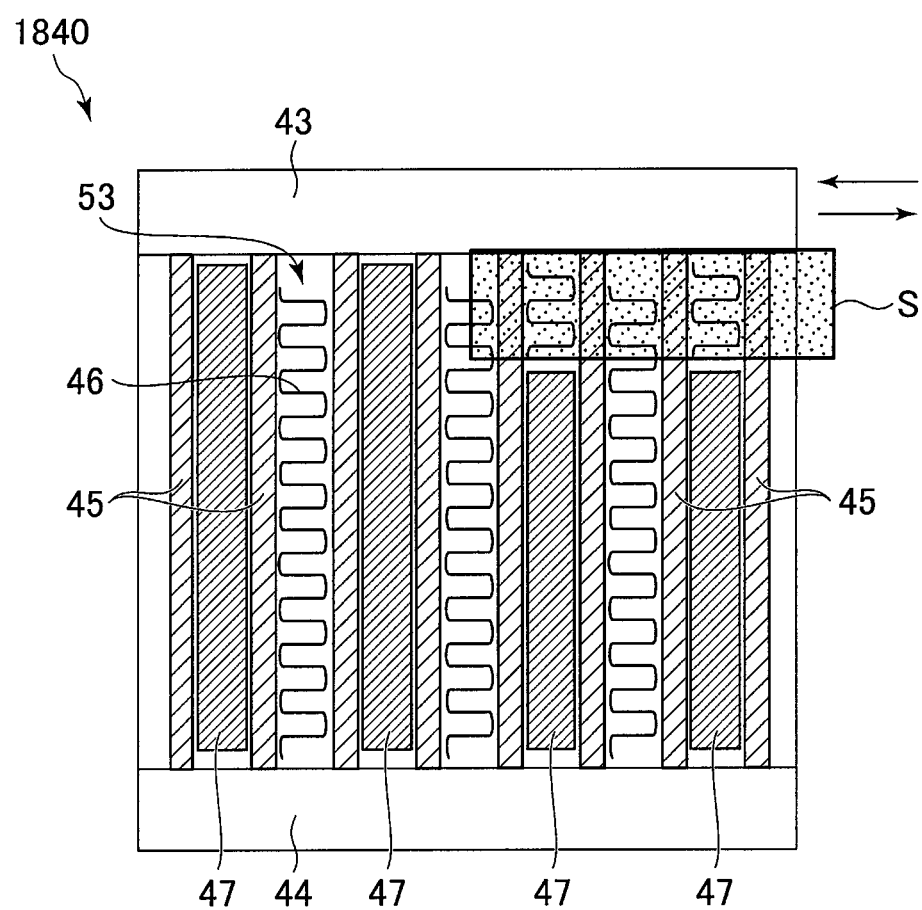
FIG. 56 is a schematic view illustrating a structure of a cold storage material container of an evaporator according to a fifteenth embodiment.

A fifteenth embodiment will be described with reference to FIG. 56. An evaporator 1840 of the fifteenth embodiment differs from the evaporator 40 of the first embodiment in that the cold storage material container 47 which is joined to the refrigerant tube 45 having the overheated area S is not disposed in a part that is in contact with the overheated area S of the refrigerant tube 45 and disposed only in a part that is in contact with an area other than the overheated area S of the refrigerant tube 45.

As described above with reference to FIG. 5, in the so-called four-turn type refrigerant passage structure, the overheated area S is formed by evaporation of a refrigerant in the substantially half area on the upper side in the height direction in the refrigerant tubes 45 of the fourth group G4, that is, near the outlet of the refrigerant passage. In the fifteenth embodiment, as illustrated in FIG. 56, the cold storage material container 47 that is in contact with the refrigerant tube 45 having the overheated area S, that is, the refrigerant tube 45 of the fourth group G4 is not disposed in an area having the overheated area S (the vicinity of the outlet of the refrigerant passage).

With the above structure, the evaporator 1840 of the fifth embodiment is capable of cutting heat exchange between the refrigerant and the cold storage material 50 in the overheated area S and improve the cooling efficiency. Accordingly, it is possible to further improve fuel consumption by increasing an off time of an air conditioner during an idle stop of a vehicle equipped with the evaporator 1840 by facilitating congelation of the cold storage material 50 to increase cooling time as compared to a conventional product. The structure of the fifteenth embodiment can also be applied to the second to sixth embodiments relating to the four-turn type refrigerant passage structure.

The embodiments of the present disclosure have been described above with reference to concrete examples. However, the present disclosure is not limited to the concrete examples described above. That is, the concrete examples with design modifications appropriately added by those skilled in the art are also included in the scope of the present disclosure as long as they have features of the present disclosure. For example, each element included in each of the concrete examples, and the arrangement, material, condition, shape, and size thereof are not limited to the illustrated one and can be appropriately modified. Further, elements included in the respective embodiments described above can be combined as long as the combination is technically feasible. These combinations are also included in the scope of the present disclosure as long as they have the features of the present disclosure.

For example, the method described in the first to sixth embodiments for reducing the influence on cold storage by the overheated areas S, S2 which are formed by evaporation of the refrigerant near the outlet of the refrigerant passage can be combined with the structures of the seventh to tenth embodiments.

In the above embodiments, there has been described, as an example, the structure in which, in the evaporator 40, the cold storage material container 47 is disposed between two refrigerant tubes 45 and joined to the two refrigerant tubes 45, and the air passage 53 is formed on the opposite side of the cold storage material container 47 in each of the refrigerant tubes 45. However, the present disclosure is not limited to the above structure. For example, the refrigerant tubes 45 and the cold storage material containers 47 may be formed as integrated members extending in the same direction, and the air passages 53 may be formed in spaces between these members.

In the above embodiments, there has been described, as an example, the structure in which the cold storage material 50 is stored in the cold storage material container 47. However, the present disclosure is not limited to the above structure. For example, the cold storage material 50 may not be stored in the cold storage material container 47, but may have direct contact with the refrigerant tube 45 so as to directly transfer heat from the refrigerant tube 45 to the cold storage material 50.

What is claimed is:

1. A cold storage heat exchanger comprising:
   a plurality of refrigerant tubes disposed at intervals, each of the refrigerant tubes including a refrigerant passage that allows a refrigerant to flow therethrough;
   a cold storage material adjacent to the refrigerant tubes;
   a cold storage material container adjacent to the refrigerant tubes, the cold storage material container storing the cold storage material; and
   an inner fin disposed inside the cold storage material container, wherein
   a shape of the cold storage material container is formed such that a joining ratio between the inner fin and the cold storage material container or a joining ratio between the cold storage material container and the refrigerant tube is different between a part corresponding to an overheated area and a part corresponding to an area other than the overheated area, and
   the inner fin contacts an inner surface of the cold storage material container forming inner fin-container contact surface areas, an inner fin-container contact surface area in the overheated area is less than an inner fin-container contact surface area in the area other than the overheated area.

2. The cold storage heat exchanger according to claim 1, wherein:
   the cold storage material container is disposed between two of the refrigerant tubes with a longitudinal direction of the cold storage material container aligned with an extending direction of the refrigerant tubes and joined to the two refrigerant tubes; and
   an air passage formed in a space between another one of the refrigerant tubes and each of the two refrigerant tubes joined to the cold storage material container at a side opposite to the cold storage material container for heat exchange between air flowing through the space and the refrigerant.

3. The cold storage heat exchanger according to claim 2, wherein
   heat transfer from the refrigerant tubes to the cold storage material in the overheated area formed by evaporation of the refrigerant near an outlet of the refrigerant passage is suppressed.

4. The cold storage heat exchanger according to claim 3, wherein
   the inner fin that extends in a longitudinal direction that is the extending direction of the refrigerant tubes inside the cold storage material container,
   the inner fin is configured in such a manner that, in the cold storage material container joined to the refrigerant tube having the overheated area,
     a heat transfer amount from the refrigerant tube to the cold storage material through the inner fin is relatively small in a part that is in contact with the overheated area of the refrigerant tube and
     a heat transfer amount from the refrigerant tube to the cold storage material through the inner fin is relatively large in a part that is in contact with an area other than the overheated area of the refrigerant tube.

5. The cold storage heat exchanger according to claim 4, wherein
   in the cold storage material container joined to the refrigerant tube having the overheated area,
   the inner fin has a relatively low joining ratio with an inner wall of the cold storage material container in a part that is in contact with the overheated area of the refrigerant tube and
   the inner fin has a relatively high joining ratio with the inner wall of the cold storage material container in a part that is in contact with an area other than the overheated area of the refrigerant tube.

6. The cold storage heat exchanger according to claim 4, wherein
   in the cold storage material container joined to the refrigerant tube having the overheated area,
   the inner fin is not joined to an inner wall of the cold storage material container in a part that is in contact with the overheated area of the refrigerant tube and
   the inner fin is joined to the inner wall of the cold storage material container in a part that is in contact with an area other than the overheated area of the refrigerant tube.

7. The cold storage heat exchanger according to claim 6, wherein:
   the plurality of refrigerant tubes include at least two refrigerant tubes disposed in an airflow direction of the air in the air passage;
   the cold storage material container is joined to the at least two refrigerant tubes disposed in the airflow direction;

the inner fin overlaps the at least two refrigerant tubes when viewed in an array direction of the refrigerant tubes and the cold storage material container; and in the cold storage material container joined to the at least two refrigerant tubes including a refrigerant tube having the overheated area, the inner fin is not joined to the inner wall of the cold storage material container in an area that includes a part that is in contact with the overheated area of the refrigerant tube and overlaps the part in contact with the overheated area of the refrigerant tube when viewed in the airflow direction and the inner fin is joined to the inner wall of the cold storage material container in the other area.

8. The cold storage heat exchanger according to claim 6, wherein:

the plurality of refrigerant tubes include at least two refrigerant tubes disposed in an airflow direction of the air in the air passage;

the cold storage material container is joined to the at least two refrigerant tubes disposed in the airflow direction;

the inner fin overlaps the at least two refrigerant tubes when viewed in an array direction of the refrigerant tubes and the cold storage material container; and in the cold storage material container joined to the at least two refrigerant tubes including a refrigerant tube having the overheated area, the inner fin is joined to the inner wall of the cold storage material container over the entire area in the longitudinal direction that is the extending direction of the refrigerant tubes in an area overlapping a refrigerant tube having no overheated area, and the inner fin is not joined to the inner wall of the cold storage material container in a part that is in contact with the overheated area of the refrigerant tube and joined to the inner wall of the cold storage material container in the other part in an area overlapping the refrigerant tube having the overheated area.

9. The cold storage heat exchanger according to claim 3, wherein:

the cold storage material container joined to the refrigerant tube having the overheated area is configured in such a manner that a heat transfer amount from the refrigerant tube to the cold storage material through the cold storage material container is relatively small in a part that is in contact with the overheated area of the refrigerant tube and a heat transfer amount from the refrigerant tube to the cold storage material through the cold storage material container is relatively large in a part that is in contact with an area other than the overheated area of the refrigerant tube.

10. The cold storage heat exchanger according to claim 9, wherein the cold storage material container joined to the refrigerant tube having the overheated area has a relatively low joining ratio with the refrigerant tube in a part that is in contact with the overheated area of the refrigerant tube and has a relatively high joining ratio with the refrigerant tube in a part that is in contact with an area other than the overheated area of the refrigerant tube.

11. The cold storage heat exchanger according to claim 9, wherein the cold storage material container joined to the refrigerant tube having the overheated area is separated from the refrigerant tube without being joined to the refrigerant tube in a part that is in contact with the overheated area of the refrigerant tube and joined to the refrigerant tube in a part that is in contact with an area other than the overheated area of the refrigerant tube.

12. The cold storage heat exchanger according to claim 11, wherein:

the plurality of refrigerant tubes include at least two refrigerant tubes disposed in an airflow direction of the air in the air passage;

the cold storage material container is joined to the at least two refrigerant tubes disposed in the airflow direction; and the cold storage material container joined to the at least two refrigerant tubes including a refrigerant tube having the overheated area is separated from the refrigerant tubes without being joined to the refrigerant tubes in an area that includes a part that is in contact with the overheated area of the refrigerant tube and overlaps the part in contact with the overheated area of the refrigerant tube when viewed in the airflow direction and joined to the refrigerant tubes in the other area.

13. The cold storage heat exchanger according to claim 11, wherein:

the plurality of refrigerant tubes include at least two refrigerant tubes disposed in an airflow direction of the air in the air passage;

the cold storage material container is joined to the at least two refrigerant tubes disposed in the air flow direction; and the cold storage material container joined to the at least two refrigerant tubes including a refrigerant tube having the overheated area is joined to the refrigerant tubes over the entire area in the extending direction in an area overlapping a refrigerant tube having no overheated area, and is separated from the refrigerant tubes without being joined to the refrigerant tubes in a part that is in contact with the overheated area of the refrigerant tube and joined to the refrigerant tubes in the other part in an area overlapping the refrigerant tube having the overheated area.

14. The cold storage heat exchanger according to claim 3, further comprising:

the inner fin that extends in the longitudinal direction that is the extending direction of the refrigerant tubes inside the cold storage material container, and is joined to an inner wall of the cold storage material container, wherein:

the cold storage material container joined to the refrigerant tube having the overheated area is configured in such a manner that a heat transfer amount from the refrigerant tube to the cold storage material through the cold storage material container is less in a part that is in contact with the overheated area of the refrigerant tube and a heat transfer amount from the refrigerant tube to the cold storage material through the cold storage material container is greater in a part that is in contact with an area other than the overheated area of the refrigerant tube.

15. The cold storage heat exchanger according to claim 14, wherein the cold storage material container joined to the refrigerant tube having the overheated area has a relatively low joining ratio with the refrigerant tube in a part that is in contact with the overheated area of the refrigerant tube and has a relatively high joining ratio with the refrigerant tube in a part that is in contact with an area other than the overheated area of the refrigerant tube.

16. The cold storage heat exchanger according to claim 14, wherein
the cold storage material container joined to the refrigerant tube having the overheated area
is separated from the refrigerant tube without being joined to the refrigerant tube in a part that is in contact with the overheated area of the refrigerant tube and
is joined to the refrigerant tube in a part that is in contact with an area other than the overheated area of the refrigerant tube.

17. The cold storage heat exchanger according to claim 16, wherein:
the plurality of refrigerant tubes include at least two refrigerant tubes disposed in an airflow direction of the air in the air passage;
the cold storage material container is joined to the at least two refrigerant tubes disposed in the airflow direction;
the inner fin overlaps the at least two refrigerant tubes when viewed in an array direction of the refrigerant tubes and the cold storage material container; and
the cold storage material container joined to the at least two refrigerant tubes including a refrigerant tube having the overheated area
is separated from the refrigerant tubes without being joined to the refrigerant tubes in an area that includes a part that is in contact with the overheated area of the refrigerant tube and overlaps the part in contact with the overheated area of the refrigerant tube when viewed in the airflow direction and
is joined to the refrigerant tubes in the other area.

18. The cold storage heat exchanger according to claim 16, wherein:
the plurality of refrigerant tubes include at least two refrigerant tubes disposed in an airflow direction of the air in the air passage;
the cold storage material container is joined to the at least two refrigerant tubes disposed in the airflow direction;
the inner fin overlaps the at least two refrigerant tubes when viewed in an array direction of the refrigerant tubes and the cold storage material container; and
the cold storage material container joined to the at least two refrigerant tubes including a refrigerant tube having the overheated area
is joined to the refrigerant tubes over the entire area in the extending direction in an area overlapping a refrigerant tube having no overheated area, and
is separated from the refrigerant tubes without being joined to the refrigerant tubes in a part that is in contact with the overheated area of the refrigerant tube and joined to the refrigerant tubes in the other part, in an area overlapping the refrigerant tube having the overheated area.

19. The cold storage heat exchanger according to claim 3, wherein
the cold storage material container joined to the refrigerant tube having the overheated area is not disposed in a part that is in contact with the overheated area of the refrigerant tube and disposed only in a part that is in contact with an area other than the overheated area of the refrigerant tube.

20. The cold storage heat exchanger according to claim 1, wherein
a part of the cold storage material that is in contact with at least the overheated area is a high-melting point cold storage material having a relatively high melting point compared to the other part.

21. The cold storage heat exchanger according to claim 1, further comprising:
at least a pair of partition plates that is disposed inside the cold storage material container and partitions an internal space of the cold storage material container in the longitudinal direction that is an extending direction of the refrigerant tubes, wherein
one of the partition plates has a space in an end on one side in the longitudinal direction of the cold storage material container, and
the other one of the partition plates has a space in an end on the other side in the longitudinal direction of the cold storage material container.

22. A cold storage heat exchanger comprising:
a plurality of refrigerant tubes disposed at intervals, each of the refrigerant tubes including a refrigerant passage that allows a refrigerant to flow therethrough;
a cold storage material adjacent to the refrigerant tubes;
a cold storage material container adjacent to the refrigerant tubes, the cold storage material container storing the cold storage material;
an inner fin disposed inside the cold storage material container;
a first header tank communicating with one end side of each of the plurality of refrigerant tubes, a longitudinal direction of the first header tank being aligned with an array direction of the refrigerant tubes and the cold storage material container; and
a second header tank communicating with the other end side of each of the plurality of refrigerant tubes, a longitudinal direction of the second header tank being aligned with the array direction, wherein:
a shape of the cold storage material container is formed such that a joining ratio between the inner fin and the cold storage material container or a joining ratio between the cold storage material container and the refrigerant tube is different between a part corresponding to an overheated area and a part corresponding to an area other than the overheated area;
the plurality of refrigerant tubes are arranged in two rows so as to be paired in an airflow direction of the air in the air passage;
an inside of the first header tank is partitioned into an inlet side passage that communicates with some of the plurality of refrigerant tubes disposed on a downstream side in the airflow direction and includes an inlet of the refrigerant passage on one end in the longitudinal direction that is an extending direction of the refrigerant tubes and an outlet side passage that communicates with some of the plurality of refrigerant tubes disposed on an upstream side in the airflow direction and includes an outlet of the refrigerant passage on one end or the other end in the longitudinal direction that is the extending direction of the refrigerant tubes;
the plurality of refrigerant tubes are divided into a first group that communicates with the inlet side passage and is disposed on the one end side in the longitudinal direction that is the extending direction of the refrigerant tubes, a second group that communicates with the inlet side passage and is disposed on the other end side in the longitudinal direction that is the extending direction of the refrigerant tubes, a third group that communicates with the outlet side passage and is disposed on the other end side in the longitudinal direction that is the extending direction of the refrigerant tubes, and a fourth group that communicates with the outlet side passage and is disposed on the one end side in the longitudinal direction that is the extending direction of the refrigerant tubes;

the second header tank allows communication between the first group and the third group and communication between the second group and the fourth group, and changes a position of the refrigerant introduced to the one end side in the longitudinal direction that is the extending direction of the refrigerant tubes from the inlet side passage and a position of the refrigerant introduced to the other end side in the longitudinal direction from the inlet side passage to the other end side and the one end side, respectively, so as to be led to the outlet side passage;

the overheated area is formed in the second group and the fourth group of the plurality of the refrigerant tubes; and a refrigerant passage structure having
   a structure in which the cold storage material container is joined to both of the second group having the overheated area and the third group having no overheated area and
   a structure in which the cold storage material container is joined to both of the first group having no overheated area and the fourth group having the overheated area.

23. The cold storage heat exchanger according to claim 22, wherein: the inner fin is configured in such a manner that
   a heat transfer amount from the refrigerant tube to the cold storage material through the inner fin is relatively small in a part where the cold storage material container is joined to the second group and the fourth group of the refrigerant tubes having the overheated area and
   a heat transfer amount from the refrigerant tube to the cold storage material through the inner fin is relatively large in a part where the cold storage material container is joined to the first group and the third group of the refrigerant tubes having no overheated area.

24. The cold storage heat exchanger according to claim 23, wherein
   the inner fin has
   a relatively low joining ratio with an inner wall of the cold storage material container in a part where the cold storage material container is joined to the second group and the fourth group of the refrigerant tubes having the overheated area and
   a relatively high joining ratio with the inner wall of the cold storage material container in a part where the cold storage material container is in contact with the first group and the third group of the refrigerant tubes having no overheated area.

25. The cold storage heat exchanger according to claim 23, wherein
   the inner fin is not joined to an inner wall of the cold storage material container in a part where the cold storage material container is joined to the second group and the fourth group of the refrigerant tubes having the overheated area and
   the inner fin is joined to the inner wall of the cold storage material container in a part where the cold storage material container is in contact with the first group and the third group of the refrigerant tubes having no overheated area.

26. The cold storage heat exchanger according to claim 22, wherein:
   the cold storage material container is configured in such a manner that
   a heat transfer amount from the refrigerant tube to the cold storage material through the cold storage material container is relatively small in a part that is in contact with the second group and the fourth group of the refrigerant tubes having the overheated area and
   a heat transfer amount from the refrigerant tube to the cold storage material through the cold storage material container is relatively large in a part that is in contact with the first group and the third group of the refrigerant tubes having no overheated area.

27. The cold storage heat exchanger according to claim 26, wherein
   the cold storage material container has
   a relatively low joining ratio with the refrigerant tube in a part that is in contact with the second group and the fourth group of the refrigerant tubes having the overheated area and
   a relatively high joining ratio with the refrigerant tube in a part that is in contact with the first group and the third group of the refrigerant tubes having no overheated area.

28. The cold storage heat exchanger according to claim 26, wherein
   the cold storage material container is separated from the refrigerant tube without being joined to the refrigerant tube in a part that is in contact with the second group and the fourth group of the refrigerant tubes having the overheated area and
   the cold storage material container is joined to the refrigerant tube in a part that is in contact with the first group and the third group of the refrigerant tubes having no overheated area.

29. The cold storage heat exchanger according to claim 22, wherein
   the inner fin is joined to an inner wall of the cold storage material container,
   the cold storage material container is configured in such a manner that
   a heat transfer amount from the refrigerant tube to the cold storage material through the cold storage material container is relatively small in a part that is in contact with the second group and the fourth group of the refrigerant tubes having the overheated area and
   a heat transfer amount from the refrigerant tube to the cold storage material through the cold storage material container is relatively large in a part that is in contact with the first group and the third group of the refrigerant tubes having no overheated area.

30. The cold storage heat exchanger according to claim 29, wherein
   the cold storage material container has a relatively low joining ratio with the refrigerant tube in a part that is in contact with the second group and the fourth group of the refrigerant tubes having the overheated area and has a relatively high joining ratio with the refrigerant tube in a part that is in contact with the first group and the third group of the refrigerant tubes having no overheated area.

31. The cold storage heat exchanger according to claim 29, wherein the cold storage material container is separated from the refrigerant tube without being joined to the refrigerant tube in a part that is in contact with the second group and the fourth group of the refrigerant tubes having the overheated area and joined to the refrigerant tube in a part that is in contact with the first group and the third group of the refrigerant tubes having no overheated area.

32. The cold storage heat exchanger according to claim 22, wherein
a plurality of the refrigerant passage structures are disposed in the longitudinal direction that is an extending direction of the refrigerant tubes.

33. The cold storage heat exchanger according to claim 22, wherein
a part of the cold storage material that is in contact with at least the overheated area is a high-melting point cold storage material having a relatively high melting point compared to the other part.

34. The cold storage heat exchanger according to claim 33, wherein:
the overheated area includes a second overheated area that is formed near the outlet side passage in the third group of the plurality of the refrigerant tubes; and
the high-melting point cold storage material is disposed in a part that is in contact with the second group and the fourth group having the overheated area, and the high-melting point cold storage material is disposed in a part that is in contact with the third group having the second overheated area in the plurality of refrigerant tubes.

35. The cold storage heat exchanger according to claim 33, wherein:
the overheated area includes a second overheated area that is formed near the outlet side passage in the third group of the plurality of the refrigerant tubes;
the high-melting point cold storage material is disposed in a part that is in contact with the second group and the fourth group having the overheated area in the plurality of refrigerant tubes; and
the high-melting point cold storage material is disposed in a part that is in contact with the vicinity of the outlet side passage having the second overheated area in the third group of the plurality of refrigerant tubes.

36. The cold storage heat exchanger according to claim 33, wherein
the high-melting point cold storage material is disposed in a part that is in contact with the second group and the fourth group having the overheated area in the plurality of refrigerant tubes.

37. A cold storage heat exchanger comprising:
a plurality of refrigerant tubes disposed at intervals, each of the refrigerant tubes including a refrigerant passage that allows a refrigerant to flow therethrough;
a cold storage material adjacent to the refrigerant tubes;
a cold storage material container adjacent to the refrigerant tubes, the cold storage material container storing the cold storage material; and
an inner fin disposed inside the cold storage material container, wherein
the inner fin contacts an inner surface of the cold storage material container forming container contact surface areas, a container contact surface area in an overheated area is less than a container contact surface area in an area other than the overheated area.

* * * * *